United States Patent
Aso et al.

(10) Patent No.: US 7,755,985 B2
(45) Date of Patent: Jul. 13, 2010

(54) OPTICAL PICKUP DEVICE AND OPTICAL DISK DRIVE

(75) Inventors: Junya Aso, Fukuoka (JP); Hiroshi Yamamoto, Kyoto (JP); Yutaka Murakami, Osaka (JP); Kenichi Nakano, Fukuoka (JP)

(73) Assignee: Panasonic Corporation, Osaka (JP)

( * ) Notice: Subject to any disclaimer, the term of this patent is extended or adjusted under 35 U.S.C. 154(b) by 835 days.

(21) Appl. No.: 11/582,967

(22) Filed: Oct. 19, 2006

(65) Prior Publication Data

US 2007/0091739 A1 Apr. 26, 2007

(30) Foreign Application Priority Data

Oct. 21, 2005 (JP) ............................. 2005-306926

(51) Int. Cl.
*G11B 7/00* (2006.01)

(52) U.S. Cl. ................................ 369/44.11; 369/44.37

(58) Field of Classification Search ....................... None
See application file for complete search history.

(56) References Cited

U.S. PATENT DOCUMENTS

| | | | |
|---|---|---|---|
| 2003/0016597 A1 | 1/2003 | Haruguchi et al. | |
| 2004/0107428 A1* | 6/2004 | Matsuda | 720/683 |
| 2004/0114495 A1* | 6/2004 | Kim et al. | 369/112.24 |
| 2005/0146999 A1 | 7/2005 | Yamada | |

FOREIGN PATENT DOCUMENTS

JP 2005158161 6/2005

* cited by examiner

*Primary Examiner*—Joseph H Feild
*Assistant Examiner*—Joseph Haley
(74) *Attorney, Agent, or Firm*—Dickinson Wright PLLC

(57) ABSTRACT

An advantage of the present invention is that it provides an optical pickup device including a first condensing member that condenses light from a first light source; a second condensing member that condenses light from a second light source; a holder that has the first and second condensing members attached thereto; a plurality of tracking coils that drive the holder in a tracking direction of an optical disk; and a plurality of focus coils that drive the holder in a focus direction of an optical disk. The plurality of focus coils are disposed in the holder such that virtual center axes for winding coil are set to be substantially perpendicular to the optical axes of the first and second condensing members, and are disposed in four direction such that the region in which the first and second condensing members are attached is surrounded in a rectangular shape. The tracking coils are disposed in the holder such that virtual center axes for winding coil are set to be substantially perpendicular to the optical axes of the first and second condensing members, and are disposed between the first and second condensing members in a tangential direction.

16 Claims, 73 Drawing Sheets

PERSPECTIVE VIEW

TOP VIEW

SIDE VIEW

POLARIZATION HOLOGRAM 1
(RIM CORRECTION FILTER)
ACTION ONLY ON OUTWARD PATH LIGHT

OUTWARD PATH INCIDENT LIGHT
ON POLARIZATION HOLOGRAM 1

OPTICAL PICKUP DEVICE AND OPTICAL DISK DRIVE

BACKGROUND

1. Field of the Invention

The present invention relates to an optical disk drive, which can be mounted on portable electronic apparatuses such as notebook computers or electronic apparatuses such as stationary personal computers, and an optical pickup device which can be mounted on the optical disk drive.

2. Description of the Related Art

Recently, in an optical disk drive, recording or reproducing of information can be not only performed on CD or DVD by infrared laser or red laser, but can be also performed on an optical disk corresponding to short-wavelength light by using short-wavelength such as blue laser (For example, refer to Japanese Unexamined Patent Application Publication No. 2005-158161)

However, when an optical pickup device corresponding to laser with various types of wavelengths is implemented, the number of parts increases, thereby increasing the size of the device.

An advantage of the present invention is that it provides an optical pickup device including a first condensing member that condenses light from a first light source; a second condensing member that condenses light from a second light source; a holder that has the first and second condensing members attached thereto; a plurality of tracking coils that drive the holder in a tracking direction of an optical disk; and a plurality of focus coils that drive the holder in a focus direction of an optical disk. The plurality of focus coils are disposed in the holder such that virtual center axes for winding coil are set to be substantially perpendicular to the optical axes of the first and second condensing members, and are disposed in four direction such that the region in which the first and second condensing members are attached is surrounded in a rectangular shape. The tracking coils are disposed in the holder such that virtual center axes for winding coil are set to be substantially perpendicular to the optical axes of the first and second condensing members, and are disposed between the first and second condensing members in a tangential direction.

In the above-described optical pickup device, a moving section of the optical pickup device, which drives at least an object lens, can be constructed to be small-sized.

DETAILED DESCRIPTION

Figure 1:
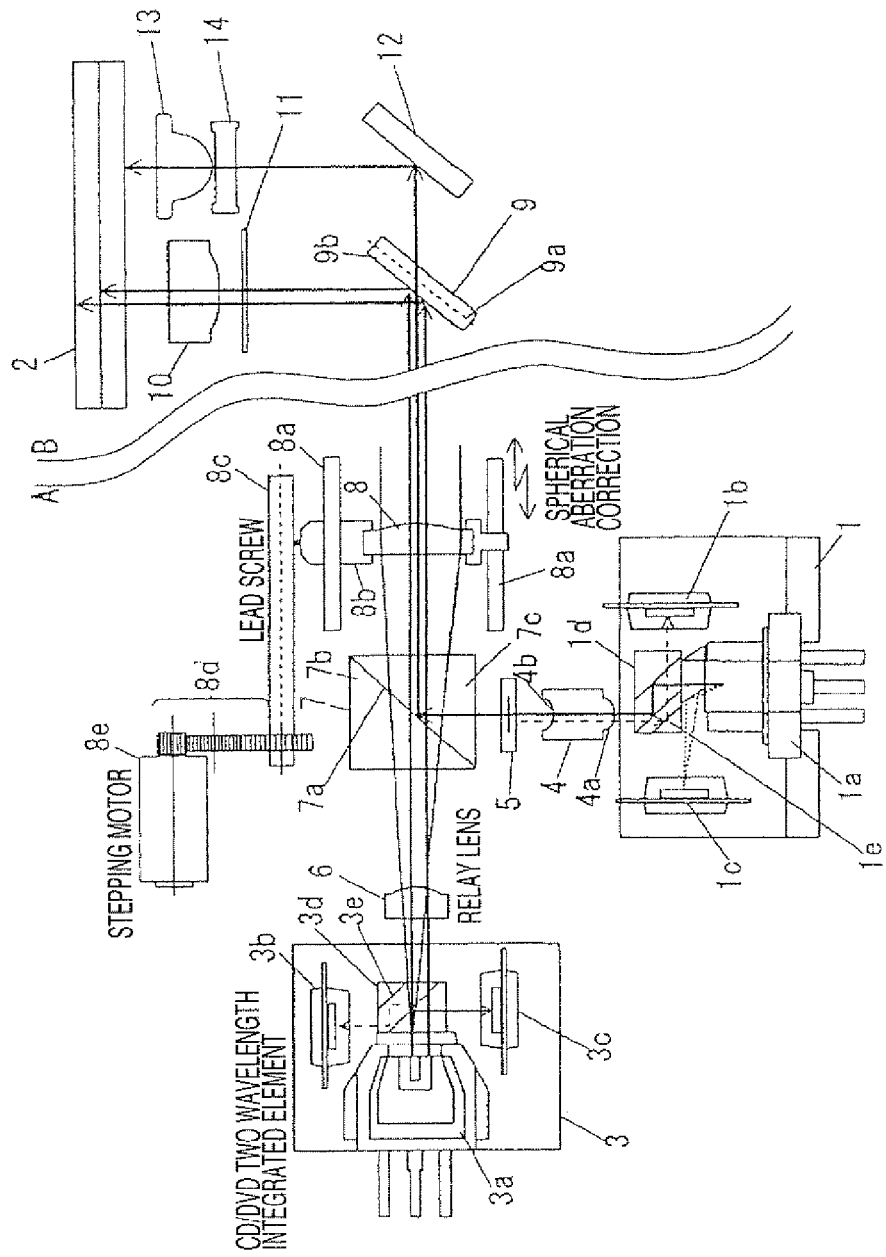
FIG. 1 is a schematic view showing an optical pickup device according to an embodiment of the present invention.

FIG. 1 is a schematic view illustrating the construction of an optical pickup device according to an embodiment of the present invention. The A-side of FIG. 1 from a short wavelength optical unit 1 and a long wavelength optical unit 3 to a collimator lens 8 by reference to a double wavy line is a schematic view when the optical pickup device is seen from a Z-direction (the top side of the page) in FIG. 2. The B-side of FIG. 1 from a inclined-right mirror 9 to an optical disk 2 by reference to the double wavy line is a schematic view when the optical pickup device is seen from an R-direction in FIG. 2.

In FIG. 1, reference numeral 1 represents a short wavelength optical unit which emits short-wavelength laser. The short wavelength optical unit 1 emits light with a wavelength of 400 to 415 nm. In this embodiment, the short wavelength optical unit 1 is constructed so as to emit light with a wavelength of 405 nm. In general, light with the above-described laser wavelength has a blue color to violet color. In this embodiment, although the detail of the short wavelength optical unit 1 will be described below, the short wavelength optical unit 1 includes a light source section 1a which emits short-wavelength laser, a light receiving section 1b for detecting a signal which receives light reflected from the optical disk 2, a light receiving section 1c which is provided so as to monitor an amount of light emitted from the light source section 1a, an optical member 1d, and a holding member (not shown) which holds the above-described constituent members in a predetermined positional relationship. The light source member 1a is provided with a semiconductor laser element (not shown) which consists primarily of GaN. The light emitted from the semiconductor laser element is incident on the optical member 1d, and some of the incident light is reflected by the optical member 1d so as to enter the light receiving section 1c. Although not shown, the light receiving section 1c is provided with a circuit which converts light into an electrical signal and adjusts the intensity of light to a desired level, the light being emitted from the light source section 1a based on the electrical signal. Further, most of light emitted from the light source section 1a is introduced toward the optical disk 2 through the optical member 1d, and the light reflected from the optical disk 2 is incident on the light receiving section 1b through the optical member 1d. The light receiving section 1b converts light into an electrical signal and generates an RF signal, a tracking error signal, a focus error signal and the like from the electrical signal. In the optical member 1d, a hologram 1e is provided to separate the reflected light from the optical disk 2 such that a focus error signal can be obtained.

In this embodiment, one short wavelength optical unit including the light source section 1a, the light receiving sections 1b and 1c, and the optical member 1d is constructed so as to miniaturize the optical pickup device. However, at least one of the receiving sections 1b and 1c may be removed from the short wavelength optical unit 1 so as to be separately constructed. Alternately, the optical member 1d may be removed from the short wavelength optical unit 1 so as to be separately constructed.

Reference numeral 3 represents a long wavelength optical unit which emits laser with a long wavelength. The long wavelength optical unit 3 emitting light with a wavelength of 640 to 800 nm is constructed so as to emit light with one kind of wavelength or a plurality of lights with plural kinds of wavelengths. In this embodiment, the long wavelength optical unit 3 is constructed so as to emit a light flux with a wavelength of about 660 nm (red: corresponding to DVD) and a light flux with a wavelength of about 780 nm (infrared: corresponding to CD). In this embodiment, although the details of the long wavelength optical unit 3 will be described below, the long wavelength optical unit 3 includes a light source section 3a which emits laser with a long wavelength, a light receiving section 3b for detecting a signal which receives light reflected from the optical disk 2, a light receiving section 3c which is provided so as to monitor an amount of light emitted from the light source section 3a, an optical member 3d, a holding member (not shown) which holds those constituent members in a predetermined positional relationship. The light source section 3a is provided with a semiconductor laser element (not shown). The semiconductor laser element is composed of a mono block (monolithic structure). The semiconductor layer element emits a light flux with a wavelength of about 660 nm (red) and a light flux with a wavelength of about 780 nm (infrared) from the mono-block element. In this embodiment, the mono-block element emits two-light fluxes. However, two elements may be built therein, each element emitting one light flux. A plurality of light fluxes emitted from the semiconductor layer element are incident on the optical member 3d, and some of the incident light is reflected by the optical member 3d so as to enter the light receiving section 3c. Although not shown, the light receiving section 3c is provided with a circuit which converts light into an electrical signal and adjusts the intensity of light to a desired level, the light being emitted from the light source section 3a based on the electrical signal. Further, most of light emitted from the light source section 3a is introduced toward the optical disk 2 through the optical member 3d, and the light reflected from the optical disk 2 is incident on the light receiving section 3b through the optical member 3d. The light receiving section 3b converts light into an electrical signal and generates an RF signal, a tracking error signal, a focus error signal and the like from the electrical signal. In order to generate a focus error signal for CD, the optical member 3d is provided with a hologram 3e which separates reflected light from the optical disk 2 into a plurality of lights such that the respective lights are guided to predetermined places of the light receiving section 3b.

In this embodiment, one long wavelength optical unit including the light source section 3a, the light receiving sections 3b and 3c, and the optical member 3d is constructed so as to miniaturize the optical pickup device. However, at least one of the receiving sections 3b and 3c may be removed from the long wavelength optical unit 3 so as to be separately constructed. Alternately, the optical member 3d may be removed from the long wavelength optical unit 3 so as to be separately constructed.

Reference numeral 4 represents a beam shaping lens, through which light emitted from the short wavelength optical unit 1 and reflected light from the optical disk 2 pass. Preferably, the beam shaping lens 4 is formed of glass which is hardly degraded by the passing of short-wavelength laser. In this embodiment, although the beam shaping lens 4 is formed of glass, the beam shaping lens 4 may be formed of another material as long as the material is hardly degraded by the passing of short-wavelength laser. The beam shaping lens 4 is provided so as to remove astigmatism of short-wavelength laser and astigmatism occurring in a light path from the short wavelength optical unit 1 to the optical disk 2. For purpose of the beam shaping lens 4, the light reflected from the optical disk 2 may be caused to be incident on the short wavelength optical unit 1 without the beam shaping lens 4. In this embodiment, however, the reflected light from the optical disk 2 is caused to be incident on the short wavelength optical unit 1 through the beam shaping lens 4. Further, in this embodiment, although the beam shaping lens 4 is used so as to reduce astigmatism of light with a short wavelength, a beam shaping prism or beam shaping hologram may be used instead.

In both ends of the beam shaping lens 4, a convex portion 4a and a concave portion 4b are respectively provided. The beam shaping lens 4 is disposed so that the light emitted from the short wavelength optical unit 1 is first incident on the convex portion 4a so as to be emitted from the concave portion 4b.

Reference numeral 5 represents an optical part. The optical part 5 is disposed ahead of the beam shaping lens 4 on the light path and in the side of the concave section 4b of the beam shaping lens 4. That is, the light emitted from the short wavelength optical unit 1 is incident on the optical part 5 through the beam shaping lens 4 so as to be guided to the optical disk 2, and the light reflected from the optical disk 2 is incident on the short wavelength optical unit 1 after sequentially passing through the optical part 5 and the beam shaping lens 4. The optical part 5 is provided with a hologram or the like, which has at least the following function. That is, the function is to separate the light reflected from the optical disk 2 into predetermined light fluxes so as to mainly generate a tracking error signal. As described above, the light is separated into a plurality of light fluxes by the hologram 1e provided in the optical member 1d, in order to generate a focus error signal. Further, the light is separated into a plurality of light fluxes by the optical part 5, in order to generate a tracking error signal.

Although the details will be described below, the optical parts 5 may have a function of serving as a RIM intensity correction filter which attenuates the light intensity of short-wavelength light at the substantial center portion. Further, the optical parts 5 may be separated into two optical parts. One of the optical parts 5 can serve to separate the light reflected from the optical disk 2 into predetermined light fluxes so as to mainly generate a tracking error signal, and the other of the optical parts 5 can serve as a RIM intensity correction filter.

Reference numeral 6 represents a relay lens though which long-wavelength light emitted from the long wavelength optical unit 3 passes. The relay lens 6 is formed of a transparent member such as resin or glass. The relay lens 6 is provided so as to effectively guide light emitted from the long wavelength optical unit 3 into a backward member. Further, with the relay lens 6 being provided, the long wavelength optical unit 3 can be disposed toward a beam splitter 7, which makes it possible to realize the miniaturization of device.

Reference numeral 7 represents a beam splitter. In the beam splitter 7, at least two transparent members 7b and 7c are provided so as to be bonded to each other. Between the transparent members 7b and 7c, one inclined surface 7a is provided on which a wavelength selecting film is formed. As the wavelength selecting film is directly formed on the inclined surface 7a of the transparent member 7c into which the light emitted from the short wavelength optical unit 1 enters, the transparent member 7b is bonded to the inclined surface 7a of the transparent member 7c, on which the wavelength selecting film is formed, through a bonding material such as resin or glass.

Further, the beam splitter 7 has a function of reflecting the short-wavelength light emitted from the short wavelength optical unit 1 and transmitting the light emitted from the long wavelength optical unit 3. That is, the light emitted from the short wavelength optical unit 1 and the light emitted from the long wavelength optical unit 3 are guided in the substantially same direction.

Reference numeral 8 represents a collimator lens which is movably held. The collimator lens 8 is attached to a slider 8b, and the slider 8b is movably attached to a pair of support members 8a which are provided substantially parallel to each other. A lead screw 8c provided with a helical groove is provided substantially parallel to the support member 8a, and a projection inserted into the groove of the lead screw 8c is provided on the end portion of the slider 8b. The lead screw 8c is coupled to a gear group 8d which is provided with a driving member 8e. A driving force of the driving member 8e is transmitted to the lead screw 8c through the gear group 8d, and the lead screw 8c is rotated by the driving force. As a result, the slider 8b moves along the support member 8a. That is, the collimator lens 8 can be moved in a direction approaching or departing from the beam splitter 7 by a difference in driving direction or driving speed of driving member 8e. Further, the speed of the movement can be adjusted.

As the driving member 8e, various motors are used, among which a stepping motor is preferably used. An amount of rotation of the lead screw 8c is determined by adjusting the number of pulses to be sent to the stepping motor. As a result, it is possible to easily set an amount of movement of the collimator lens 8.

As such, as the collimator lens 8 is constructed so as to approach or depart from the beam splitter 7, it is possible to easily adjust a spherical aberration. That is, the spherical aberration of short-wavelength light can be adjusted by the position of the collimator lens 8. Therefore, at least any one of recording and reproducing can be effectively performed on a first recording layer provided in the optical disk, the first recording layer corresponding to a short wavelength, and a second recoding layer provided at a depth different from the first recording layer, respectively.

Through the collimator lens 8, long-wavelength and short-wavelength lights incident from the beam splitter 7 pass. Therefore, the collimator lens 8 is formed of glass or, preferably, short-wavelength-light-resistant resin (which is not or hardly degraded by short-wavelength light). The collimator lens 8 transmits short-wavelength or long-wavelength light reflected by the optical disk 2.

In this embodiment, the collimator lens 8 is moved by the driving member 8e in order to correct a spherical aberration of short-wavelength light. However, the collimator lens 8 may be moved by another constituent member. Further, the spherical aberration of short-wavelength light may be adjusted by another unit.

Reference numeral 9 represents a inclined-right mirror. The inclined-right mirror 9 is provided with a quarter wavelength member 9a acting on short-wavelength light. As the quarter wavelength member 9a, a quarter wavelength member is preferably used, which can rotate a polarization direction of light at about 90 degrees, the light having passed two times (through an outward path and inward path). In this embodiment, the quarter wavelength member 9a is interposed inside the inclined-right mirror 9. On the surface of the inclined-right mirror 9, on which the light emitted from each of the units 1 and 3 is incident, a wavelength selecting film 9b is provided, which has a function of reflecting most of long-wavelength light emitted from the long wavelength optical unit 3 and transmitting most of short-wavelength light emitted from the short wavelength optical unit 1.

Reference numeral 10 represents an object lens for long-wavelength laser. The object lens 10 condenses light reflected from the inclined-right mirror 9 on the optical disk 2. Although the object lens 10 is used in this embodiment, other condensing members such as a hologram and the like may be used. Further, it is natural that the light reflected from the optical disk 2 passes through the object lens 10. The object lens 10 is formed of glass or resin.

Reference numeral 11 represents an optical part. The optical part 11 is an optical part provided between the object lens 10 and the inclined-right mirror 9. The optical part 11 includes an aperture filter for implementing a required number of apertures which can correspond to a DVD optical disk (light with a wavelength of about 660 nm) and a CD optical disk (light with a wavelength of about 780 nm); a polarization hologram responding to light with a wavelength of about 660 nm; and a quarter wavelength member (preferably, a quarter wavelength plate). The optical part 11 is composed of a dielectric multilayer, a diffraction grating aperture unit or the like. The polarization hologram adds polarized light to light with a wavelength of about 660 nm (light with a wavelength of about 660 nm is separated into light for tracking error signal or focus error signal). Further, the quarter wavelength member rotates the polarization direction of an inward path of light with a wavelength of about 660 nm or 780 nm with respect to an outward path thereof, by 90 degrees.

Reference numeral 12 represents a inclined-right mirror which reflects most of short-wavelength light. The inclined-right mirror 12 is provided with a reflective film.

Reference numeral 13 represents an object lens. The object lens 13 condenses light reflected from the inclined-right mirror 12 on the optical disk 2. Although the object lens 13 is used in this embodiment, other condensing members such as a hologram and the like may be used. Further, it is natural that the light reflected from the optical disk 2 passes through the object lens 13. The object lens 13 is formed of glass or resin. In this case, when the object lens 13 is formed of resin, it is preferable that the object lens 13 is formed of short-wavelength-light-resistant resin (which is not or hardly degraded by short wavelength light).

Reference numeral 14 represents an achromatic diffraction lens provided between the object lens 13 and the inclined-right mirror 12. The achromatic diffraction lens 14 has a function of correcting a chromatic aberration. The achromatic diffraction lens 14 is provided so as to reduce a chromatic aberration occurring in each optical part through which short-wavelength light passes. Basically, the achromatic diffraction lens 14 is constructed by forming a desired hologram on a lens, and the correction degree of chromatic aberration can be determined by adjusting at least one of a grating pitch of the hologram and the curvature radius of the lens. The achromatic lens 14 is formed of resin such as plastic or glass. When resin is used, it is preferable that the achromatic lens 14 is formed of short-wavelength-light-resistant resin (which is not or hardly degraded by short wavelength light).

The specific disposition of the optical system constructed in such a manner will be described with reference to FIG. 2.

Figure 2:
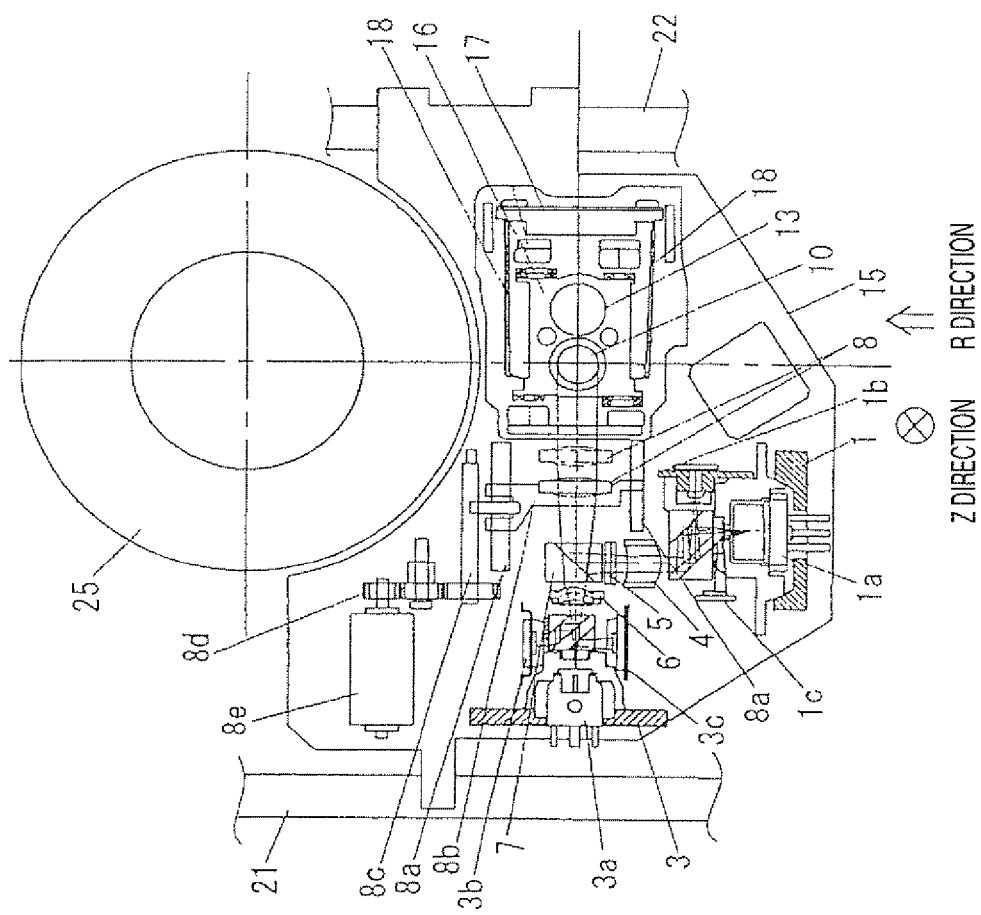
FIG. 2 is a diagram showing the optical pickup device according to the embodiment of the invention.

FIG. 2 illustrates an example where the optical construction shown in FIG. 1 is embodied. Although members thereof have a slightly different shape from the respective members shown in FIG. 1, functions thereof are the substantially same.

Reference numeral 15 represent a base. On the base 15, the above-described respective members are fixed or movably attached. The base 15 is formed of metal or metallic alloy, such as zinc, a zinc alloy, aluminum, an aluminum alloy, titanium, a titanium alloy or the like. Preferably, the base 15 is manufactured using a die casting method in terms of mass production. The base 15 is movably held by a pickup module shown in FIGS. 3 and 4.

Figure 3:
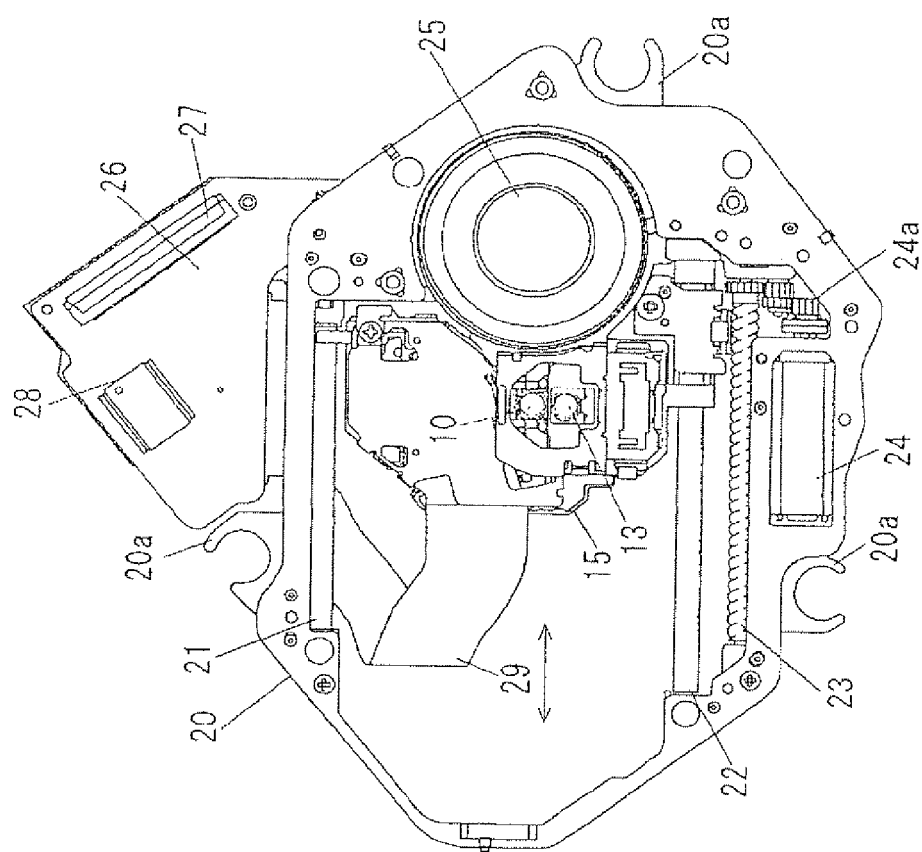
FIG. 3 is a diagram showing a module on which the optical pickup device according to the embodiment of the invention is mounted.
Figure 4:
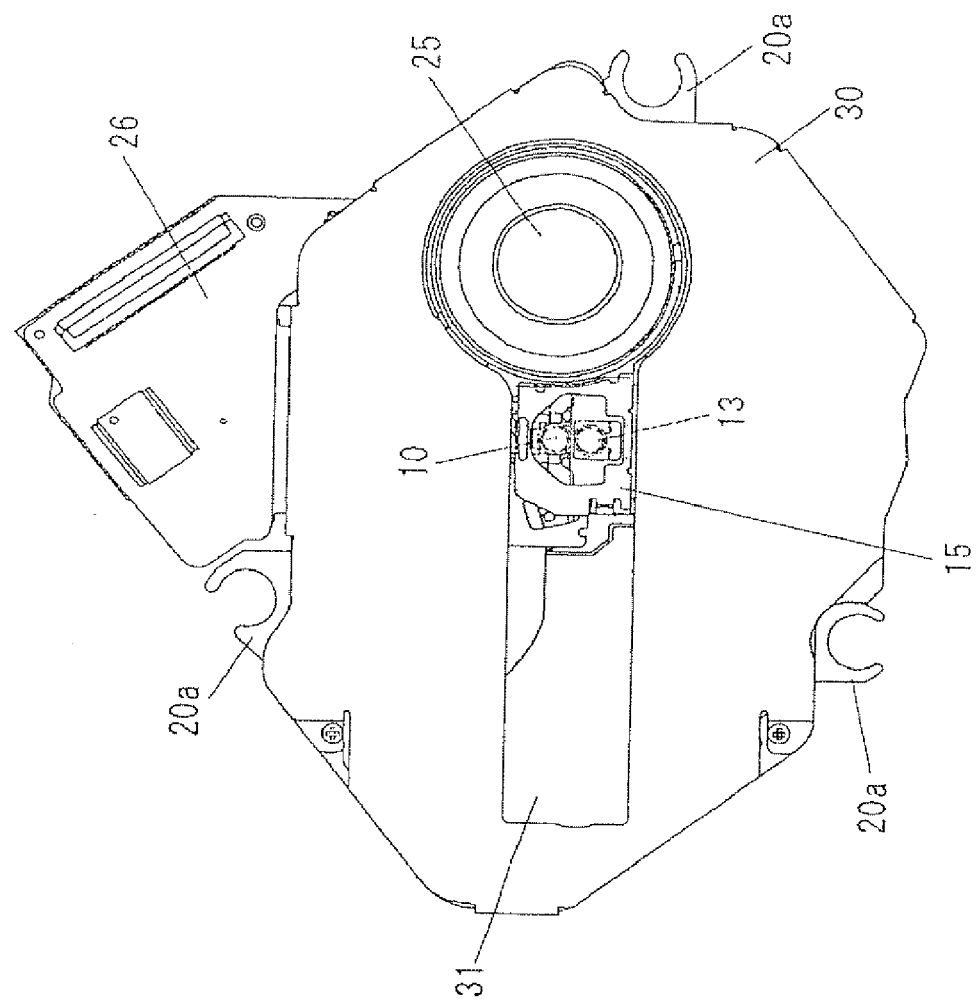
FIG. 4 is a diagram showing a module on which the optical pickup device according to the embodiment of the invention is mounted.

Reference numeral 20 represents a frame. In FIGS. 3 and 4, the frame 20 has shafts 21 and 22 disposed in parallel to each other. The base 15 is movably attached to the shafts 21 and 22. Further, in the side of the shaft 22 opposite to the shaft 21, a screw shaft 23 provided with a helical groove is attached substantially parallel to the shafts 21 and 22 so as to freely rotate around the frame 20. Although not shown in detail, a member provided integrally with or separately from the base 15 is geared into the groove provided on the screw shaft 23. The screw shaft 23 is geared with a gear group 24a which is rotatably provided in the frame 20, and the gear group 24a is geared with a feed motor 24. Accordingly, when the feed motor 24 rotates, the gear group 24a rotates. In accordance with the rotation, the screw shaft 23 is rotated. As the screw shaft 23 is rotated, the base 15 can reciprocate in an arrow direction shown in FIG. 3. At this time, the feed motor 24 is disposed substantially parallel to the screw shaft 23. Further, the frame 20 has the optical disk 2 mounted thereon, and a spindle motor 25 for rotating the optical disk 2 is attached by such a technique as screw fastening or bonding.

Supplementarily, a control board 26 is provided separately from the frame 20, as shown in FIG. 3. The control board 26 and the base 15 are electrically coupled through a flexible board 29, and the control board 26 is also electrically connected to the spindle motor 25 by a member which is not shown. The control board 26 is provided with a connector 27 which performs electric connection with the control board provided in the optical disk drive. A flexible board (not shown) or the like is plugged in the connector 27, thereby performing electrical connection.

As shown in FIG. 4, a frame cover 30 having a function of protecting members may be provided at least in the side of the frame 20 opposite to the optical disk. The frame cover 30 is provided with a through-hole 31, from which at least the object lenses 10 and 13 are exposed in the base 15 and the spindle motor 25 projects by a predetermined amount. Further, in FIGS. 3 and 4, the frame 20 is provided with an attachment section 20a for fixing the frame 20 to another member, and a screw or the like is inserted into the attachment section 20a so as to attach the frame 20 to another member.

In FIG. 2, the short wavelength optical unit 1, the long wavelength optical unit 3, the beam shaping lens 4, the optical part 5, the relay lens 6, the beam splitter 7, the support member 8a, the lead screw 8c, the gear group 8d, the driving member 8e, the inclined-right mirrors 9 and 12 and the like are bonded to the base 15 by using an organic adhesive such as a light-curing adhesive or epoxy-based adhesive or a metallic adhesive such as solder or lead-free solder. Alternately, they are attached to the base 15 by a technique such as screw fastening, fitting, pressing-in or the like.

The lead screw 8c and the gear group 8d are rotatably attached to the base 15.

Reference numeral 17 represents a suspension holder. The suspension holder 17 is attached to the base 15 by various bonding techniques through a yoke member to be described below. The lens holder 16 and the suspension holder 17 are coupled to each other through a plurality of suspensions 18.

Figure 5:
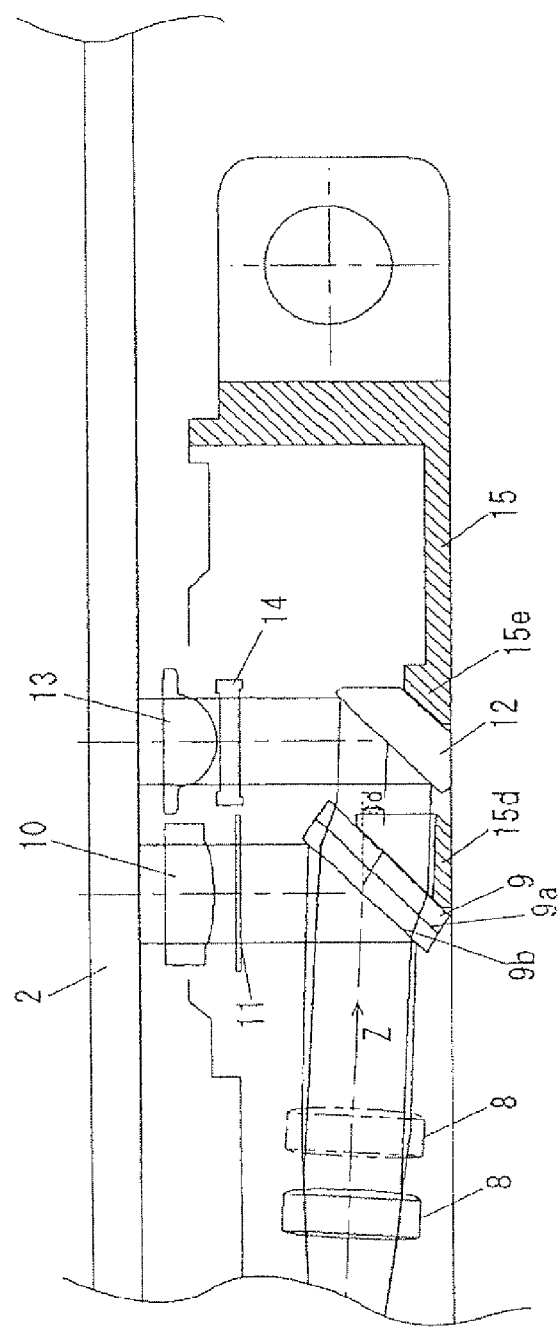
FIG. 5 is a diagram showing a portion of the optical pickup device according to the embodiment of the invention.

The lens holder 16 is supported so as to move in a predetermined range with respect to the base 15. The object lens 10 and 13, the optical part 11, the achromatic diffraction lens 14 and the like are attached to the lens holder 16. In accordance with the movement of the lens holder 16, the object lens 10 and 13, the optical part 11, the achromatic diffraction lens 14 and the like are moved together with the lens holder 16. As shown in FIG. 5, the inclined-right mirrors 9 and 12 are attached to protuberating portions 15d and 15e, respectively, by a light-curing resin or instant adhesive, the protuberating portions 15d and 15e being provided so as to protuberate on the base 15. When the inclined-right mirror 9 is attached to the protuberating portion 15d, a bonding position between the inclined-right mirror 9 and the protuberating portion 15d is considered so as not to block light passing through the inclined-right mirror 9. Since the inclined-right mirrors 9 and 12 are provided so as to be positioned under the lens holder 16, they are not shown in FIG. 2.

The inclined-right mirror 9 is provided to be inclined with respect to the light flux which is emitted from the short wavelength optical unit 1 so as to pass through the beam splitter 7 and the collimator lens 8. Therefore, the light flux coming from the short wavelength optical unit 1 is refracted when passing through the inclined-right mirror 9. Then, the light flux moves in a direction away from the object lenses 10 and 13 by a distance d shown in FIG. 5.

As shown in FIG. 5, the object lenses 10 and 13 are disposed in an order of the object lens 10 and the object lens 13 along the direction where light emitted from the short wavelength optical unit 1 or long wavelength optical unit 3 so as to pass through the beam splitter 7 or the collimator lens 8 proceeds. The thickness of the object lens 13 on the lens axis is larger than that of the object lens 10. In other words, in the lens holder 16, the object lenses 10 and 13 are disposed in an order of the object lens 13 and the object lens 10 from the side of the suspension holder 17, as shown in FIG. 6.

As the object lenses 10 and 13 are disposed in such a manner, a light flux is not blocked by the object lens 13 or the achromatic diffraction lens 14 even though the lens holder 16 is driven up and down. Therefore, it is possible to make the optical pickup device slim.

Figure 6:
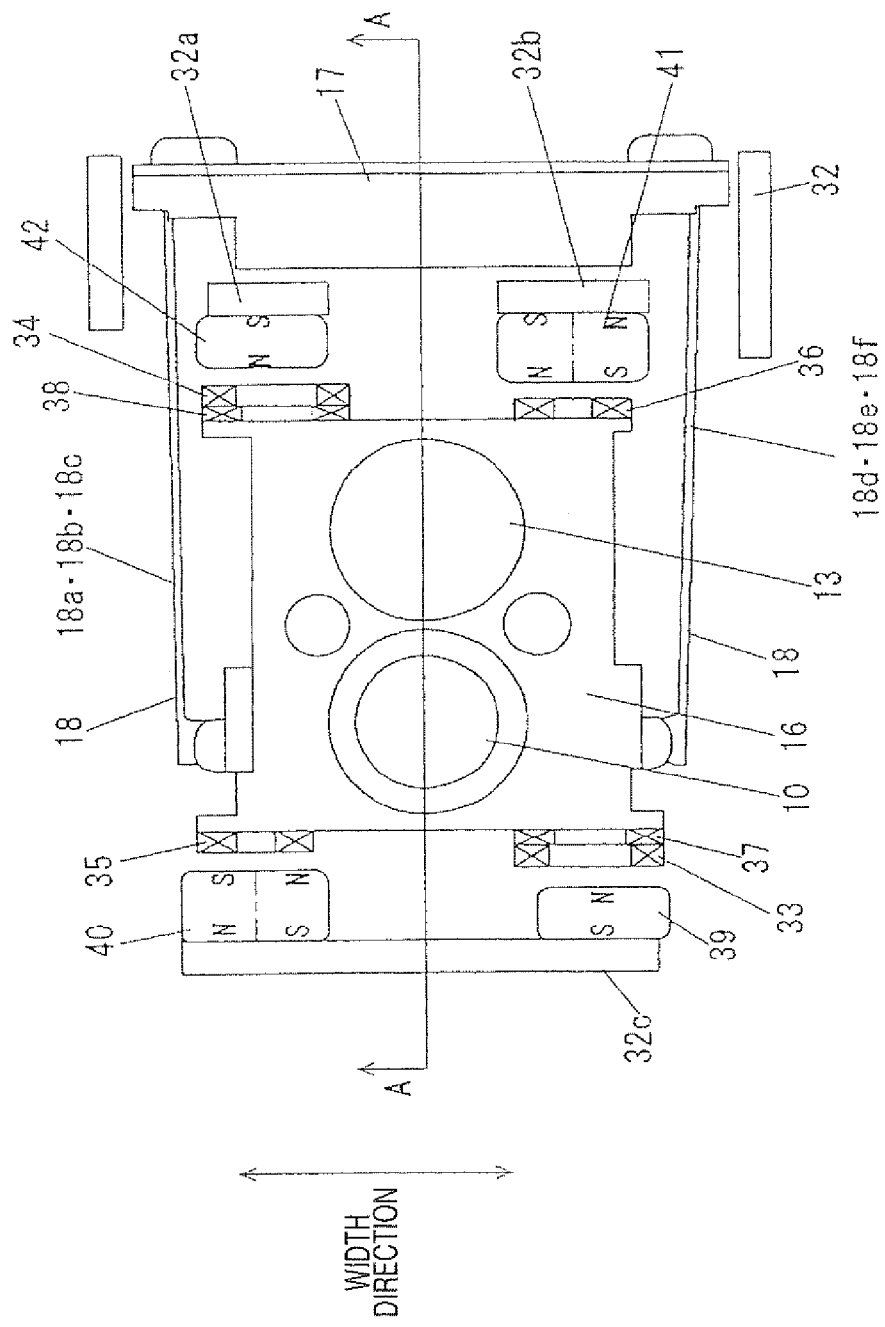
FIG. 6 is a diagram showing a portion of the optical pickup device according to the embodiment of the invention.
Figure 7:
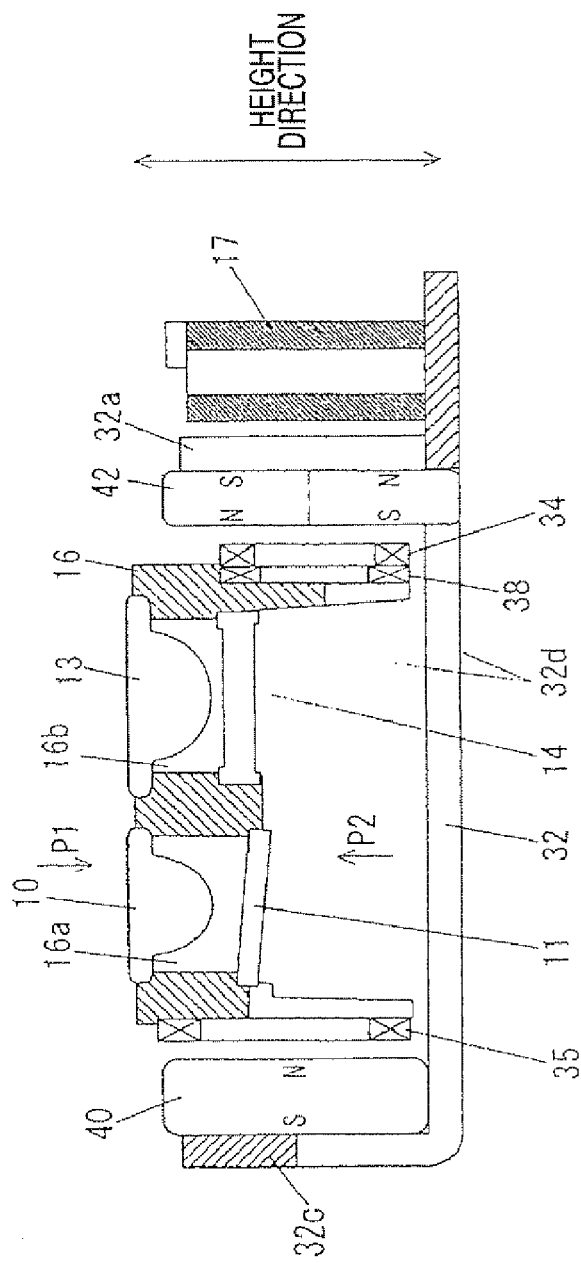
FIG. 7 is a diagram showing a portion of the optical pickup device according to the embodiment of the invention.
Figure 8:
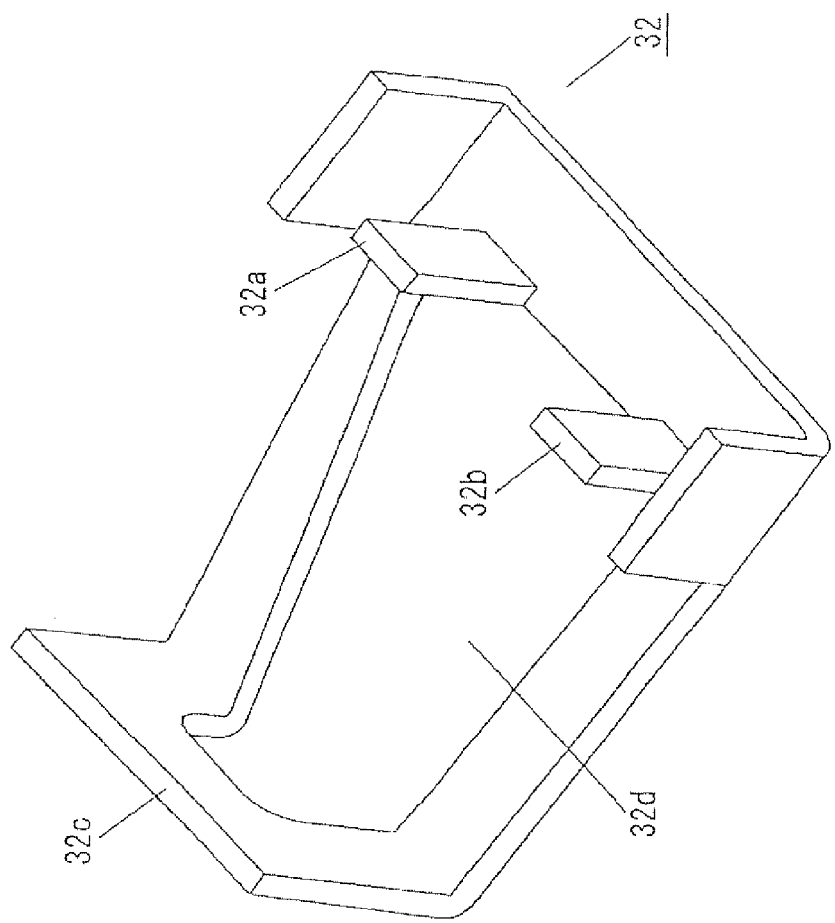
FIG. 8 is a diagram showing a portion of the optical pickup device according to the embodiment of the invention.

Referring to FIGS. 6 to 8, the construction around the lens holder 16 will be described. FIG. 7 is a sectional view taken along A-A line of FIG. 6 showing the optical pickup device according to this embodiment.

As shown in FIG. 7, the lens holder 16 is provided with through-holes 16a and 16b. The object lenses 10 and 13 are brought down into the through-holes 16a and 16b, respectively, from a direction of an arrow P1 shown in FIG. 7 and are then fixed by a light-curing adhesive or the like. At this time, the outer circumferences of the object lenses 10 and 13 are abutted on the circumferential edges of the through-holes 16 and 16b of the lens holder 16, respectively. Further, the optical part 11 and the achromatic lens 14 are inserted into the through-holes 16a and 16b, respectively, from a direction of an arrow P2 shown in FIG. 7 and are also fixed by a light-curing adhesive or instant adhesive. At this time, the outer circumferences of the optical part 11 and the achromatic diffraction lens 14 are abutted on the circumferential edges of the through-holes 16a and 16b of the lens holder 16.

Reference numerals 33 and 34, respectively, represent a focus coil. As shown in FIG. 6, the respective focus coils 33 and 34 are wound in a substantial ring shape and are provided in diagonal positions of the lens holder 16. Reference numerals 35 and 36, respectively, represent a tracking coil. The respective tracking coils 35 and 36 are also wound in a substantial ring shape and are provided in different diagonal positions of the lens holder 16. Between the focus coils 33 and 34 and the lens holder 16, sub-tracking coils 37 and 38 are respectively provided. With the sub-tracking coils 37 and 38 being provided, it is possible to suppress unnecessary inclination of the lens holder occurring on tracking. The sub-tracking coils 37 and 38 are bonded to the lens holder 16 by an organic adhesive such as a heat-curing adhesive or the like. Then, the focus coils 33 and 34 may be bonded on the sub-tacking coils 37 and 38 by an adhesive or the like. Further, a bonding body in which the sub-tracking coil 37 and the focus coil 33 are previously bonded may be bonded to the lens holder 16. Preferably, a heat-curing adhesive is used for bonding between the coils and the lens holder 16 or bonding between the coils. However, a light-curing adhesive or other adhesives may be used for bonding. Further, if the coils and the lens holder or the coils can be reliably disposed in predetermined positions, other methods may be used for bonding.

Three of the suspensions 18 are provided in each side of the lens holder such that the lens holder 16 is interposed therebetween. The suspensions 18 elastically connect the suspension holder 17 and the lens holder 16. At least the lens holder 16 can be displaced in a predetermined range with respect to the suspension holder 17. In this embodiment, although three of suspensions 18 are provided in one side (six in total), a larger number (for example, eight) of suspensions 18 may be provided, or a smaller number (for example, four) of suspensions 18 may be provided. For convenience, three of the suspensions 18 positioned in the upper side of FIG. 6 are respectively set to suspensions 18*a*, 18*b*, and 18*c* from the side opposite to the optical disk 2, and three of the suspensions 18 positioned in the lower side of FIG. 6 are respectively set to suspensions 18*d*, 18*e*, and 18*f* from the side opposite to the optical disk 2. Both ends of the suspension 18 are fixed to the lens holder 16 and the suspension holder 17, respectively, by insert molding.

Hereinafter, an example of wiring lines between the suspensions 18 and the respective coils provided in the lens holder 16 will be described. That is, an electric current flows in the respective coils provided in the lens holder 16 through the suspensions 18.

Both ends of the focus coil 33 are electrically connected to the suspensions 18*a* and 18*b*, respectively, and both ends of the focus coil 34 are electrically connected to the suspensions 18*d* and 18*e*, respectively. Further, the tracking coil 35, the sub-tracking coil 37, tracking coil 36, and the sub-tracking coil 38 are connected in series. One end of the coil group connected in series is connected to the suspension 18*c*, and the other end of the coil group is connected to the suspension 18*f*. The ends of the respective coils and the suspensions 18 are electrically connected by a metallic bonding material such as solder or lead-free solder.

The suspensions 18 may be composed of wire of which the cross-section is formed in a substantially circular or elliptical shape or in a polygonal shape such as a rectangle. Further, a plate spring may be processed into the suspension 18. The suspension 18 is formed in a reverse V-shape, if it is seen from the light emission direction of the object lenses 10 and 13 with the suspension holder 17 being set in the lower side. In the suspension 18, tension is applied. Accordingly, it is possible to reduce the size and the resonance of the suspension 18 in a buckling direction.

Reference numeral 32 represents a yoke member formed of Fe or a Fe alloy. If Fe or a Fe alloy is used, it is easy to construct a magnetic circuit. The yoke member 32 is integrally provided with upright portions 32*a*, 32*b*, and 32*c* facing the respective coils provided in the lens holder 16 by a cutting and raising process. Further, on the lower surface of the yoke member 32, an opening portion 32*d* is provided.

From the opening portion 32*d*, the inclined-right mirrors 9 and 12 fixed to the base 15 enter. Further, the suspension holder 17 is fixed on the yoke member 32 by a technique such as bonding, and the yoke member 32 is bonded to the base 15 by a technique such as bonding.

Reference numerals 39 to 42 are magnets provided on the yoke member 32 by a technique such as bonding or the like.

The magnet 39 is attached to the upright portion 32*c* and is provided so as to face the focus coil 33 and the sub-tracking coil 37. Further, the magnet 39 is disposed in the yoke member 32 and is magnetized so that a magnetic pole thereof is exposed on the surface facing the focus coil 33 and the sub-tracking coil 37 in an order of the S pole and the N pole in the height direction of FIG. 7 from the bottom surface toward the object lenses 10 and 13.

The magnet 40 is attached in the side opposite to the side, where the magnet 39 of the upright portion 32*c* is attached, in the width direction shown in FIG. 6. Further, the magnet 40 is provided so as to face the tracking coil 35. In this embodiment, the upright portion 32*c* is widely formed in the width direction shown in FIG. 6, in order to increase rigidity of the yoke member 32. However, the upright portion 32*c* may be divided into two portions such that the magnet 39 is attached to one of them by bonding or the like and the magnet 40 is attached to the other. Further, the magnet 40 is disposed in the yoke member 32 and is magnetized so that a magnetic pole thereof is exposed on the surface facing the tracking coil 35 in an order of the N pole and the S pole from the inside in the width direction shown in FIG. 6.

The magnet 41 is attached on the upright portion 32*b* and is provided so as to face the tracking coil 36. Further, the magnet 41 is disposed in the yoke member 32 and is magnetized so that a magnetic pole thereof is exposed on the surface facing the tracking coil 36 in an order of the N pole and the S pole from the inside in the width direction shown in FIG. 6.

The magnet 42 is attached on the upright portion 32*a* and is provided so as to face the focus coil 34 and the sub-tracking coil 38. Further, the magnet 42 is disposed in the yoke member 32 and is magnetized so that a magnetic pole thereof is exposed on the surface facing the focus coil 34 and the sub-tracking coil 38 in an order of the S pole and the N pole in the height direction of FIG. 7 from the bottom surface toward the object lenses 10 and 13.

Hereinafter, the details of the respective sections will be described.

Figure 9:
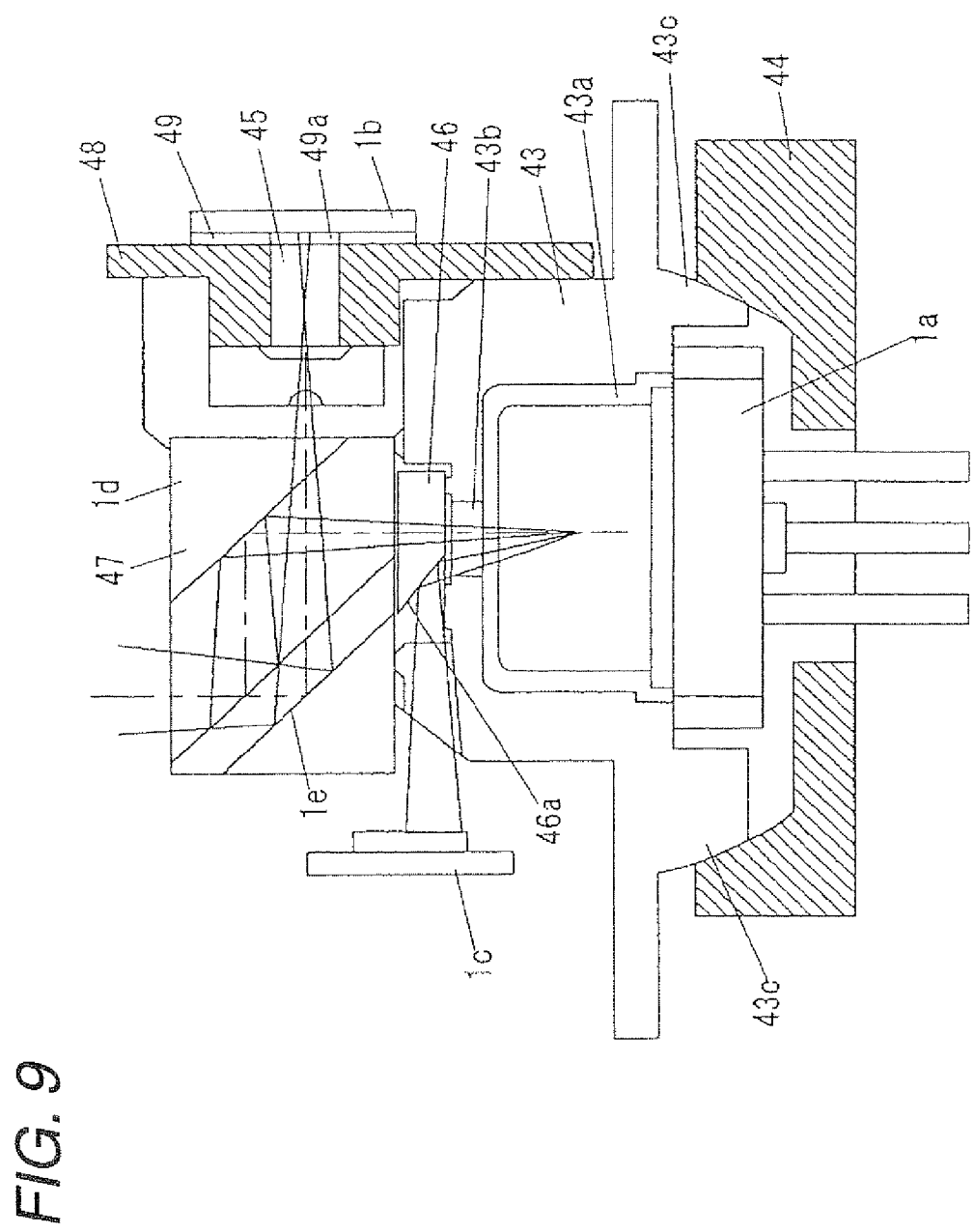
FIG. 9 is a diagram showing a portion of the optical pickup device according to the embodiment of the invention.
Figure 10:
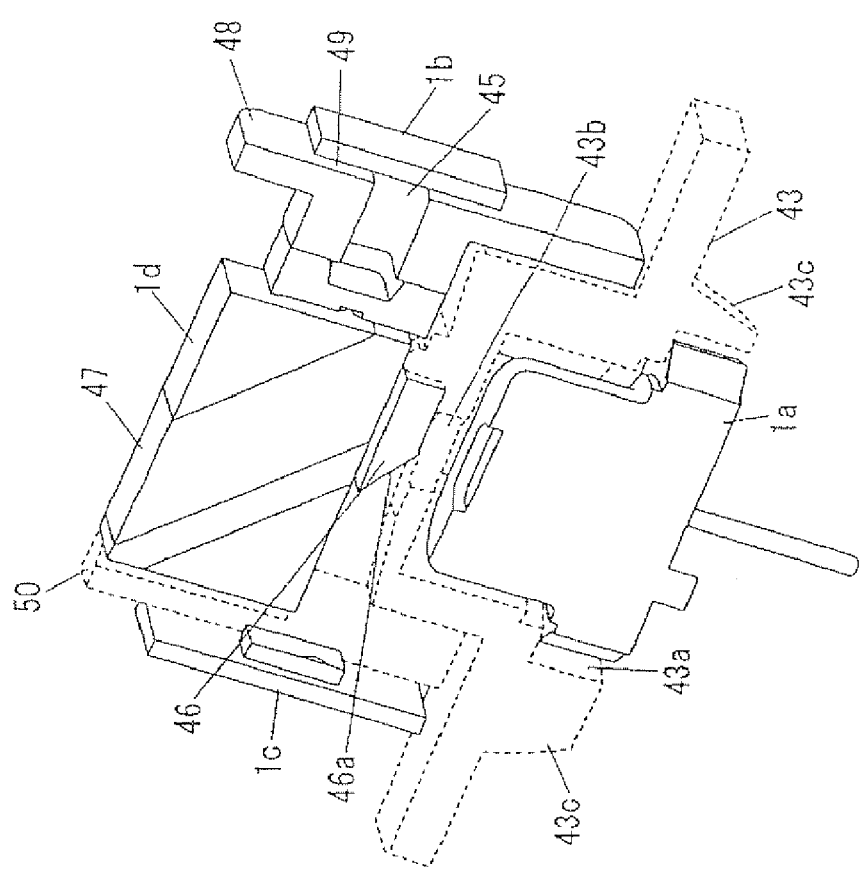
FIG. 10 is a diagram showing a portion of the optical pickup device according to the embodiment of the invention.

First, the short wavelength optical unit 1 will be described with reference to FIGS. 9 and 10. FIG. 9 clearly shows a dispositional relationship between the respective sections, and FIG. 10 is a sectional view of the short wavelength optical unit 1.

At least the light source section 1*a*, the light receiving sections 1*b* and 1*c*, and the optical member 1*d* are directly or indirectly attached to a loading section 43. Further, the back end of the loading section 43 is attached to a holding member 44. The attachment portion 43*c* of the loading section 43 with respect to the holding member 44 is formed in a convexly curved shape, and similarly, the attachment portion of the holding member 44 with respect to the loading section 43 is formed in a concavely curved shape. The loading section 43 is combined with the holding member 44. Further, as the curved-shaped portions thereof are moved so as to slide, the loading section 43 and the holding member 44 are positioned in a desired positional relationship. After that, the loading section 43 and the holding member 44 are fixed to each other by a metallic adhesive such as solder or an organic adhesive.

The loading section 43 is provided with a light source housing section 43*a* which can house at least a portion of the light source section 1*a*. After being housed in the light source housing section 43*a*, the light source section 1*a* is bonded by a bonding material so as not to be detached from the light source housing section 43*a*. Further, a through-hole 43*b* is provided in a portion facing the light-emitting portion of the light source section 1*a* so as to communicate with the light source housing section 43*a*. The light emitted from the light source section 1*a* passes through the through-hole 43*b* so as to be guided to the optical member 1*d*. Although the details of the optical member 1*d* will be described below, the optical member 1*d* includes at least an optical section 46 having an inclined surface 46*a* and an optical section 47 having a plurality of inclined surfaces formed therein. The loading section 43 has a light receiving section attaching portion 48 integrally formed, the light receiving section attaching portion 48 facing the optical member 1*d*. The light receiving section attaching portion 48 is provided with a through-hole 45. In the side of the light receiving section attaching portion 48 opposite to the optical member 1*d*, the light receiving section 1*b* is attached through a flexible printed board 49 by a technique such as bonding. Although the flexible printed board 49 is omitted and is shown in FIG. 9 or 10, the flexible printed board 49 electrically connects the light receiving section 1*b* to another member and is provided with a through-hole 49*a*. The light from the optical member 1*d* is guided to the light receiving section 1*b* through the through-holes 45 and 49*a*. Further, as evident from FIG. 10, a light receiving section attaching portion 50 is integrally provided in the loading section 43 so as to face the light receiving section attaching portion 48, and the optical member 1*d* is disposed between the light receiving section attaching portions 48 and 50. The light receiving section attaching portion 50 is provided with a through hole (not shown), and the light receiving section 1*c* is attached to the light receiving section attaching portion 50 by a technique such as bonding. The light from the optical section 46 passes through the through-hole of the light receiving attaching portion 50 (not shown) so as to be incident on the light receiving section 1*c*.

Figure 11:
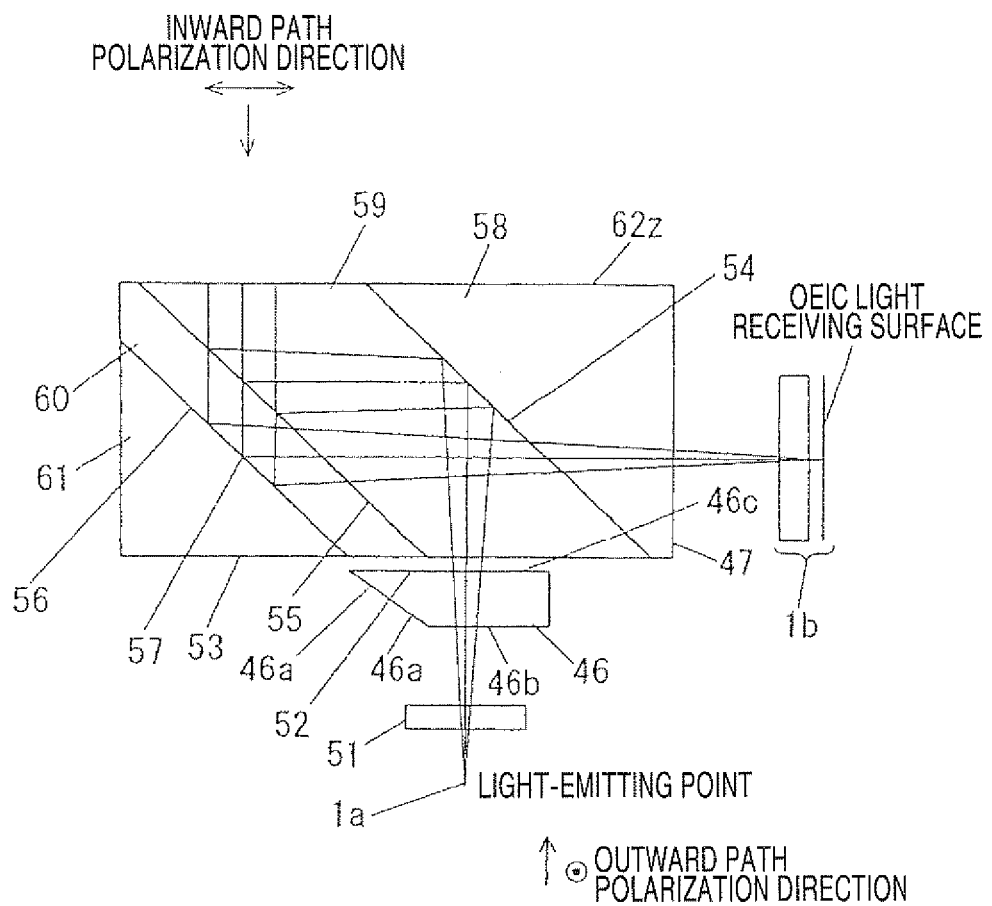
FIGS. 11a and 11b are diagrams showing a portion of the optical pickup device according to the embodiment of the invention.
Figure 11:
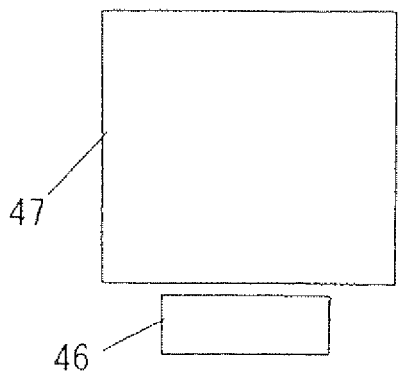

Next, the optical sections 46 and 47 of the optical member 1*d* will be described in detail with reference to FIG. 11.

The short-wavelength light emitted from the light-emitting point of the light source section 1*a* is guided to the optical section 46 through a cover glass 51 provided in a portion serving as a light-emission window of the light source section 1*a*. The light incident on a plane 46*b* provided substantially parallel to the cover glass 51 of the optical section 46 passes through the optical section 46, and the light incident on the inclined surface 46*a* inclined to the plane 46*b* is reflected so as to be incident on the light receiving section 1*c* (which is not shown in FIG. 11). The lights are used for monitoring an optical output. On the inclined surface 46*a*, a reflecting section is formed of a dielectric multilayer or metallic film. Most of light passing through the optical section 46 passes through a plane 46*c* provided substantially parallel to the plane 46*b* so as to be guided to the optical section 47. The plane 46*c* has a dimming filter (not shown) formed thereon, and light dimmed by the dimming filter is guided to the optical section 47. Although the dimming filter has various transmittances, the transmittance thereof is adjusted by a spread angle of light emitted from the light source section 1*a*. That is, when a spread angle of light from the light source section 1*a* is large, the transmittance of the dimming filter becomes small. Alternately, when a spread angle of light from the light source section 1*a* is small, the transmittance of the dimming filter becomes large. As the transmittance of the dimming filter is adjusted by a spread angle of light from the light source section 1*a*, it is possible to prevent undesired occurrence of data erasing which is caused by excessively intensive light output when recording or reproducing is performed on a single-layer disk or multi-layer disk. Specifically, a spread angle of light emitted from the light source section 1*a* is previously classified into predetermined ranges. Further, a dimming filter having a different transmittance is provided in each of the classified light source sections 1*a*, thereby obtaining an excellent recording/reproducing characteristic with respect to an optical disk. The dimming filter is formed of a dielectric multilayer film or metallic film. When transmittance is adjusted and a dielectric multilayer film is used, it is possible to adjust a constituent material or film construction thereof or a thickness thereof. When a metallic film is used, it is possible to adjust a constituent material or thickness thereof.

The light passing through the plane 46*c* is incident on the optical section 47. Between the optical sections 46 and 47, a gap is provided at a predetermined distance. The optical section 47 is formed in a rectangular parallelepiped shape as a whole. On the bottom surface 53 on which the light from the light source section 1*a* is incident, a light absorbing film having a function of absorbing light is provided except for a predetermined region. The light absorbing film prevents the light emitted from the light source section 1*a* from being incident on the optical section 47 from a place excluding a predetermined portion. At least some of light, which is emitted from the light source 1*a* so as to pass through the optical section 46, is incident on the inside of the optical section 47 from a portion where the light absorbing film of the bottom surface 53 is not disposed.

The optical section 47 is constructed by bonding blocks 58 to 61 formed of transparent glass or the like. An inclined surface 54 is formed on a bonding portion between the block 58 and the block 59, an inclined surface 55 is formed between the block 59 and the block 60, and an inclined surface 56 is formed between the block 60 and the block 61. Inside the optical section 47, at least the inclined surfaces 54, 55, and 56 are provided, and the end portions of the inclined surfaces 54, 55, and 56 are exposed to the surface of the optical section 47. The inclined surface 54 is provided with a first polarized beam splitter, and the inclined surface 55 is provided with a second polarized beam splitter. Although both of the first and second polarized beam splitters are directly formed in the block 59, the first polarized beam splitter may be formed in the block 58 and the second polarized beam splitter may be formed in the block 60. Both of the first and second polarized beam splitters have a function of transmitting p-polarization light (hereinafter, abbreviated to a p-wave) and reflecting s-polarization light (hereinafter abbreviated to an s-wave). Further, at least the first and second polarized beam splitters may be provided in a portion within the optical section 47 through which light mainly passes. In this embodiment, however, the first and second polarized beam splitters are provided on the entire inclined surfaces 54 and 55, in consideration of productivity. On the inclined surface 56, a reflective film and a hologram (the same as the hologram 1*e* shown in FIG. 1) are formed, the hologram 57 generating astigmatism.

The light passing through the bottom surface of the optical section 47 from the light source section 1*a* so as to be incident on the optical section 47 is an s-wave. The light is reflected by the first polarized beam splitter provided on the inclined surface 54 so as to be incident on the second polarized beam splitter formed on the inclined surface 55. As described above, the second polarized beam splitter also reflects an s-wave. Therefore, the light incident on the second polarized beam splitter is reflected so as to be emitted from the top surface 62*z* of the optical section 47 and then passes through the above-described members so as to be guided to the optical disk 2. Further, the light reflected by the optical disk 2 is converted into a p-wave by the action of the quarter wavelength member 9$a$ and is again incident on the optical section 47 from the top surface 62$z$ of the optical section 47. At this time, the portion where the light is emitted from the optical section 47 toward the optical disk 2 and the portion where the light reflected from the optical disk 2 is incident are located in the substantially same position. Since the light reflected by the optical disk 2 so as to return to the optical section 47 is a p-wave as described above, the light is transmitted through the second polarized beam splitter provided on the inclined surface 55 so as to be incident on the inclined surface 56. The inclined surface 56 is provided with the reflective hologram 57 generating astigmatism, and the reflected light from the optical disk 2 is separated in predetermined directions by the hologram 57 such that a focus error signal can be obtained. Since the light reflected by the inclined surface 56 is a p-wave, the light is once again transmitted through the second polarized beam splitter and is then transmitted through the block 59. Further, since the first polarized beam splitter also has a property of transmitting a p-wave as described above, the light is transmitted though the first polarized beam splitter and is then transmitted through the block 58. Further, the light is emitted outside the optical section 47 and is then incident on the light receiving section 1$b$.

Next, an example of the light source section 1$a$ will be described with reference to FIGS. 12 and 13.

Figure 12:
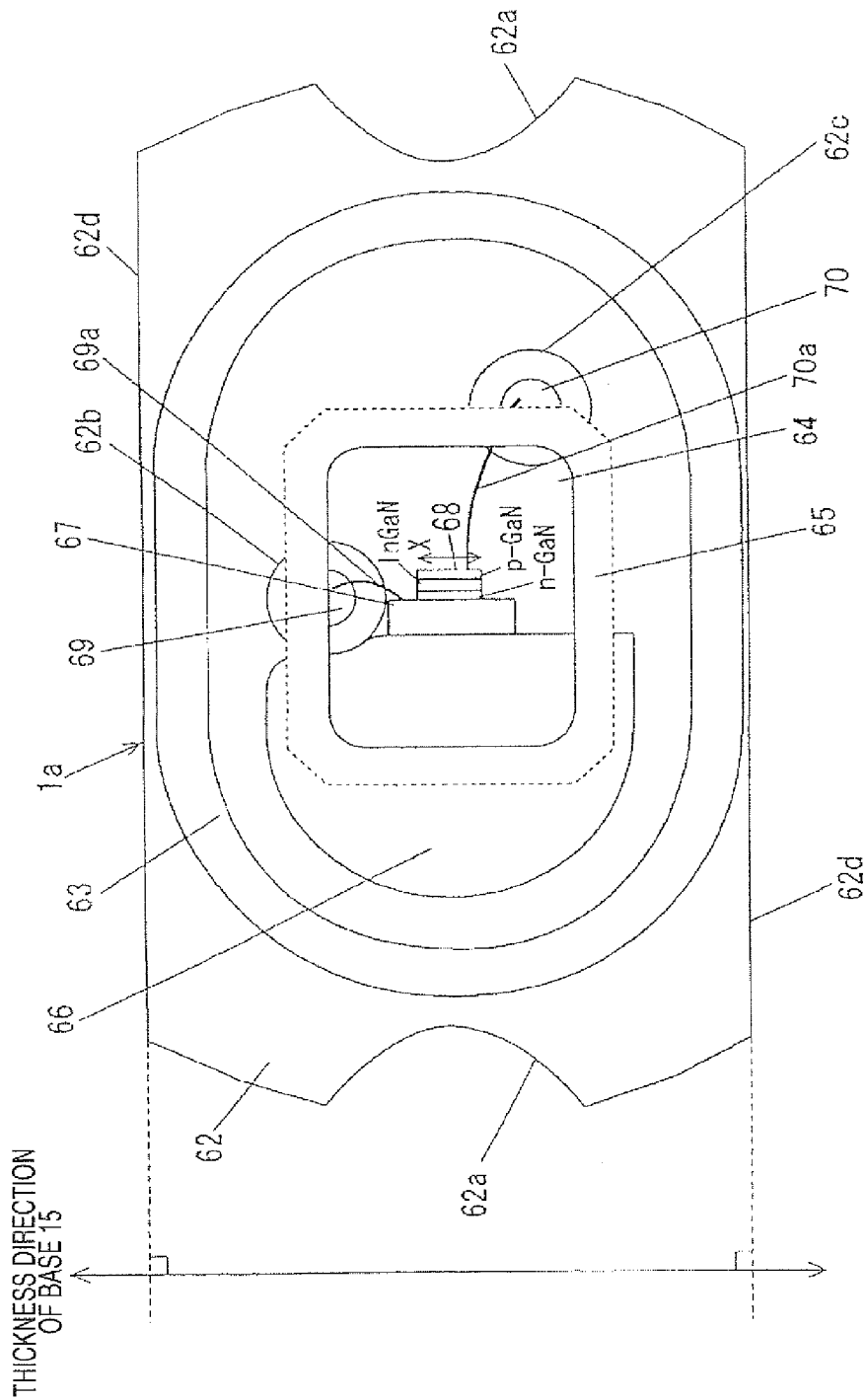
FIG. 12 is a diagram showing a portion of the optical pickup device according to the embodiment of the invention.
Figure 13:
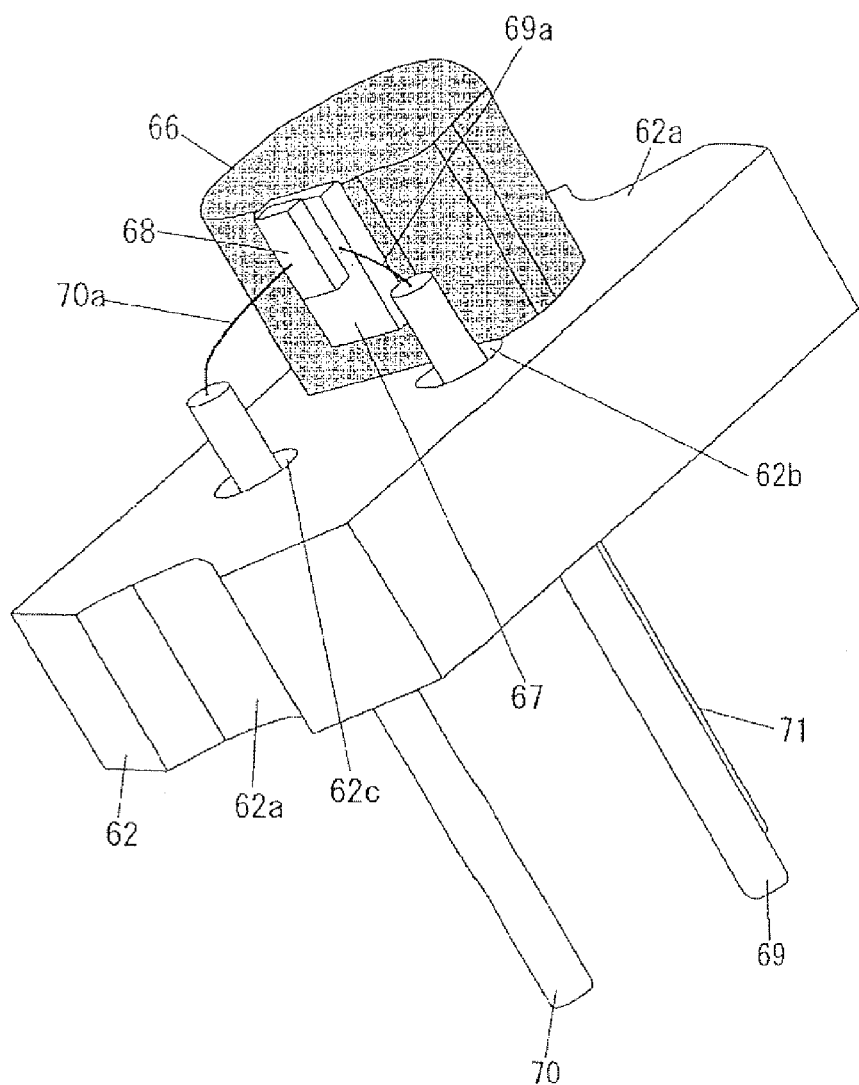
FIG. 13 is a diagram showing a portion of the optical pickup device according to the embodiment of the invention.

As shown in FIGS. 12 and 13, the light source section 1$a$ is composed of the following members. First, the light source section 1$a$ has a base 62 formed of a metallic material. In both of short-side portions of the base 62, a concave portion 62$a$ is provided which is used in adjusting the position of the light source section 1$a$. Further, through-holes 62$b$ and 62$c$ are provided. Although not shown in the drawing, another through-hole is provided in addition to the through-holes 62$b$ and 62$c$. The cover member 63 is bonded to the base 62 by welding or soldering, and a rectangular through-hole 64 is provided on the top surface of the cover member 63 on which a cover glass 65 (the same as the cover glass 51 of FIG. 11) is attached by bonding so as to block the through-hole 64. The cross-section of the cover member 63 is formed in an elliptical or oval shape. In a region surrounded by the base 62 and the cover member 63, a block 66 is provided which is formed of copper or a copper alloy having excellent heat conductivity. The block 66 is bonded to the base 62 by welding or a metallic bonding material. The cross-section of the block 66 is formed in a substantially semi-circular shape. On the flat portion of the block 66, a semiconductor laser element 68 is provided through a sub-mount 67 formed of a metallic material. Accordingly, the sub-mount 67 and the semiconductor laser element 68 as well as the block 66 are disposed within a region surrounded by the base 62 and the cover member 63. Further, the light-emitting surface of the semiconductor laser element 68 is disposed so as to face the cover glass 65, and light is emitted outside from the cover glass 65. In the through-holes 62$b$ and 62$c$ and the other through-hole provided in the base 62, rod-shaped terminals 69, 70, and 71 are respectively inserted. Portions of the terminals 69, 70, and 71, which are inserted into the through-holes 62$b$ and 62$c$ and the other through-hole, are attached to the base 62 though insulating materials such that the insulating between the base 62 and the terminals 69, 70, and 71 is secured. The leading end portions of the terminal 69, 70, and 71 are formed so as to project within the region surrounded by the base 62 and the cover member 63. The terminal 69 and the sub-mount 67 are connected through gold wire 69$a$, and the terminal 69 and the n-type GaN side of the semiconductor laser element 68 are electrically connected through the sub-mount 67. Further, the terminal 70 and the p-type GaN side of the semiconductor laser element 68 are electrically connected through gold wire 70$a$. Accordingly, electric power is supplied to the semiconductor laser element 68 through the terminals 69, 70, and 71, thereby emitting short-wavelength light.

As for the above-described semiconductor laser element 68, it is preferable to use a GaN-based semiconductor laser element in which an active layer (gallium nitride with the emission center, such as In or the like) is provided between a p-type GaN layer and n-type GaN layer. The semiconductor layer element 68 emits light with a wavelength of 400 to 415 nm. It is natural to use a semiconductor laser element based on other materials, which emits different short-wavelength laser.

In the semiconductor laser element 68 having a rectangular parallelepiped shape, the p-type GaN layer, the n-type GaN layer, and the active layer are laminated substantially parallel to a long-side direction X. As for the semiconductor laser element 68, a structure is used, in which the n-type GaN layer, the active layer, and the p-type GaN layer are sequentially laminated from the side of the sub-mount 67. However, another structure may be used, in which the p-type GaN layer, the active layer, and the n-type GaN layer are sequentially laminated from the side of the sub-mount 67. In any case, the laminated direction of the active layer of the semiconductor laser element 68 is not parallel to the long side 62$d$ of the base 62 (in this embodiment, the laminated direction perpendicularly crosses the long side 62$d$). Further, since the long side 62$d$ of the base 62 is attached to the base 15 so as to be perpendicular to the thickness direction of the base 15, the active layer of the semiconductor laser element 68 is laminated substantially parallel to the thickness direction of the base 15. Here, in order to make the optical disk drive slim, the long side 62$d$ of the base 62 is attached so as to be substantially perpendicular to the thickness direction of the base 15. However, in terms of effectively using short-wave laser, the laminated direction of the semiconductor laser element 68 may be substantially parallel to the thickness direction of the base 15.

Figure 14:
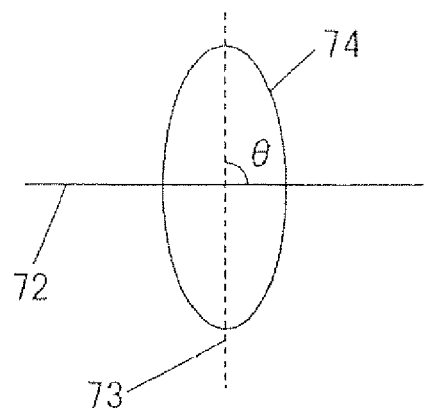
FIGS. 14a, 14b, 14c, 14d, 14e, and 14f are diagrams showing light which is emitted from a light source of the optical pickup device according to the embodiment of the invention.
Figure 14:
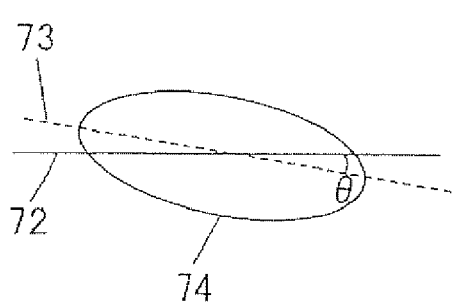
Figure 14:
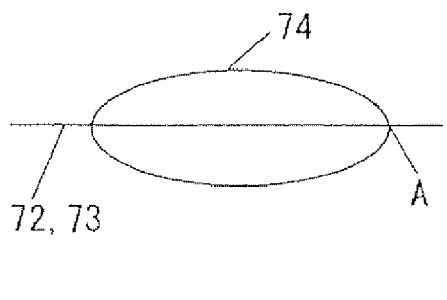
Figure 14:
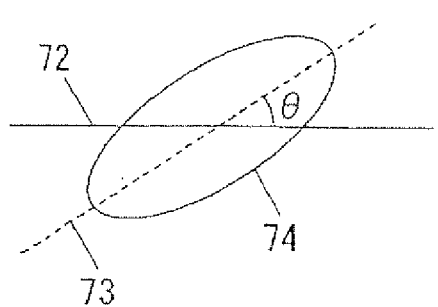
Figure 14:
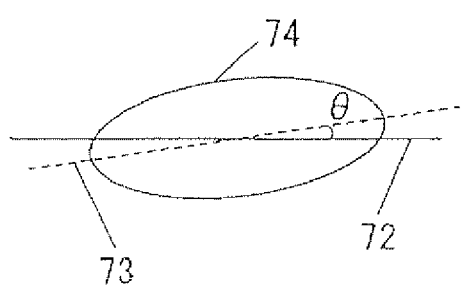
Figure 14:
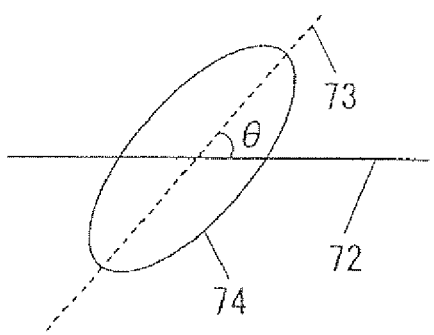

In other words, the long-side portion having a rectangular cross-section is bonded to the sub-mount 67 in the relationship between the base 62 and the semiconductor laser element 68. Therefore, the long side 62$d$ of the base 62 is not parallel to the long-side direction X of the semiconductor laser element 68 (in this embodiment, the long-side direction X perpendicularly crosses the long side 62$d$). In such a construction, the cross-section of light discharged from the semiconductor laser element 68 can be discharged so that the long axis of the elliptical intensity distribution of emitted light is substantially parallel to the long side 62$d$ of the base 62. As shown in FIG. 14, reference numeral 72 represents an axis substantially parallel to the long side 62$d$ of the base 62, reference numeral 74 is an outline of light in which the intensity distribution of light discharged from the semiconductor laser element 68 is indicated by a line where intensity becomes uniform, and reference numeral 73 represents a long axis of the elliptical outline 74 of discharged light. In this embodiment, an angle θ at which the axis 72 and the long axis 73 cross each other is not 90 degrees, as shown in FIG. 14A. However, the axis 72 and the long axis 73 cross each other at different angles, as shown in FIGS. 14B and 14C. The angle θ is defined as the minimum angle among angles at which the axis 72 and the long axis 73 cross each other. That is, the angle θ is more than 0 degree and less than 90 degrees. In other words, the axis 72 and the long axis 73 are parallel to each other, as shown in FIG. 14B, and the long axis 73 and the axis 72 cross each other at predetermined angles θ, as shown in FIGS. 14B to 14F. At this time, it is preferable that the angle θ at which the axis 72 and the long axis 72 cross each other is set to be in the range of 0 to 45 degrees. More preferably, the angle θ is set to be in the range of 0 to 30 degrees. Further, the angle θ is set to be in the range of 0 to 10 degrees. Naturally, it is most preferable that the long axis 73 and the axis 72 become substantially parallel to each other (the angle θ is almost 0 degree), as shown in FIG. 14B. In the above example, the axis 72 is set to be parallel to the long side 62d of the base 62. However, the axis 72 can be also defined in the relationship with other constituent members, as follows. That is, the axis 72 can be defined as an axis which is parallel to the main surface of the mount optical disk 2 and is perpendicular to the direction of light emitted from the cover glass 65 of the light source section 1a. Alternately, the axis 72 can be defined as an axis which is perpendicular to the thickness direction of the base 15 shown in FIG. 2 and is also perpendicular to the direction of light emitted from the cover glass 65 of the light source section 1a. Further, the axis 72 can be defined as an axis which is parallel to the bottom surface of the base 15 and is perpendicular to the direction of light emitted from the cover glass 65 of the light source section 1a. Furthermore, the axis 72 can be defined as an axis which is perpendicular to the rotating shaft of the spindle motor 25 and is also perpendicular to the direction of light emitted from the cover glass 65 of the light source section 1a.

As the long axis in the outline of light emitted from the light source section 1a is set in such a positional relationship, it is possible to increase utilization efficiency of light. If the light source section 1a having the same output is used, it is possible to irradiate light having a larger output onto the optical disk 2. If the intensity of light irradiated on the optical disk 2 is set to the same magnitude, it is possible to use a light source section 1a with a smaller output.

Figure 15:
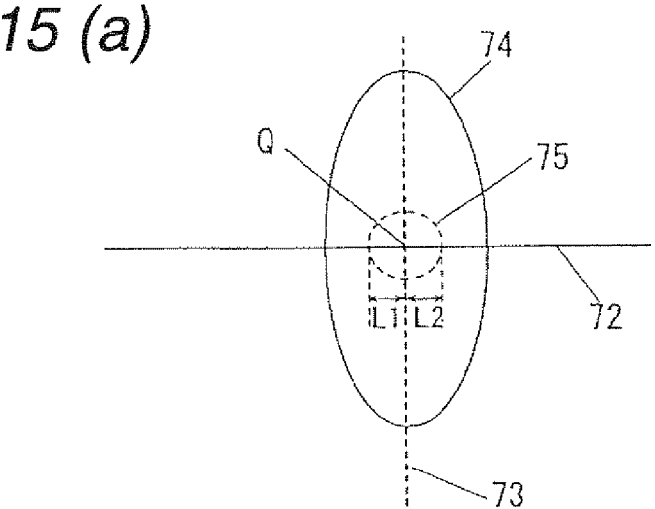
FIGS. 15a and 15b are diagrams showing light which is emitted from the light source of the optical pickup device according to the embodiment of the invention.
Figure 15:
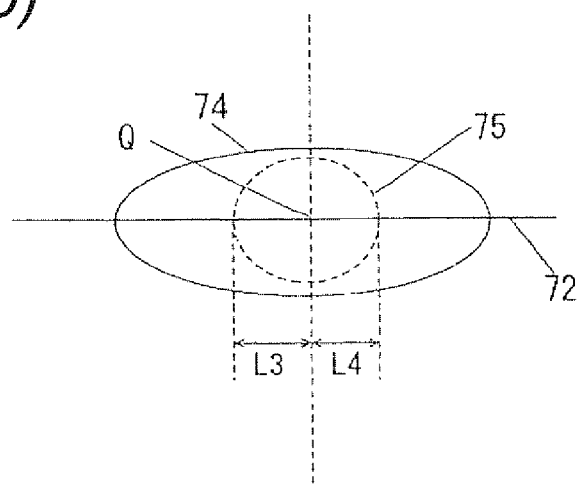

Hereinafter, the principle will be described in detail with reference to FIG. 15.

FIG. 15A shows a case where the axis 72 and the long axis 73 perpendicularly cross each other, that is, a case where the outline is formed in a longitudinally-long elliptical shape. In this case, when the light intensity of the center Q (point where the long axis and the short axis cross each other) of the outline 74 is set to 1, light of a region up to a portion having a predetermined proportion of light intensity in the direction along the axis 72 is used. For example, the predetermined proportion is 0.6 (although the proportion is determined depending on a specification, it is typically in the range of 0.3 to 0.8), and the light of a circular region 75, in which left and right distances from the center Q are set to L1 and L2, can be used. That it, the light of the elliptical region 75 having a diameter of L1+L2 can be used. In this embodiment, since L1 is substantially equal to L2 (L1≈L2), a region of light to be substantially used becomes the circular region 75 with a radius of L1 or L2. In the case of FIG. 15A, the outline is formed in a longitudinally-long elliptical shape. Therefore, the distances L1 and L2 from the center Q to where a light intensity becomes 0.6 of the light intensity at the center Q become relatively small in the direction of the axis 72, and a region with available light intensity is small. In the optimal embodiment shown in FIG. 15B, light of a region up to a portion having a predetermined proportion of light intensity is used. For example, the predetermined proportion is 0.6 (although the proportion is determined depending on a specification, it is typically in the range of 0.3 to 0.8), and the light of a circular region 75, in which left and right distances from the center Q are set to L3 and L4, can be used. That it, the light of the circular region 75 having a diameter of L3+L4 can be used. In this embodiment, since L3 is substantially equal to L4 (L3≈L4), a region of light to be substantially used becomes the circular region 75 with a radius of L3 or L4. In the case of FIG. 15B, the outline 74 is formed in a laterally-long elliptical shape. Therefore, the distances L3 and L4 from the center Q to where a light intensity becomes 0.6 of the light intensity at the center Q become relatively large in the direction of the axis 72, and a region with available light intensity becomes much larger than in the example of FIG. 15A, which makes it possible to effectively use light. That is, the following relationship is established: L1<L3 and L2<L4.

In this embodiment, the long axis 73 of elliptically-shaped light emitted from the light source section 1a is set at a predetermined angle (including 0 degree) with respect to the axis 72, as described above. Therefore, as the long side 62 of the base 62 is attached toward the base 15 as shown in FIGS. 12 and 13, the long axis of the elliptically-shaped light emitted from the light source section 1a can be set to be substantially parallel to the base 15, and the height of the light source section 1a does not become large. Accordingly, it is possible to make the device slim. In this embodiment, it is assumed that the optical disk drive has a thickness of, preferably, less than 18 mm, or more preferably, less than 15 mm, or most preferably, less than 13 mm. Therefore, attaching the light source section 1a at a low level can implement such an optical disk drive. Further, when the axis 72 and the long axis 73 are set at a predetermined angle (larger than 0 degree and less than 90 degrees), the following method is used in order to make the device slim. The light source section 1a itself is rotated at a predetermined angle so as to be attached (in this case, when the light source section 1a is attached, the attachment height becomes slightly large), the block 66 in the light source section 1a is rotated by a predetermined amount so as to be attached to the base 62, or the semiconductor laser element 68 is attached to the block 66 so as to be inclined to the long side 62d.

Next, the long wavelength optical unit 3 will be described with reference to FIG. 16.

A loading section 76 is provided with a light source holding section 76a. The light source 3a is bonded to the light source holding section 76a by a bonding material such as solder, lead-free solder, or light-curing resin. On the light source holding section 76a of the loading section 76, the optical member 3d is attached. Further, the light receiving sections 3b and 3c are attached to the loading section 76 by a bonding material such as light-curing resin so as to interpose the optical member 3d. The light source section 3a covers at least a portion of a lead frame 77 through a molding member 78 such as resin, and a semiconductor laser element 79 is attached on the lead frame 77 to which terminals 77a to 77c are electrically connected. As described above, the semiconductor laser element 79 emitting light with a wavelength of 640 to 800 nm is constructed so as to emit light with one kind of wavelength or a plurality of lights with plural kinds of wavelengths. In this embodiment, the semiconductor laser element 79 is constructed so as to emit a light flux with a wavelength of about 660 nm (red: corresponding to DVD) and a light flux with a wavelength of about 780 nm (infrared: corresponding to CD). The semiconductor laser element 79 as a mono-block element is constructed so as to emit two light fluxes. However, an element emitting one light flux as one block may be provided on the plurality of lead frames 77.

The optical member 3d is composed of two optical sections 80 and 81. The optical section 80 is formed in a plate shape. Although not shown, a film for coping with stray light is formed so that unnecessary light emitted from the light source section 3a does not reach the optical section 81. That is, the film for coping with stray light has an opening such that most of light is guided to the optical section 81 through the opening. Further, the film is formed of such a material that absorbs light incident on a portion excluding the opening. Further, a hologram having a wavelength selection property is provided, which acts on light corresponding to CD but hardly act on light corresponding to DVD. The hologram separates light corresponding to CD into three beams. The optical section 81 is provided on the optical section 80 and is formed by bonding blocks 82 to 85 made of transparent glass. An inclined surface 86 is formed in a bonding portion between the block 82 and the block 83, an inclined surface 87 is between the block 83 and the block 84, and an inclined surface 88 is formed between the block 84 and the block 85. Inside the optical section 81, at least the inclined surfaces 86, 87, and 88 are provided, and the end portions of the inclined surfaces 86, 87, and 88 are exposed to the surface of the optical section 81.

The inclined surface 86 has at least one of a reflective film and hologram provided in a transmitted portion of light such that 3 to 15% of light emitted from the light source section 3a is reflected. Further, the inclined surface 86 has a dielectric multilayer formed thereon. The dielectric multilayer transmits a p-wave of light corresponding to CD and light corresponding to DVD and reflects an s-wave. The light reflected by the inclined surface 86 is incident on the light receiving section 3c so as to be used for controlling an optical output of the light source section 3a. Further, the inclined surface 87 has a dielectric multilayer formed thereon. The dielectric multilayer transmits a p-wave of light corresponding to CD and light corresponding to DVD, reflects an s-wave of light corresponding to CD, and transmits an s-wave of light corresponding to DVD. Further, the inclined surface 88 has a dielectric multilayer or metallic film reflecting light. In this embodiment, the inclined surface 88 is provided with a reflective hologram 3e.

When the light corresponding to CD emitted from the light source section 3a is incident on the optical section 80, stray light thereof is removed, and the light is separated into three beams on the optical disk 2 by the hologram having a wavelength selection property. Further, when the light is incident on the optical section 81 from the optical section 80, some of the light is reflected by the inclined surface 86 so as to be incident on the light receiving section 3c, and the other of the light which is a p-wave passes through the inclined surface 86 so as to be incident on the block 83 and is then guided to the inclined surface 87. In the inclined surface 87, the light corresponding to CD which is a p-wave passes through the block 84 so as to be emitted from the surface of the block 84. Further, the light reflected by the optical disk 2 becomes an s-wave by the action of the quarter wavelength member of the optical part 11 and is again incident on the top surface of the block 84 so as to be incident on the inclined surface 87. Since the inclined surface 87 is provided with a film having a function of reflecting an s-wave of light corresponding to CD, the light corresponding to CD reflected from the optical disk 2 is reflected by the inclined surface 87 so as to be reflected by the inclined surface 88. Further, the light passes through the block 84 so as to be again incident on the inclined surface 87. Since the inclined surface 87 is provided with a film reflecting an s-wave of light corresponding to CD as described above, the light is again reflected by the inclined surface 87 and then passes through the block 84 so as to be guided into the light receiving section 3b. The light incident on the light receiving section 3b is converted into an electrical signal such that an RF signal, a tracking error signal, or a focus error signal is generated. The reflective hologram 3e provided on the inclined surface 88 separates the reflected light from the optical disk 2 into a plurality of lights. The respective lights are guided into a predetermined place of the light receiving section 3b, thereby generating a focus error signal.

When the light corresponding to DVD emitted from the light source section 3a is incident on the optical section 80, stray light thereof is removed, and the light is incident on the optical section 81. The hologram having a wavelength selection property, provided in the optical section 80, does not act on the light corresponding to DVD. Further, when the light is incident on the optical section 81 from the optical section 80, some of the light is reflected by the inclined surface 86 so as to be incident on the light receiving section 3c, and the other of the light passes through the inclined surface 86 so as to be incident on the block 83 and is guided into the inclined surface 87. Since the light corresponding to DVD is a p-wave in the inclined surface 87, the light passes through the block 84 so as to be emitted from the top surface of the block 84. Further, the light reflected by the optical disk 2 becomes an s-wave and is again incident on the top surface of block 84 so as to be incident on the inclined surface 87. Since the inclined surface 87 is provided with a film having a function of transmitting light corresponding to DVD, the light corresponding to DVD reflected from the optical disk 2 passes through the inclined surface 87. Further, the light passes through the block 83 so as to be incident on the inclined surface 86. Since the inclined surface 86 reflects s-wave light corresponding to DVD, the light corresponding to DVD is reflected by the inclined surface 86 and passes through the block 83 so as to be again incident on the inclined surface 87. As described above, however, the inclined surface 87 is provided with a film having a function of transmitting light corresponding to DVD. Therefore, the light passes through the inclined surface 87 so as to be guided into the light receiving section 3b. The light incident on the light receiving section 3b is converted into an electrical signal such that an RF signal, a tracking error signal, or a focus error signal is generated.

Figure 16:
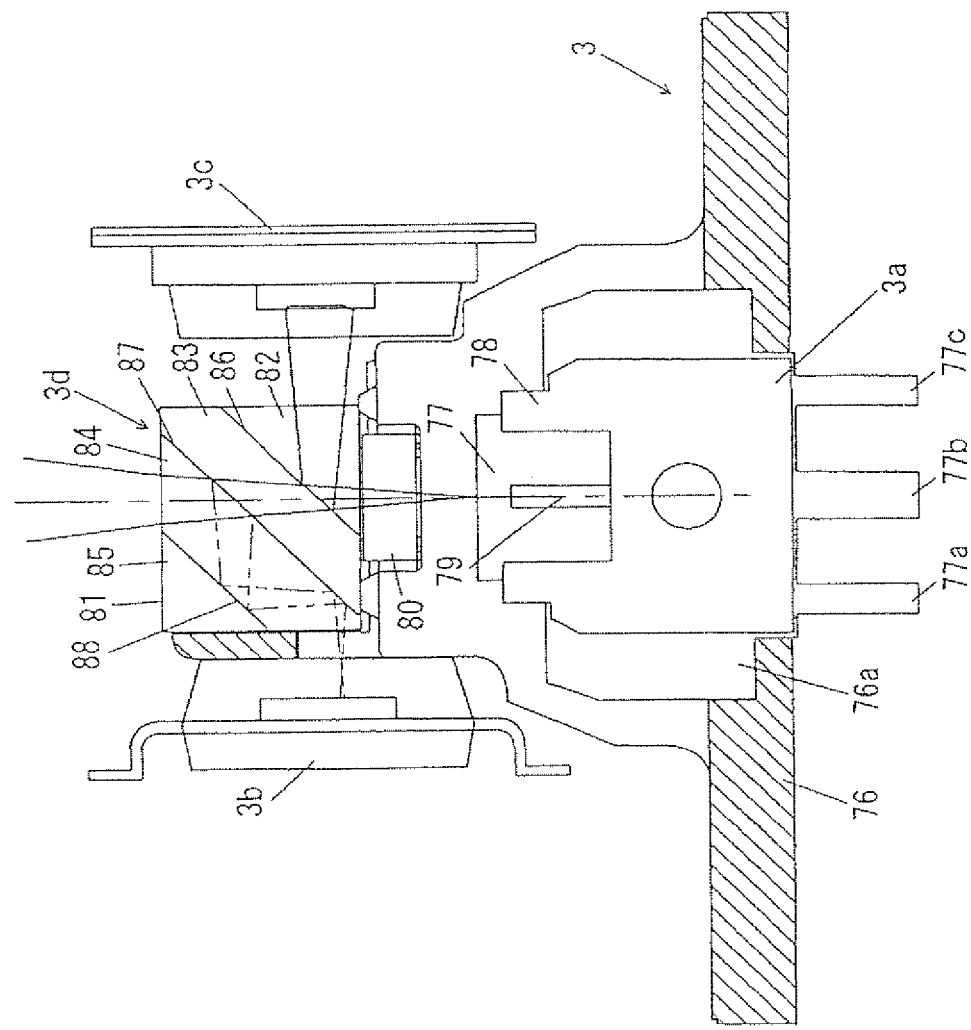
FIG. 16 is a diagram showing a portion of the optical pickup device according to the embodiment of the invention.

FIG. 16 illustrates an inward/outward path of light corresponding to CD.

Next, the beam shaping lens 4 used in this embodiment will be described.

Figure 17:
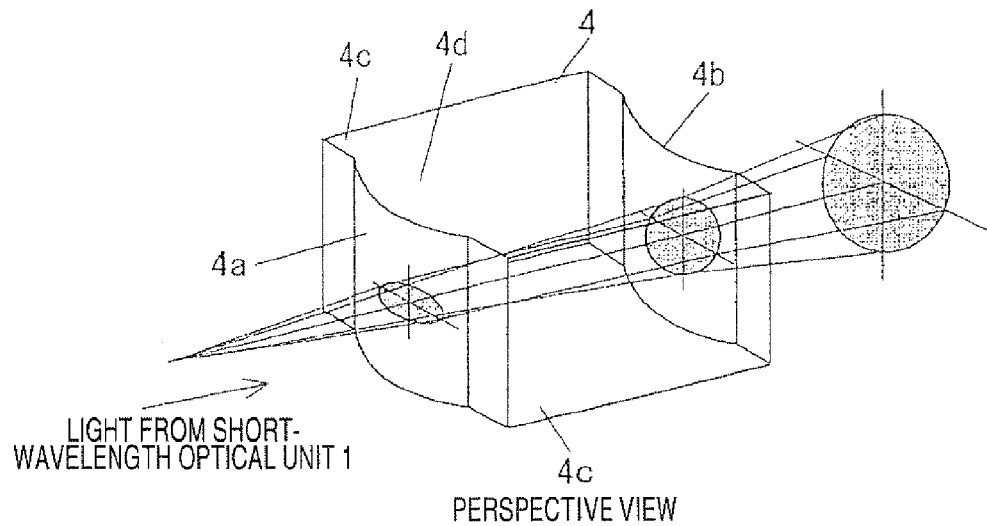
FIGS. 17a, 17b and 17c are diagrams showing a portion of the optical pickup device according to the embodiment of the invention.
Figure 17:
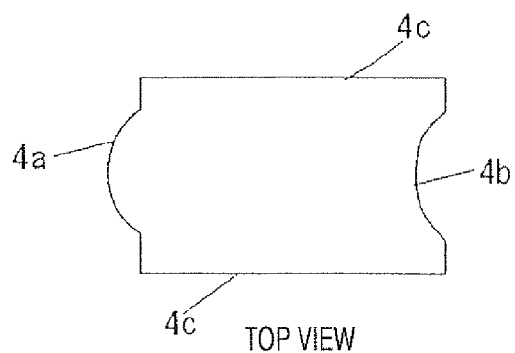
Figure 17:
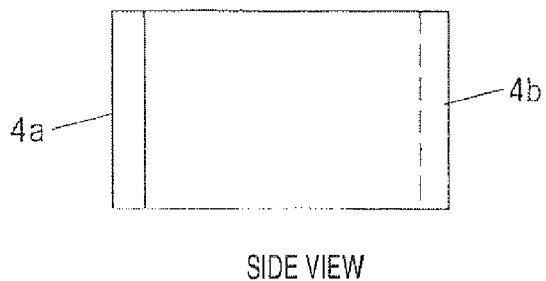

As shown in FIG. 17, the beam shaping lens 4 includes a light transmitting section 4d having a convex portion 4a and a concave portion 4b and attachment portions 4c provided to interpose the light transmitting section 4d. Although the light transmitting section 4d and the attachment portions 4c are integrally molded in this embodiment, the light transmitting section 4b and the attachment portions 4c may be constructed separately so as to be bonded to each other by an adhesive or the like.

As shown in FIG. 17A, short-wavelength light emitted from the short wavelength optical unit 1 has an elliptical cross-sectional shape immediately before being incident on the beam shaping lens 4. However, after passing through the beam shaping lens 4, the light becomes light having a circular cross-sectional shape due to the curvature radius or predetermined curved shape of the convex or concave portion 4a or 4b. Similarly, when the light reflected by the optical disk 2 or the like passes through the beam shaping lens 4, the light having a circular cross-sectional shape is converted into light having an elliptical cross-sectional shape.

Figure 18:
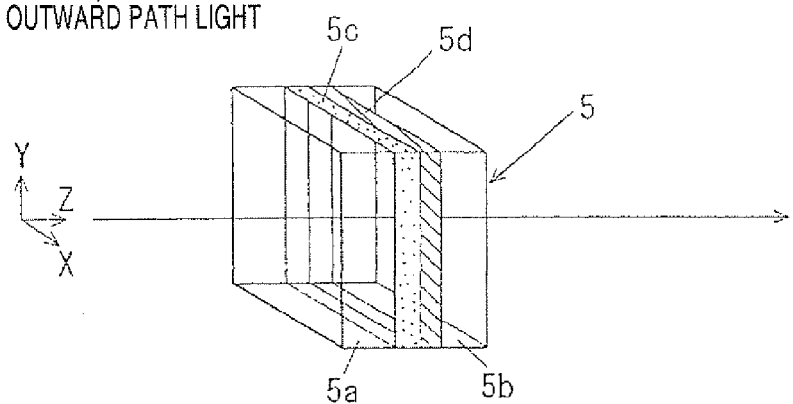
FIGS. 18a, 18b, 18c, and 18d are diagrams showing a portion of the optical pickup device according to the embodiment of the invention.
Figure 18:
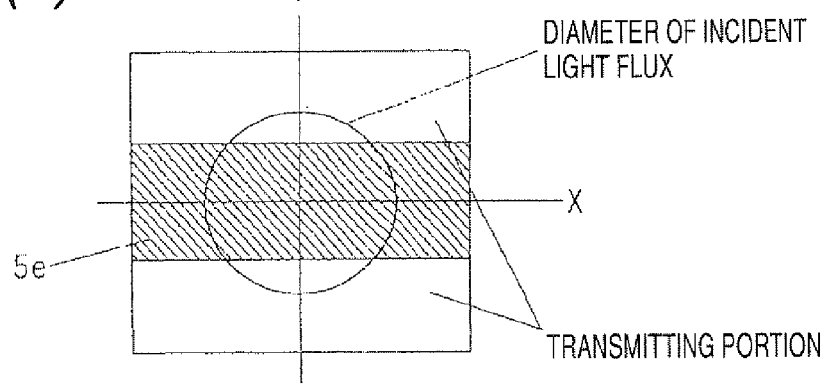
Figure 18:
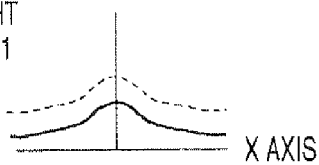
Figure 18:
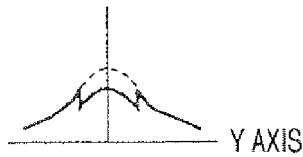

Next, the optical part 5 used in this embodiment will be described with reference to FIG. 18.

The optical part 5 includes substantially square-shaped and plate-shaped substrates 5a and 5b formed of transparent glass and polarizing sections 5c and 5d. The polarizing section 5c and 5d are interposed between the substrates 5a and 5b. The polarizing section 5c actively acts on s-wave light emitted from the short wavelength optical unit 1, but hardly acts on p-wave light reflected by the optical disk 2. Further, the polarizing section 5d hardly acts on s-wave light emitted from the short wavelength optical unit 1, but actively acts on p-wave light reflected by the optical disk 2. In the optical part 5, the light emitted from the short wavelength optical unit 1 sequentially passes through the substrate 5a, the polarizing section 5c, the polarizing section 5d, and the substrate 5b, and the light reflected by the optical disk 2 sequentially passes through the substrate 5b, the polarizing section 5b, the polarizing section 5d, the polarizing section 5c, and the substrate 5a. As shown in FIG. 18B, the polarizing section 5c has a hologram 5e formed in a substantially rectangular shape. The hologram 5e having a wavelength selection property is formed of an optically anisotropic resin material. As shown in FIG. 18B, the hologram 5e is formed in a rectangular shape such that the end of the diameter of an incident light flux protrudes from the long side thereof. Although not shown, the polarizing section 5c is constructed by filling isotropic resin in the hologram 5e. As one manufacturing method, the hologram 5e is manufactured on the substrate 5a by a well-known method, and isotropic resin is filled in the clearance of the hologram 5e. As shown in FIG. 18C, an amount of incident light is indicated by a dotted line in the X axis of FIG. 18B. When light passes through the polarizing section 5c, an amount of light decreases as a whole, as indicated by a solid line. Further, as shown in FIG. 18d, an amount of incident light is indicated by a dotted light in the Y axis of FIG. 18B. When light passes through the polarizing section 5c, an amount of light decreases in a portion where an amount of incident light is large. As such, the polarizing section 5c decreases an amount of light in a portion where an amount of light is large. Therefore, RIM intensity (ratio of the intensity of the outermost light flux to the center intensity) can be increased, short-wavelength light can be condensed into a small spot on the optical disk 2, and at least one of recording and reproducing can be performed onto the high-density optical disk 2. That is, the polarizing section 5c serves as a RIM intensity correcting filter which does not act in the X-axis direction where the RIM intensity is strong, but acts only in the Y-axis direction where the RIM intensity is weak.

In the polarizing section 5d, a hologram (not shown) having polarized light selection characteristics is provided on the substrate 5b, the hologram being formed of optically anisotropic resin. In the hologram, isotropic resin is filled. The hologram composing a portion of the polarizing section 5d has a function of separating light reflected from the optical disk 2 into predetermined light fluxes such that a tracking error signal is mainly generated.

As one manufacturing method, the following method is exemplified. The polarizing sections 5c and 5d are formed on the substrates 5a and 5b, respectively. Then, the polarizing sections 5c and 5b are disposed to face each other and are then bonded to each other by an adhesive such as resin, thereby forming the optical part 5.

Next, the relay lens 6 will be described in detail.

Figure 19:
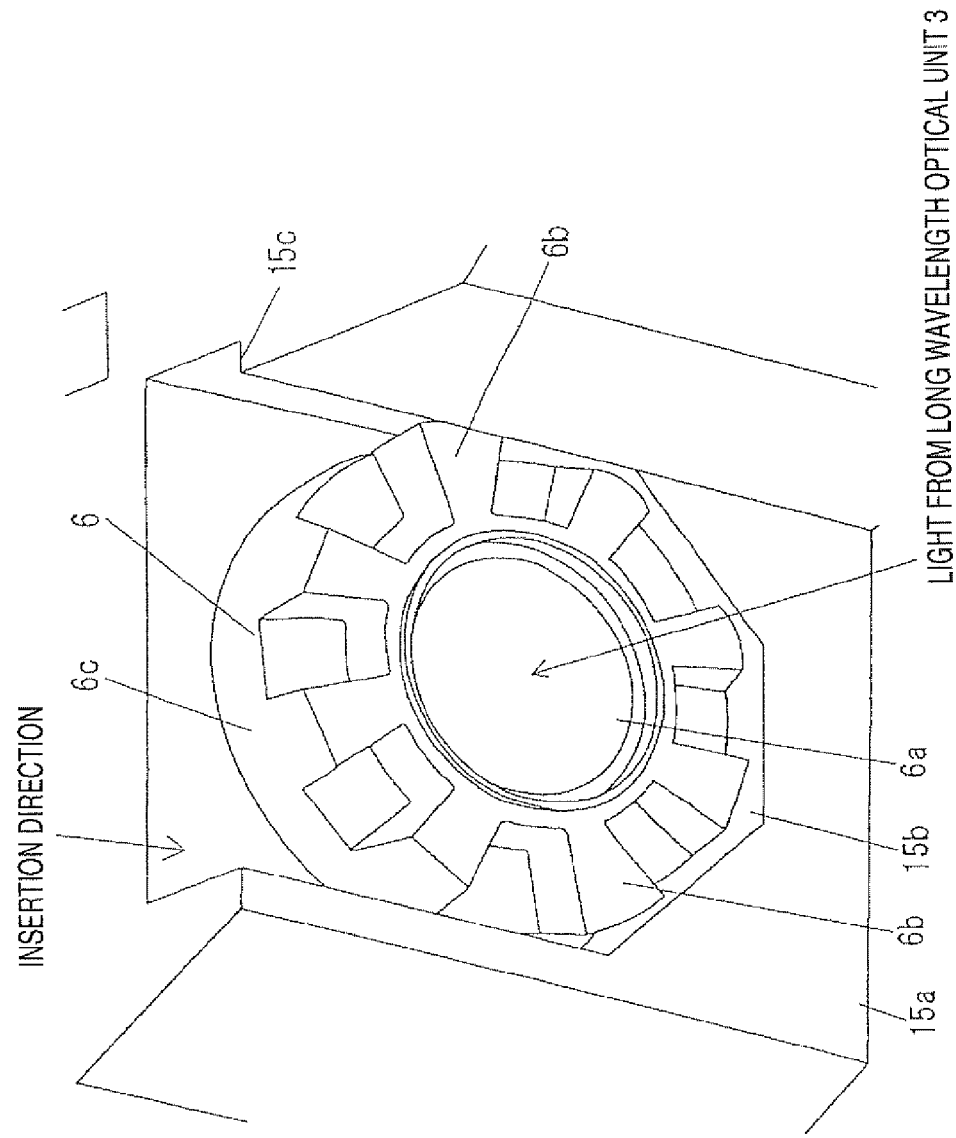
FIG. 19 is a diagram showing a portion of the optical pickup device according to the embodiment of the invention.

In detail, the relay lens 6 is formed in such a shape as shown in FIG. 19. That is, the relay lens 6 includes a light transmitting section 6a, a plurality of projecting sections 6b, and an outer ring section 6c. The light transmitting section 6a is provided so that light passes through at least a portion thereof. The plurality of projecting sections 6b are provided around the light transmitting section 6a and, preferably, in a radial pattern. In the outer ring section 6c, the outside thereof is formed in a substantially circular shape, in which the projecting sections are provided. In this embodiment, the light transmitting section 6a, the projecting sections 6b, and the outer ring section 6c are integrally formed. The respective sections may be constructed separately so as to be bonded to each other.

The base 15 has an attachment section 15a provided so as to be raised. The attachment section 15a has a concave section 15b provided with a step portion 15c. The relay lens 6 is inserted from an insertion direction shown in FIG. 19. The concave section 15b provided with the step portion 15c prevents the relay lens 6 from being detached toward the long wavelength optical unit 3. Further, although not shown, a through-hole is provided in a portion facing the light transmitting section 6a of the inserted relay lens 6. Accordingly, as shown in FIG. 19, the light emitted from the long wavelength optical unit 3 sequentially passes through the through-holes provided in the light transmitting section 6a and the attachment section 15a so as to be directed to the beam splitter 7.

With a thin pin (not shown) being abutted on the projecting section 6b, the relay lens 6 is displaced at a predetermined angle by an operator or an automatic adjusting device, thereby correcting astigmatism. Further, the outer ring section 6c is substantially abutted on the inner wall of the concave section 15b, and the outer shape of the outer ring section 6c is formed in a circular shape, even though some projections or concave portions are present thereon. Therefore, the relay lens 6 is rotatably held by such a thin pin as described above. After the relay lens 6 is rotated at a predetermined angle so as to correct astigmatism, an instant adhesive or light-curing adhesive is provided and hardened over at least the relay lens 6 and the attachment section 15a, thereby fixing the relay lens 6 to the attachment section 15a. At this time, it is preferable that an adhesive is provided in the concave section 15b of the attachment section 15a. It is more preferable to consider an applying method and an applied amount of adhesive such that the adhesive is not applied into the light transmitting section 6a.

Next, the beam splitter 7 will be described in detail.

Figure 20:
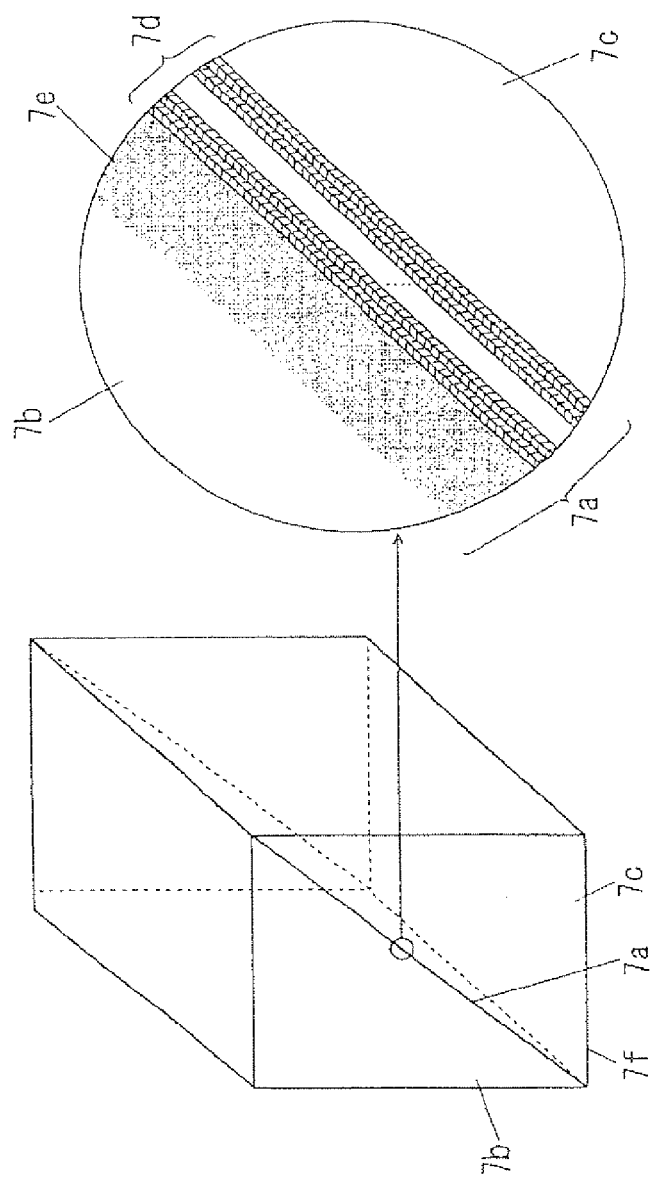
FIG. 20 is a diagram showing a portion of the optical pickup device according to the embodiment of the invention.

As shown in FIG. 20, the outer shape of the beam splitter 7 is formed in a substantially rectangular parallelepiped shape or a substantially cubical shape. As described above, the beam splitter 7 is constructed by bonding the transparent members 7b and 7c and has the inclined surface 7a formed by bonding between the transparent members 7b and 7c. As shown in FIG. 20, the inclined surface 7a is formed at an angle of about 45 degrees with respect to a bottom side 7f of the side surface. However, depending on a specification or the outer shape of the beam splitter 7, the angle is suitably determined to be a predetermined angle. The transparent members 7b and 7c made of a glass material such as BK7 or the like are formed in a triangle pole shape. As shown in FIG. 20, the inclined surface 7a has a laminate section 7d and a bonding section 7e.

The laminate section 7d is constructed by alternately laminating a low refraction film and a high refraction film. In this embodiment, a $SiO_2$ film is used as a low refraction film, and a $Ta_2O_5$ film is used as a high refraction film. Further, the thicknesses of the high refraction film and the low refraction film, respectively, are set to be in the range of 10 to 400 nm. In this embodiment, the surface where the laminate section 7d of the transparent member 7c is provided is preferably subjected to a grinding process or surface treatment. Then, $SiO_2$ films and $Ta_2O_5$ films are laminated in an order of $SiO_2$, $Ta_2O_5$, $SiO_2$, $Ta_2O_5$, ..., $SiO_2$, $Ta_2O_5$, and $SiO_2$ by using a thin film forming technique such as sputtering or deposition, thereby forming the laminate section 7d. In this embodiment, more than 20 thin film sets of $SiO_2$ film and $Ta_2O_5$ film are laminated (considering a yield ratio or a manufacturing cost, it is preferable to laminate less than 35 sets). If the $SiO_2$ films and $Ta_2O_5$ films are counted one by one, the laminate section 7d is composed of 40 to 70 layers. Further, it is advantageous to set the actual thickness of the laminate section 7d to 2 to 10 nm in terms of characteristic and productivity.

When the laminate section 7d is constructed in such a manner, the formation thicknesses of the respective layers (in the above description, the $SiO_2$ films and the $Ta_2O_5$ films) are adjusted, so that light with a predetermined wavelength is transmitted and light with other wavelengths is reflected. In this embodiment, the laminate section 7d is constructed so as to transmit red light (with a wavelength of about 660 nm) and infrared light (with a wavelength of about 780 nm) and to reflect short-wavelength light (with a wavelength of about 405 nm).

Between the laminate section 7d and the transparent member 7b, a bonding section 7e is provided, and a Si-based adhesive is preferably used in the bonding section 7e. The Si-based adhesive is hardly degraded by short-wavelength light. The Si-based adhesive is preferably used in an optical pickup device using light with a wavelength of about 405 nm, as in this embodiment. Further, the bonding section 7e may be formed of glass or other resin materials. As the thickness of the bonding section 7e is set to 3 to 15 nm (preferably, 8 to 12 nm), the bonding between the transparent members 7b and 7c can be reliably performed, and productivity can be increased. Further, the feature of this embodiment is that short-wavelength light is incident from the bottom side 7f. Therefore, with the laminate section 7d being provided on the transparent member 7c without the bonding member 7e, the bonding section 7e can be suppressed from being degraded by short-wavelength light.

Next, the collimator lens 8 and the driving mechanism thereof will be described.

Figure 21:
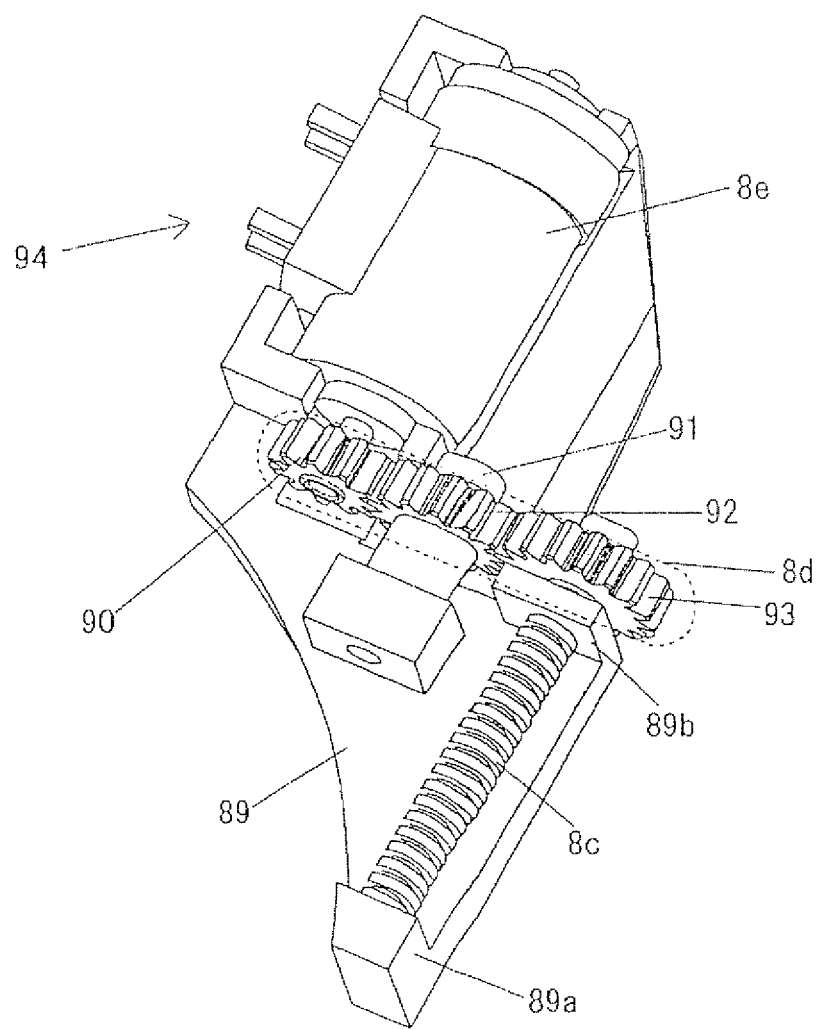
FIG. 21 is a diagram showing a portion of the optical pickup device according to the embodiment of the invention.

As shown in FIG. 21, the lead screw 8c, the gear group 8d, and the driving member 8e are fixed to the base 89. In this embodiment, a stepping motor is used as the driving member 8e, and a motor gear 90 is fixed to the rotating shaft of the driving member 8e. Further, a train shaft 91 is rotatably attached to the base 89, a train gear 92 is fixed to the train shaft 91, and a motor gear 90 is geared to the train gear 92. Further, a pair of attachment sections 89a and 89b are integrally provided in the base 89. One end of the screw shaft 8c is rotatably held by the attachment section 89a, and the other end of the screw shaft 8c is rotatably inserted into the attachment section 89b. A shaft gear 93 is fixed to the end of the screw shaft 8c at the attachment 89b, and the train gear 92 is geared to the shaft gear 93. That is, as the driving member 8e rotates, the rotation driving force thereof is transmitted to the screw shaft 8c through the gear group 8d (the motor gear 90, the train gear 92, and the shaft gear 93).

As such, the driving mechanism 94 having the respective members mounted thereon is attached to the base 15.

Figure 22:
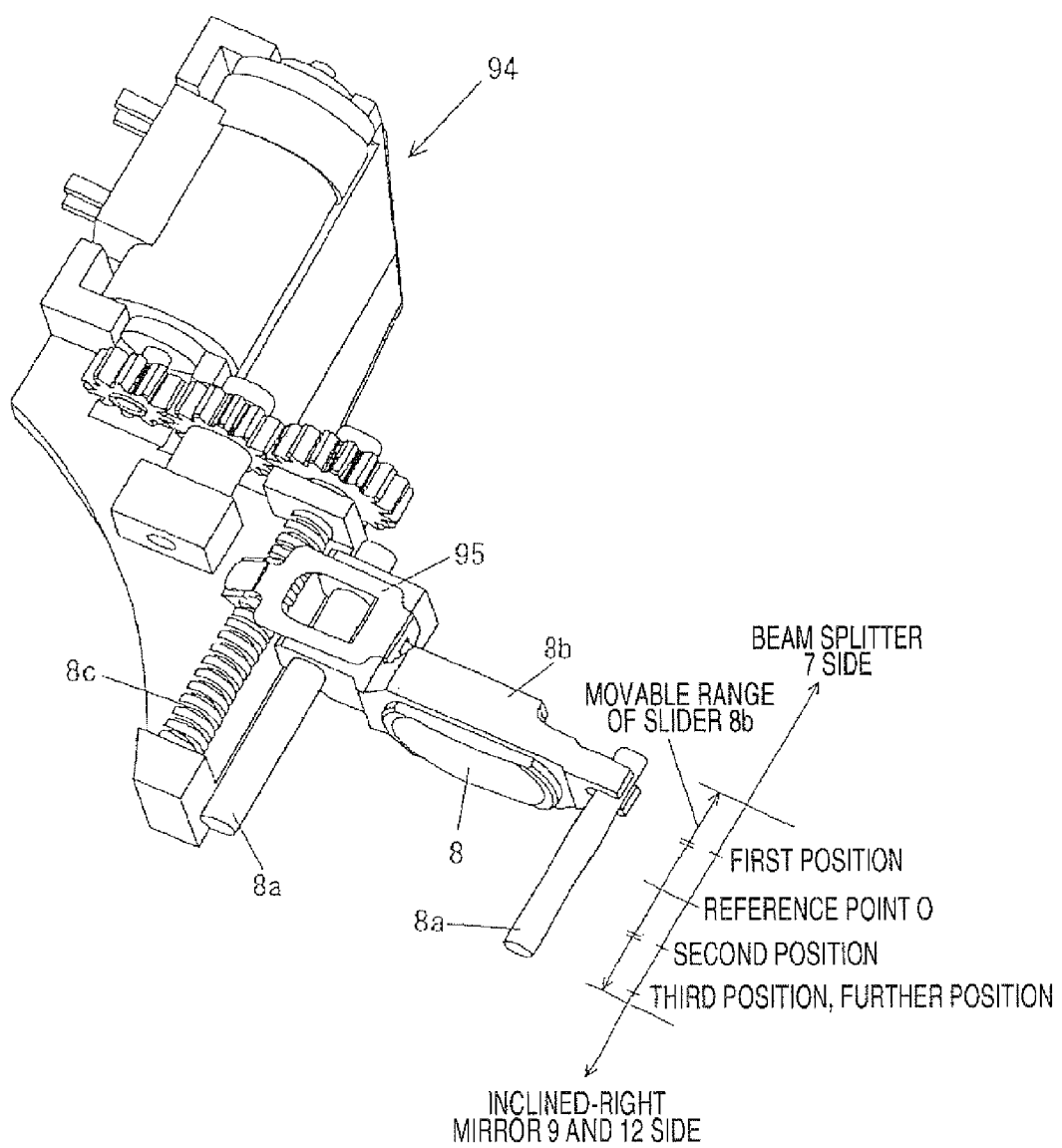
FIG. 22 is a diagram showing a portion of the optical pickup device according to the embodiment of the invention.
Figure 23:
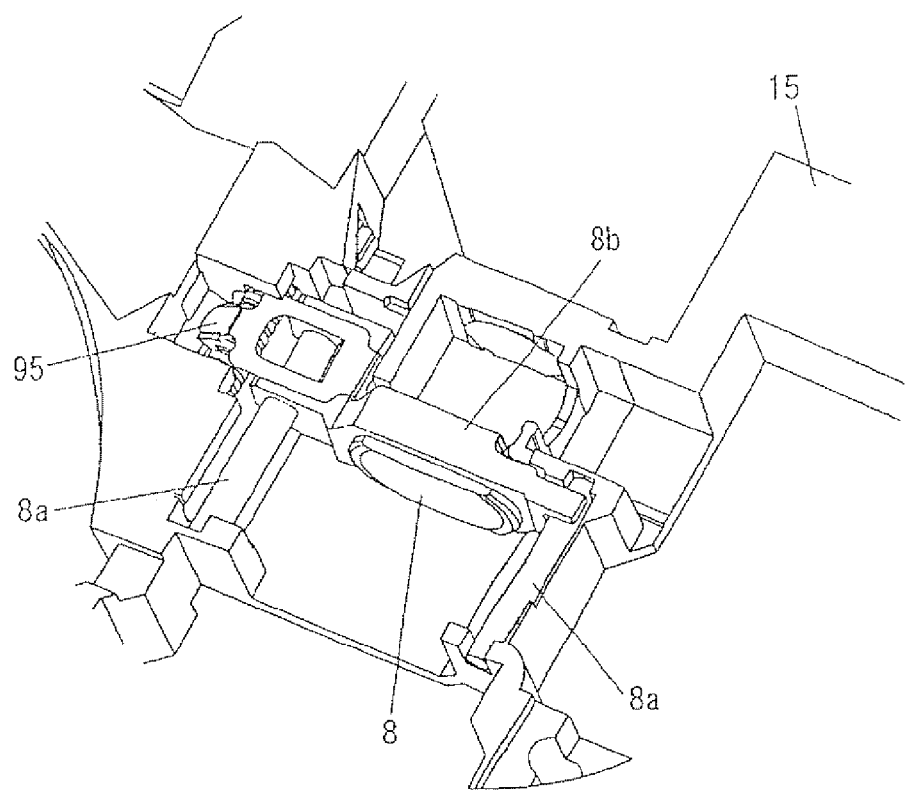
FIG. 23 is a diagram showing a portion of the optical pickup device according to the embodiment of the invention.

As shown in FIGS. 22 and 23, the slider 8b having the collimator lens 8 mounted thereon is movably attached to the pair of support members 8a attached to the base 15. Further, the driving mechanism 94 is provided in the side of the support member 8a such that the screw shaft 8c of the driving mechanism 94 and the support member 8a are substantially parallel to each other. A rack member 95 formed of an elastic material such as a plane spring is attached to the slider 8b by adhesive bonding or mechanical bonding, and the end of the rack member 95 is geared to a spiral groove provided in the screw shaft 8c. Accordingly, if the center of the movable range of the slider 8b is set to a reference point O for the sake of description, the slider 8b is parallel-displaced from the reference point O toward the beam splitter 7 or the inclined-right mirrors 9 and 12 by the rotation of the screw shaft 8c. When the rotation direction or rotation speed of the screw shaft 8c is changed, it is possible to adjust the moving direction or speed of the slider 8b. In this embodiment, since a stepping motor is used as the driving member 8e, the position of the slider 8b, that is, the position of the collimator lens 8 can be determined by the number of pulses supplied to the driving member 8e.

Although not shown, at least one of recording and reproducing can be performed on the optical disk 2 (having a first recording layer and a second recording layer) by using light from the short wavelength optical unit 1, or recording and reproducing of information can be performed on the optical disk 2 by using light corresponding to CD or DVD emitted from the long wavelength optical unit 2. In this case, the position of the collimator lens 8 is varied in order to reliably perform at least one of recording and reproducing.

Accordingly, when at least one of recording and reproducing is performed on the first recording layer (which is positioned at a depth of 0.1 mm from the surface at the object lens 13) of the optical disk 2 by using light from the short wavelength optical unit 1, the collimator lens 8 is positioned in a first position. When at least one of recording and reproducing is performed on the second layer (which is positioned at a depth of 0.075 mm from the surface at the object lens 13) of the optical disk 2 by using light from the short wavelength optical unit 1, the collimator lens 8 is positioned in a second position. When at least one of recording and reproducing is performed on the optical disk 2 by using light corresponding to CD emitted from the long wavelength optical unit 3, the collimator lens 8 is positioned in a third position. When at least one of recording and reproducing is performed on the optical disk 2 by using light corresponding to DVD emitted from the long wavelength optical unit 3, the collimator lens 8 is positioned in a fourth position. The first to fourth positions are positions of the collimator lens 8 in the movable range of the slider 8b. The first position and the second position always differ from each other, and the third position and the fourth position differ from at least one of the first position and the second position. That is, the first to fourth positions are set to at least two different positions. The first position and the second position always differ from each other. Therefore, if the third position and the fourth position can be positioned between the first and second positions, the movable range of the slider 8b can be interposed therebetween. However, the first to fourth positions are not limited thereto. Next, one example of the positional relationship between the first to fourth positions will be described.

As shown in FIG. 22, the first position is set to a position of 0.83 mm from the reference point O toward the beam splitter 7, the second position is set to a position of 0.83 mm from the reference point O toward the inclined-right mirrors 9 and 12, and the third and fourth positions are set to a position of 1.9 mm from the reference point O toward the inclined-right mirrors 9 and 12. Then, the position of the collimator lens 8 is varied, and at least one of recording and reproducing can be reliably performed on the respective recording layers of the optical disk 2 regardless of the type of the optical disk 2. Depending on the optical disk 2 on which recording and reproducing is performed using light from the short wavelength optical unit 1, the first and second positions are fine-adjusted toward the beam splitter 7 or the inclined-right mirrors 9 and 12 while a distance of 1.66 mm is maintained. Accordingly, it is possible to perform more precise correction of spherical aberration with respect to short-wavelength light. Similarly, the fourth position is fine-adjusted depending on the optical disk 2 (in this case, DVD) mounted on the spindle motor 25.

An example of an operation according to the above-described construction will be described.

It is assumed that the slider 8*b* is positioned in the home position by a separate sensor (not shown). Using a signal from the outside, a control member (not shown) judges whether recording/reproducing is performed using light with a certain wavelength or whether recording/reproducing is performed on the first recording layer or the second recording layer. In accordance with the signal, the control member reads from a memory how many pulses are delivered to the driving member 8*e*. At this time, the first to fourth positions are determined by the wavelength of light at which recording/reproducing is performed or whether recording/reproducing is performed on the first recording layer or the second recording layer. It is determined at the time of design in which direction and how much the slider 8*b* existing in the home position should be moved in order to position the collimator lens 8 in the respective positions. Therefore, as the number of pulses required for each operation is previously recorded in the memory, the collimator lens 8 can be easily positioned in the optimal position (the first to fourth positions). The first to fourth positions can coincide with the home position of the slider 8*b*, and the reference point O can coincide with the home position. Further, when a predetermined operation is terminated, the control member delivers pulses to the driving member 8*e* so as to return the slider 8*b* to the home position.

Next, the achromatic diffraction lens 14 will be described.

Figure 24:
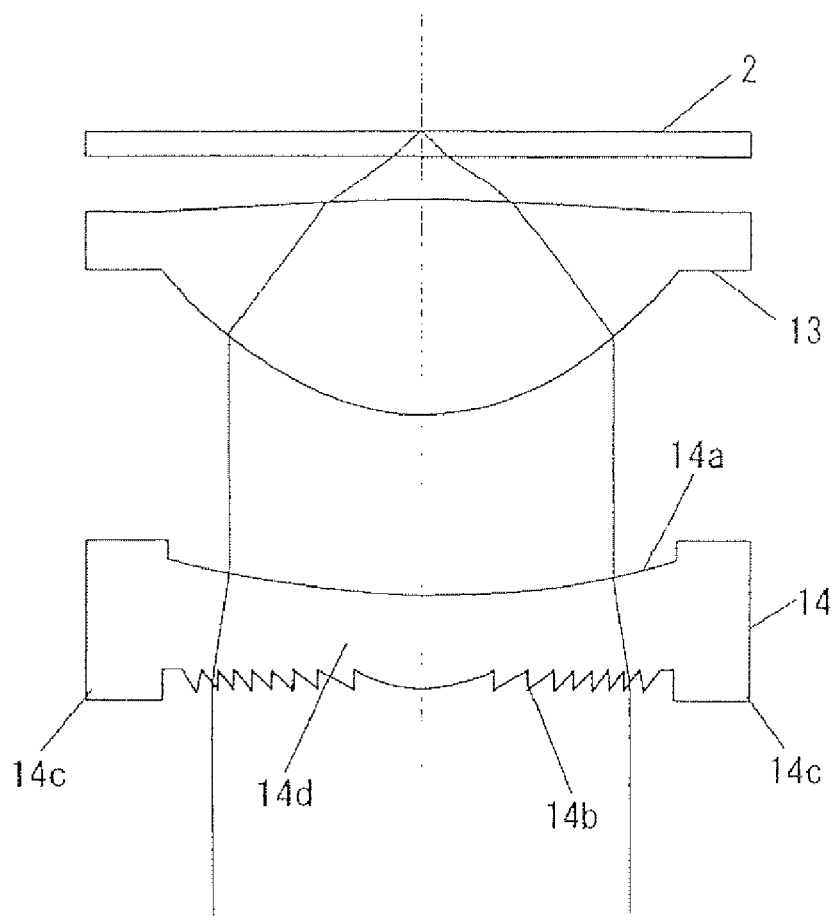
FIG. 24 is a diagram showing a portion of the optical pickup device according to the embodiment of the invention.

As shown in FIG. 24, the achromatic diffraction lens 14 includes a light transmitting section 14*d* and an outer ring section 14*c* surrounding the outside of the light transmitting section 14*d*. The surface 14*a* of the light transmitting section 14*d* at the object lens 13 is formed in a concave shape. On the surface 14*b* facing the inclined-right mirror 12, a hologram is provided at a predetermined pitch and in a predetermined shape. The light transmitting section 14 transmits short-wavelength light. As the pitch of the hologram provided on the surface 14*b* is adjusted, it is possible to perform desirable correction of chromatic aberration. The achromatic diffraction lens 14 is formed in a substantially circular shape, and the outer ring section 14*c* is attached to the lens holder 16. In this embodiment, the light transmitting section 14*d* and the outer ring section 14*d* are integrally formed. However, the light transmitting section 14*c* and the outer ring section 14*c* may be constructed separately from each other. For example, the light transmitting section 14*d* may be constructed so as to be embedded in the central portion of the outer ring section 14*c*.

Next, the lens holder 16 and the suspension holder 17 will be described with reference to FIGS. 25 to 28. Further, members having the same reference numerals as those of FIGS. 6 and 7 have the same functions. As described above, the members of FIGS. 25 to 28 having the same reference numerals as those of FIGS. 6 and 7 have the same functions. However, the members shown in FIGS. 25 to 28 have a slightly different shape from those shown in FIGS. 6 and 7.

When at least one of recording and reproducing is performed on the optical disk 2 at high double speed, the resonance frequency of the lens holder 16 needs to be increased. That is, when recording/reproducing is performed at high double speed, the lens holder 16 is controlled so as to follow the surface wobbling of the lens holder 16. In this case, the resonance frequency of the lens holder 16 is increased so that the lens holder 16 is controlled in a region of less than the resonance frequency. As one method of increasing the resonance frequency of the lens holder 16, it is exemplified to impart a high rigidity to the lens holder 16. In this embodiment, in order to impart a high rigidity to the lens holder 16, the entire portion or at least a portion of the lens holder 16 is formed of a material (hereinafter, referred to as a composite material) in which fiber is dispersed into resin. As for resin, liquid crystal polymer, epoxy resin, polyimide-based resin, polyamide-based resin, acrylic resin or the like is preferably used. As for fiber, carbon fiber, carbon black, metallic fiber such as copper, nickel, aluminum, or stainless steel, or composite fiber is preferably used. In this embodiment, the lens holder 16 is formed of a material obtained by dispersing carbon fiber into liquid crystal polymer.

Figure 25:
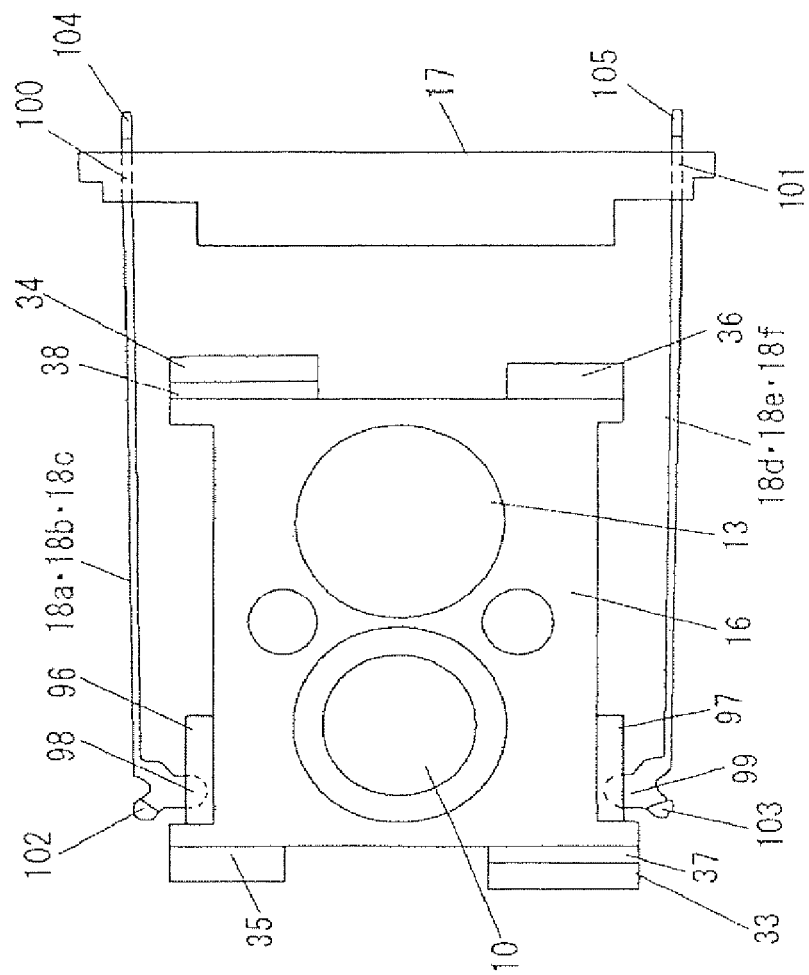
FIG. 25 is a diagram showing a portion of the optical pickup device according to the embodiment of the invention.
Figure 26:
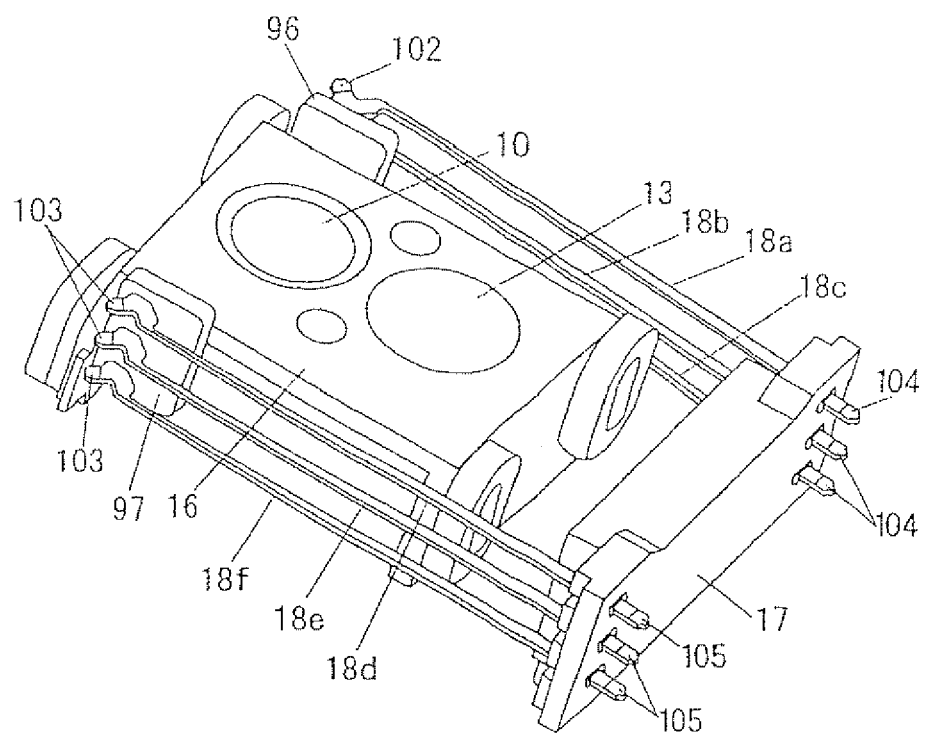
FIG. 26 is a diagram showing a portion of the optical pickup device according to the embodiment of the invention.

As shown in FIGS. 25 and 26, when the lens holder 16 and the suspension holder 17 are formed of the composite material, the lens holder 16 and the suspension holder 17 can have conductivity. Therefore, an insulating film is formed on the suspensions 18*a* to 18*f*. In this case, between the lens holder 16 and various coils, an insulating member is provided for insulation. Alternately, various coils are composed of winding wire subjected to insulating treatment. As such, the suspensions 18*a* to 18*f* provided with an insulating film secures insulation properties with respect to the lens holder 16 and the suspension holder 17 having conductivity. Further, the insulated ends 98 and 99 of the suspensions 18*a* to 18*f* are attached to bobbin receiving sections 96 and 97, which are integrally provided in the lens holder 16, by insert molding. The insulated ends 100 and 101 of the suspensions 18*a* to 18*f* at the suspension holder 17 are attached to the suspension holder 17 by insert molding. Further, since the leading ends 102 and 103 of the suspensions 18*a* to 18*f* at the lens holder 16 are not provided with an insulating film, the leading ends 102 and 103 are electrically connected to various coils provided in the lens holder 16. Further, since the leading ends 104 and 105 of the suspensions 18*a* to 18*f* at the suspension holder 17 are not provided with an insulating film, the leading ends 104 and 105 are connected to a flexible printed board (not shown).

Figure 27:
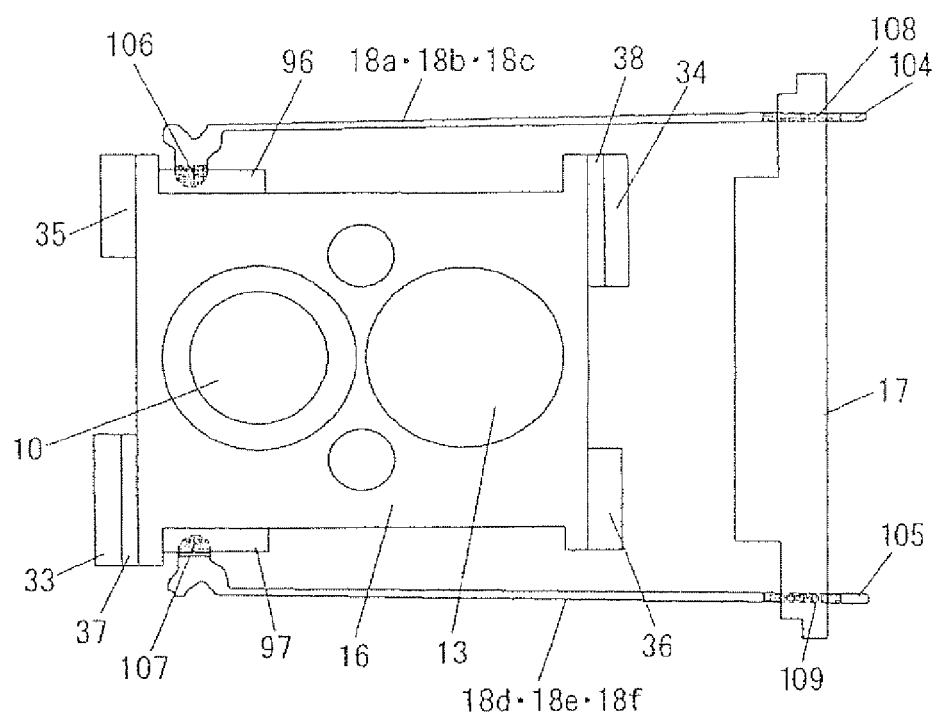
FIG. 27 is a diagram showing a portion of the optical pickup device according to the embodiment of the invention.
Figure 28:
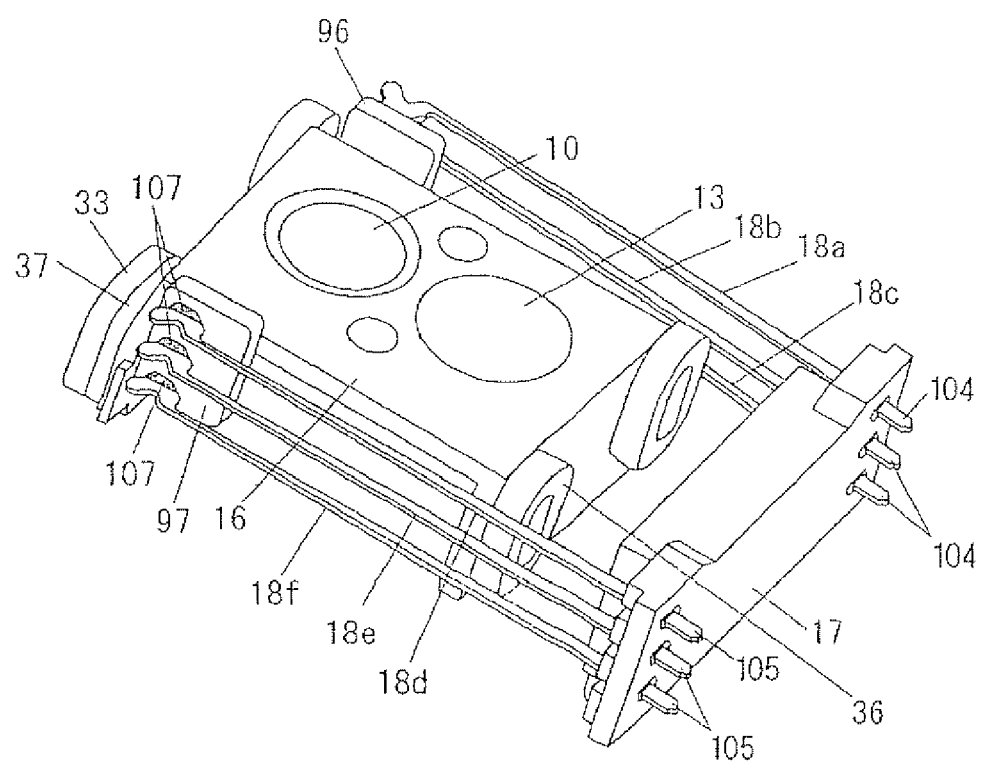
FIG. 28 is a diagram showing a portion of the optical pickup device according to the embodiment of the invention.

As a modification of the embodiment shown in FIGS. 25 and 26, all the suspensions 18*a* to 18*f* are not provided with an insulating film, but the ends 106 and 107 of the suspensions 18*a* to 18*f* are provided with an insulating film as shown in FIGS. 27 and 28. Then, portions or the entire portions of the ends 106 and 107 are bonded to the bobbin receiving sections 96 and 97, respectively. In the case of the entire portions, it is considered that the lens holder 16 does not come in contact with the suspensions 18*a* to 18*f*. In the modification of FIGS. 27 and 28, portions of the ends 106 and 107 are bonded to the bobbin receiving sections 96 and 97 in order to secure insulation properties. Further, an insulating film is also provided in the ends 108 and 109 of the suspensions 18*a* to 18*f* at the suspension holder 17, and at least the ends 108 and 109 and the suspension holder 17 are bonded. In the modification of FIGS. 27 and 28, all the ends 108 and 109 are bonded to the suspension holder 17.

The above-described insulating film is manufactured of a material having insulation properties by using such a technique as application, electro-deposition, or deposition. As a material having insulating properties, insulating materials such as epoxy resin or inorganic insulating materials such as silicon dioxide are used. Further, the surfaces of the suspensions 18*a* to 18*f* having conductivity may be subjected to oxidation treatment in order to form an insulating film. Further, the suspensions 18*a* to 18*f* may be inserted into tube-shaped insulating materials serving as insulating films, and metallic wire may be threaded into resin wire by insert molding so as to be used as the suspensions 18*a* to 18*f*.

Figure 29:
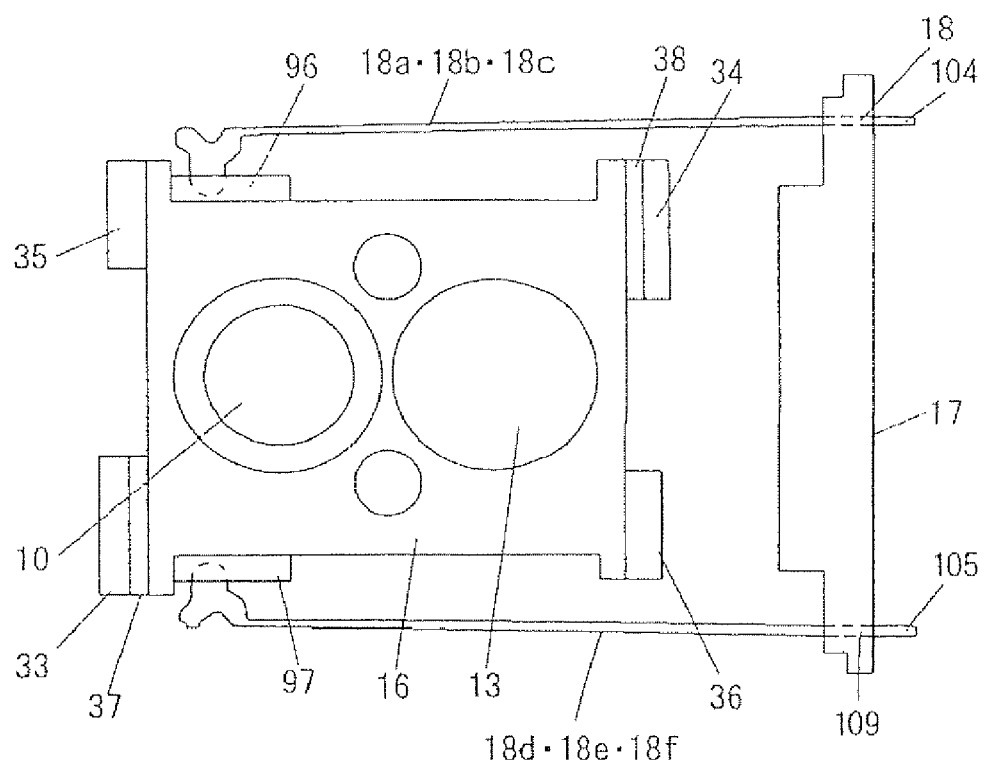
FIG. 29 is a diagram showing a portion of the optical pickup device according to the embodiment of the invention.
Figure 30:
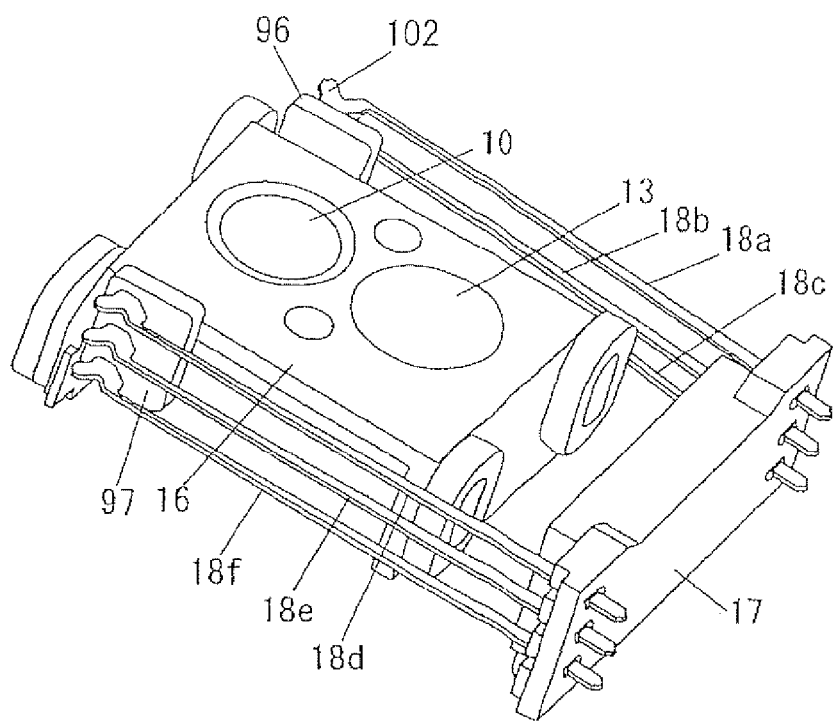
FIG. 30 is a diagram showing a portion of the optical pickup device according to the embodiment of the invention.

As shown in FIGS. 29 and 30, the suspensions 18*a* to 18*f* are not provided with an insulating film. However, the suspension holder 17 and the bobbin receiving sections 96 and 97 can be formed of non-conductive materials, and the lens holder 16 can be formed of the composite material. According to this construction, since the members to which the suspensions 18*a* to 18*f* are attached have insulation properties, the suspensions do not need to be subjected to insulation treatment. The bobbin receiving sections 96 and 97 and the lens holder 16 are integrally constructed by two-color molding, or the bobbin receiving sections 96 and 97 and the lens holder 16 are bonded to each other by an adhesive made of resin. In this embodiment, the suspensions 18*a* to 18*f* are not subjected to insulation treatment, but the lens holder 16 with high rigidity can be used.

Next, the construction of the lens holder 16 and the object lens 10 of the optical pickup device according to this embodiment will be described in detail with reference to FIGS. 31 to 35. Further, members shown in FIGS. 31 to 35 have slight shapes from those shown in FIGS. 6, 7, and 25 to 28. However, the members to which the same reference numerals are attached have the same functions.

Figure 31:
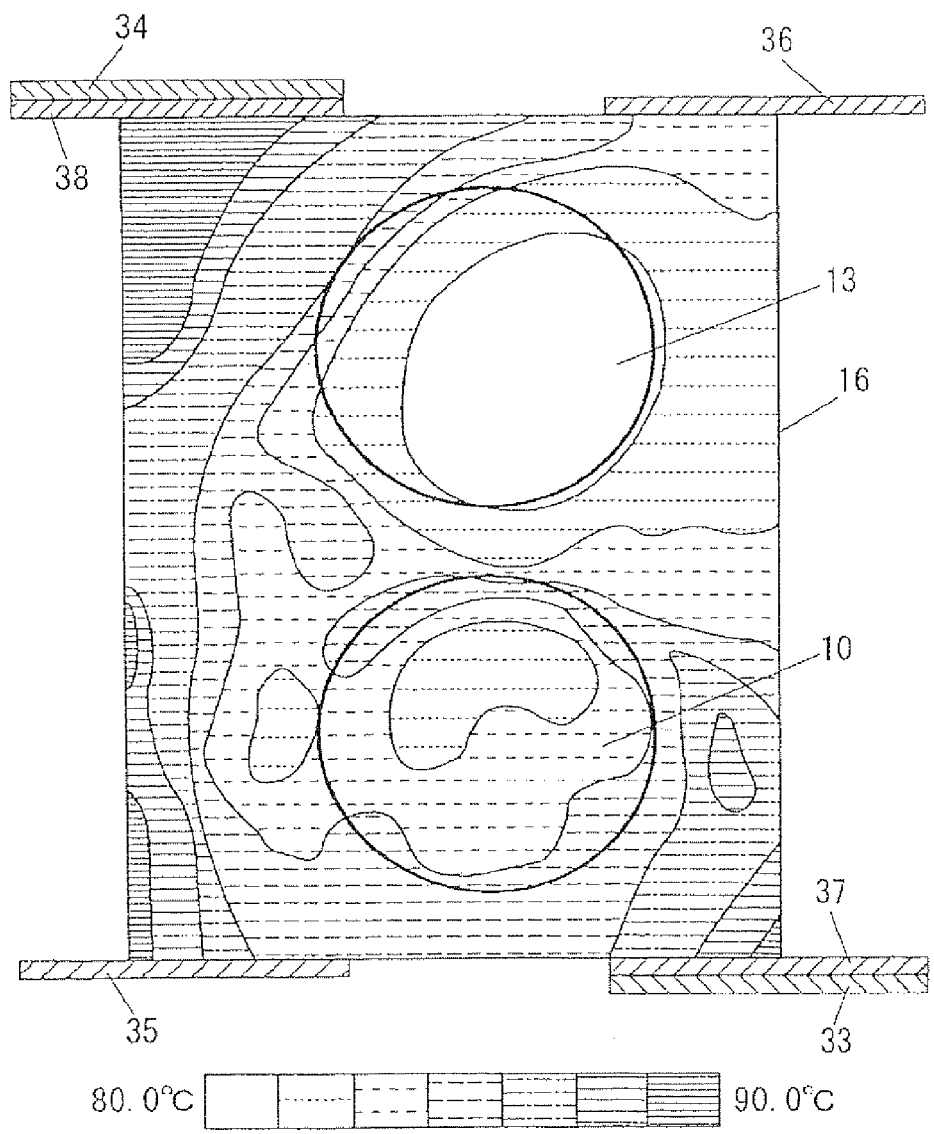
FIG. 31 is a diagram showing the temperature distribution of the optical pickup device according to the embodiment of the invention.

FIG. 31 shows temperature distribution on the lens holder 16 when an electric current flows in the focus coils 33 and 34, the tracking coils 35 and 36, and the sub-tracking coils 37 and 38. The lens holder 16 has the object lenses 10 and 13 mounted thereon. The object lens 10 is used for long-wavelength laser, and the object lens 13 is used for short-wavelength laser. FIG. 31 indicates in which position the object lenses 10 and 13, the focus coils 33 and 34, the tracking coils 35 and 36, and the sub-tracking coils 37 and 38 are respectively located. As an electric current flows in the coils, heat is generated. The generated heat moves to the lens holder 16 and then moves to the object lenses 10 and 13. The object lenses 10 and 13 are deformed by the application of heat. In general, the object lenses 10 and 13 are expanded, but can be contracted depending on a material. Further, resin is more severely deformed by the application of heat than glass. As evident in FIG. 31, a bias is present in the temperature distribution of the lens holder 16. In the object lens 10, the side of the set of the focus coil 33 and the sub-tracking coil 37 is more heated than the side of the tracking coil 35. In the object lens 13, the side of the set of the focus coil 34 and the sub-tracking coil 38 is more heated than the side of the tracking coil 36. The bias of heat generates a bias in the deformation of the lens, thereby generating an aberration in light passing through the object lenses 10 and 13.

Figure 32:
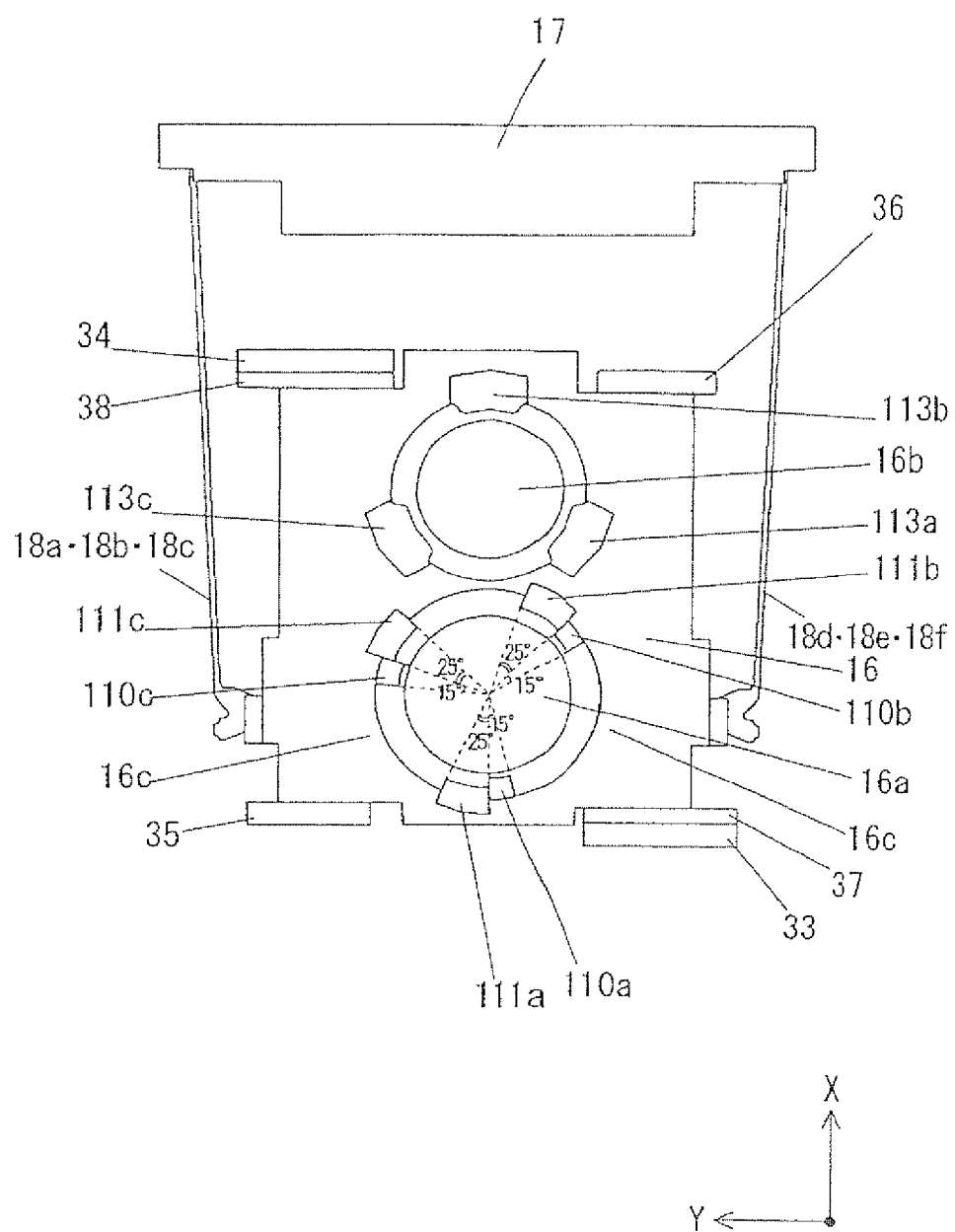
FIG. 32 is a diagram showing a portion of the optical pickup device according to the embodiment of the invention.

In FIG. 32, reference numerals 110*a*, 110*b*, and 110*c* represent object lens support surfaces, and reference numerals 111*a*, 111*b*, 111*c*, 113*a*, 113*b*, and 113*c* represent bonding sections. As described in FIG. 7, the object lens 13 for short-wavelength laser is brought down into the through-hole 16*b* of the lens holder 16 from the direction P1 shown in FIG. 7 and is then fixed by a light-curing adhesive or the like. Further, the object lens 10 for long-wavelength laser is brought down into the through-hole 16*a* of the lens holder 16 from the direction P1 shown in FIG. 7 and is then fixed by a light-curing adhesive or the like. Between the object lenses 10 and 13 attached to the lens holder 16, the object lens 10 is formed of glass or resin. In this embodiment, an object lens formed of glass is used as the object lens 10. Accordingly, since such a technique as metallic molding can be used, a hologram is easily provided in the object lens 10, and the spherical aberration of light with plural kinds of wavelengths can be adjusted. The object lens 13 is formed of glass or resin (preferably, short-wavelength-light-resistant). In this embodiment, an object lens formed of glass is used as the object lens 13. Accordingly, the object lens 13 is hardly degraded by short-wavelength light and can maintain excellent optical characteristics. Further, although the object lenses 10 and 13 are used in this embodiment, other condensing members such as a hologram and the like can be used.

As described in FIG. 6, reference numerals 33 and 34 represent focus coils. The respective coils are wound in a ring shape and are respectively provided in the diagonal positions of the lens holder 16. As the focus coils 33 and 34 are provided in both sides of the lens holder 16, it is possible to reduce the size of the optical pickup device, even though two of the object lenses 10 and 13 are mounted on the lens holder 16. Reference numerals 35 and 36 represent tracking coils. Similar to the focus coils 33 and 34, the tracking coils 35 and 36 are wound in a ring shape and are respectively provided in the diagonal positions different from the focus coils 33 and 34. Between the focus coils 33 and 34 and the lens holder 16, the sub-tracking coils 37 and 38 are respectively provided. With the sub-tracking coils 37 and 38 being provided, it is possible to suppress unnecessary inclination of the lens holder 16 which occurs on tracking.

Referring to FIG. 32, the relationship between the object lenses 10 and 13 and the lens holder 16 will be described in detail. The object lens 13 is brought down into the through-hole 16*b* formed in a substantially circular shape from the near side of the drawing toward the far side and is then fixed to the lens holder 16 by a light-curing adhesive injected into the bonding sections 113*a*, 113*b*, and 113*c*. Meanwhile, the object lens 10 is brought down into the through-hole 16*a* formed in a substantially circular shape from the near side of the drawing toward the far side. Adjusting is performed in a state where the object lens 10 is supported by the object lens support surfaces 110*a*, 110*b*, and 110*c*. The object lens 10 is fixed to the lens holder 16 by a light-curing adhesive injected into the bonding sections 111*a*, 111*b*, and 111*c*. Such a construction obtains optimal optical characteristics. As the adhesive, a light-curing adhesive such as ultraviolet curing adhesive is used, which is cured when ultraviolet rays are irradiated thereon. An instant adhesive or another adhesive can be used. Further, it is preferable to use an adhesive with low heat conductivity. It is more preferable to use an adhesive with heat insulating properties, in which heat is not transmitted.

Figure 33:
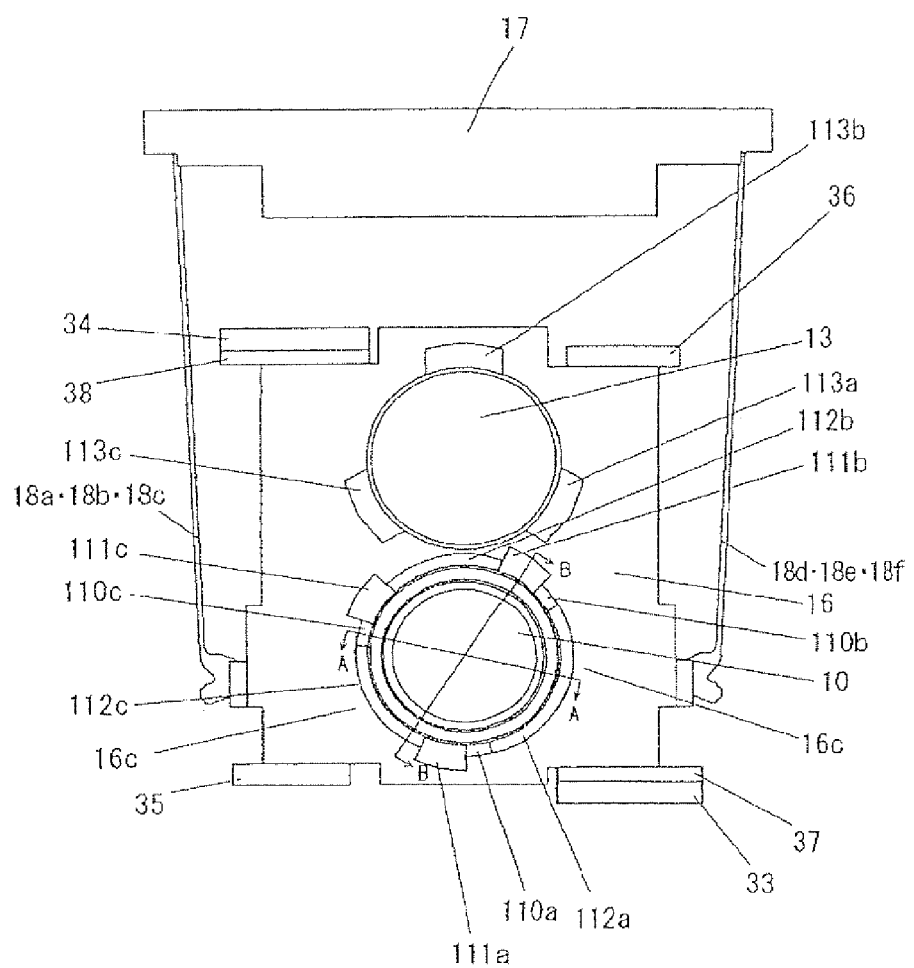
FIG. 33 is a diagram showing a portion of the optical pickup device according to the embodiment of the invention.

FIG. 33 shows a state where the object lenses 13 and 10 are brought down into the through-hole 16*b* and 16*a*, respectively. As shown in FIG. 7, the outer circumferences of the object lenses 10 and 13 are abutted on the circumferential edges of the through-holes 16*a* and 16*b* of the lens holder 16, respectively. The outer circumference of the object lens 10 comes in contact with the circumferential edge of the through-hole 16*b* of the lens holder 16 across the entire circumference. The abutment between the object lens 10 formed of resin and the lens holder 16 will be described in detail.

Figure 34:
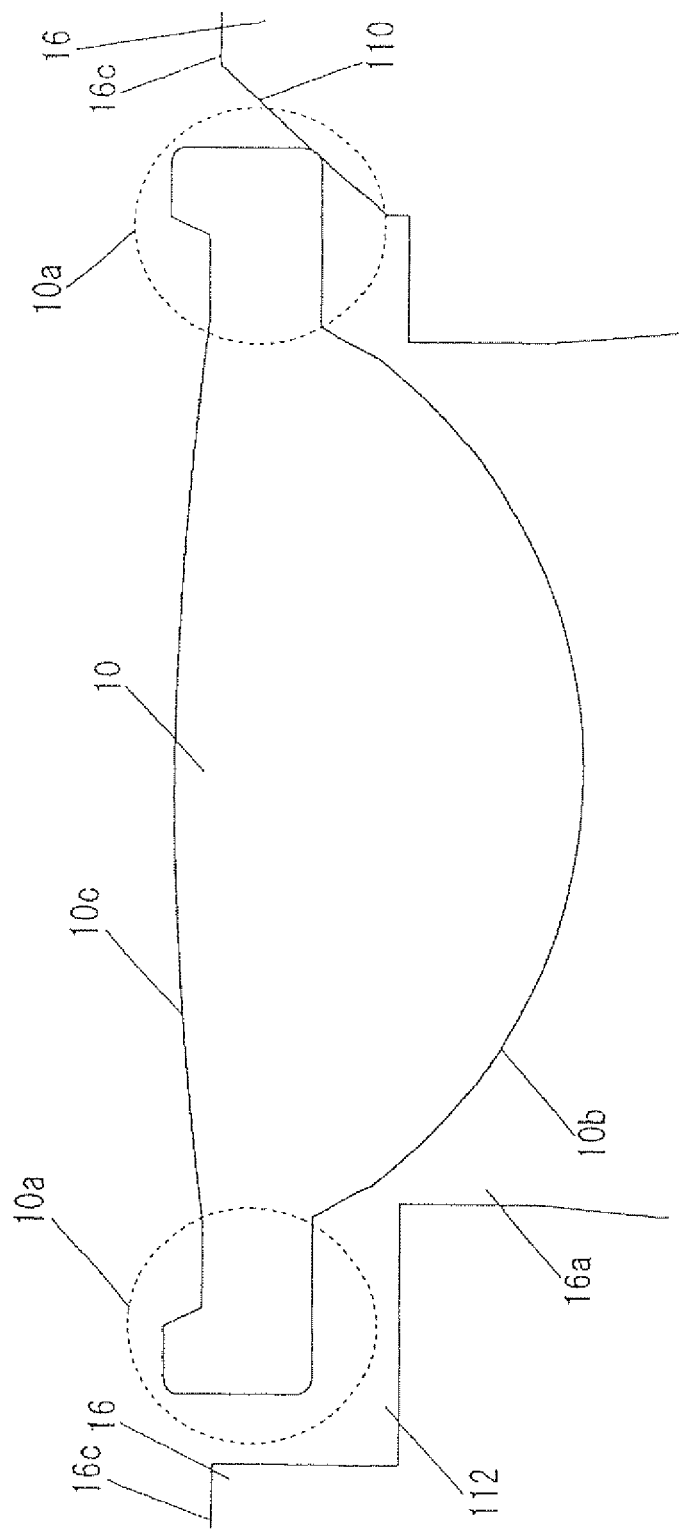
FIG. 34 is a diagram showing a portion of the optical pickup device according to the embodiment of the invention.
Figure 35:
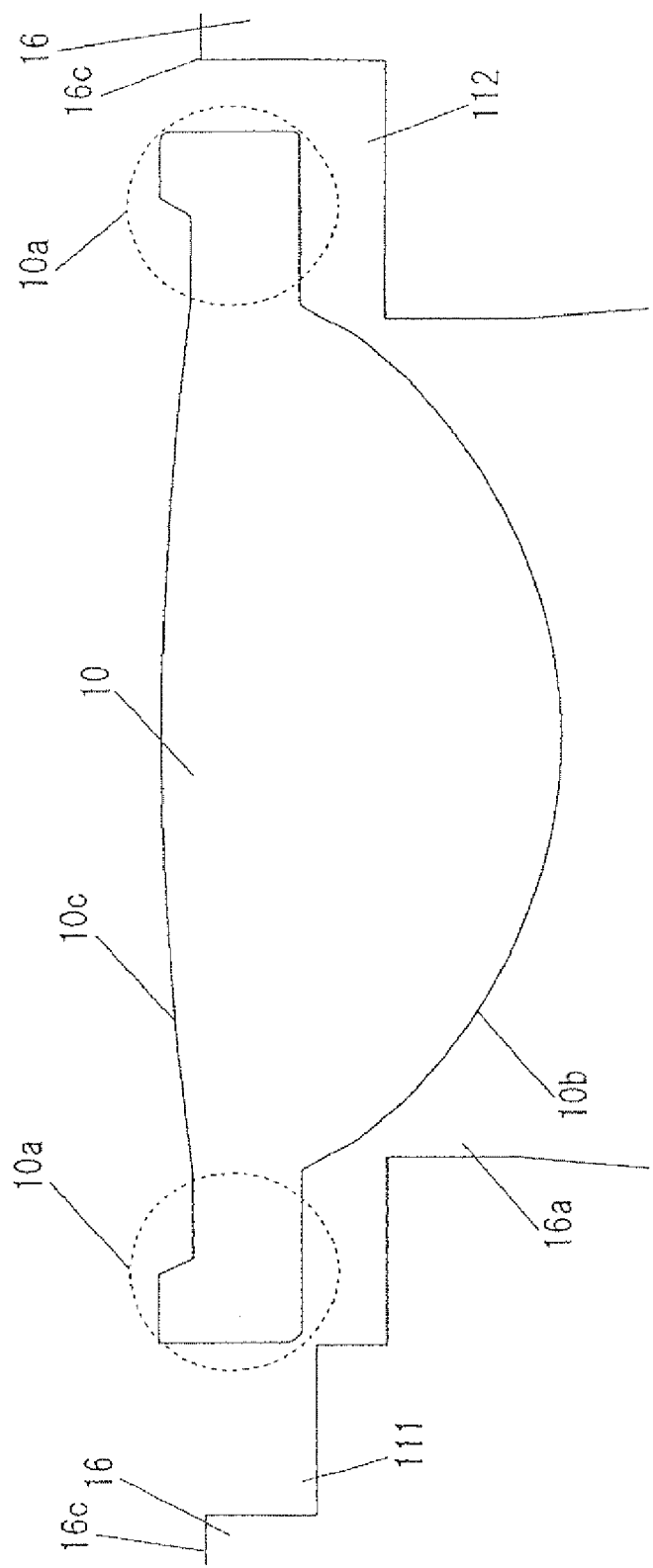
FIG. 35 is a diagram showing a portion of the optical pickup device according to the embodiment of the invention.

FIG. 34 is a sectional view taken along A-A line of FIG. 33, and FIG. 35 is a sectional view taken along B-B line of FIG. 33.

Reference numeral 10*a* represents an object lens circumferential section which is the edge of the object lens 10. A portion of the object lens circumferential section 10*a* is abutted on the lens holder 16, and the object lens 10 is bonded to the lens holder 16. Then, the lens holder 16 and the object lens 10 are fixed to each other. Reference numeral 10*b* represents an object lens lower surface where the light emitted from the long wavelength optical unit 3 is incident on the object lens 10, and reference numeral 10*c* represents an object lens upper surface from which the light incident on the object lens 10 from the object lens lower surface 10*b* is emitted. The light, passing through the object lens 10 so as to be emitted from the object lens upper surface 10*c*, is condensed into the optical disk 2 facing the object lens upper surface 10*c*. The object lens lower surface 10*b* is provided with a hologram. A light flux (red: corresponding to DVD) with a wavelength of about 660 nm or a light flux (infrared: corresponding to CD) with a wavelength of about 780 nm, which is emitted from the long wavelength optical unit 3 and passes through the relay lens 6 or the collimator lens 8 so as to be parallel light, passes through the hologram such that the spherical aberration thereof is adjusted.

Reference numeral 110 represents an object lens support surface provided in the lens holder 16. Since FIG. 34 is a sectional view taken along A-A line of FIG. 33, the object lens support surface 110 becomes the object lens support surface 110c, strictly speaking. However, the object lens support surfaces 110a, 110b, and 110c have the same construction and function. Therefore, the object lens support surfaces 110a, 110b, and 110c are collectively referred to as the object lens support surface 110. The object lens support surface 110 has an inclined surface which is directed from a lens holder upper surface 16c of the lens holder 16 toward the through-hole 16a. The inclined surface is a substantially spherical surface which is concaved with respect to the lens holder upper surface 16c. When the object lens 10 is placed on the object lens support surface 110, it is preferable that the principal point of the object lens 10 coincides with the center of the substantially spherical surface of the object lens support surface 110. It is also considered that the principal point of the object lens 10 is slightly deviated from the center of the substantially spherical surface of the object lens support surface 110. However, a certain deviation is allowed. With the substantially spherical surface being provided in the object lens support surface 110, it is possible to adjust a direction of the optical axis of the object lens 10.

Reference numeral 111 represents a bonding section provided in the lens holder 16. Since FIG. 35 is a sectional view taken along B-B line of FIG. 33, the bonding section 111 is the bonding section 111b, strictly speaking. However, the bonding sections 111a, 111b, and 111c have the same construction and function. Therefore, the bonding sections 111a, 111b, and 111c are collectively referred to as the bonding section 111. The bonding section 111 becomes a stepped-down portion which is more stepped down toward the through-hole 16a than the lens holder upper surface 16c of the lens holder 16. The bonding section 111 is constructed so as not to be struck by the object lens 10 when tilting is adjusted while the object lens 10 is slidably moved on the object lens support surface 110.

The disposition of the object lens support surface 110 and the bonding section 111 will be described. As shown in FIG. 32, an angle which is occupied by each of the object lens support surfaces 110a, 110b, and 110c in the circumferential edge of the through-hole 16a is about 15 degrees, and an angle which is occupied by each of the bonding sections 111a, 111b, and 111c in the circumferential edge of the through-hole 16a is about 25 degrees, when the circumferential edge of the through-hole 16a is seen from the central axis of the through-hole 16a. The contact portion between the object lens support surface 110 and the bonding section 111, that is, the contact portion between the lens holder 16 and the object lens 10 is reduced. Therefore, a flow path of heat from the lens holder 16 to the object lens 10 is narrowed, so that an increase in temperature of the object lens 10 can be suppressed and the deformation of the object lens 10 can be reduced.

The bonding section 111a is disposed away from the vicinities of the set of the focus coil 33 and the sub-tracking coil 37 and in a position which is not too close to the tracking coil 35. In other words, the bonding section 111a is disposed in a position which is closer to the tracking coil 35 than the set of the focus coil 33 and the sub-tracking coil 37. Then, when an electric current flows in the focus coils 33 and 34, the tracking coils 35 and 36, and sub-tracking coils 37 and 38 so as to drive the lens holder 16, the bonding section 111a can be disposed in a position, where the temperature is low, between the tracking coil 35 and the set of the focus coil 33 and the sub-tracking coil 37. The focus coil 33 and the sub-tracking coil 37 are where the temperature easily increases, and the tracking coil 35 is where an increase in temperature is smaller than the focus coil 33 and the sub-tracking coil 37. The bonding sections 111b and 111c are disposed in a position of which the temperature is almost the same as the position of the bonding section 111a on the lens holder 16. Preferably, a difference in temperature among the bonding sections 111a, 111b, and 111c is in the range of 1 to 2 degrees. Since the bonding sections 111a, 111b, and 111c are constructed to have the substantially same size, the adhesives injected into the respective bonding sections 111 come in contact with the object lens 10 at the same area. Accordingly, an amount of heat, which flows in the object lens 10 from the bonding sections 111a, 111b, and 111c provided in the positions where the temperature is substantially identical, becomes substantially uniform, and a bias is hardly generated in the deformation of the object lens 10. Therefore, it is possible to suppress astigmatism of light from occurring, the light passing through the object lens 10. Further, the bonding sections 111a, 111b, and 111c are disposed at even angles around the central axis of the through-hole 16a so as to be close to each other at an interval of 120 degrees. Preferably, the bonding sections 111 are disposed at every 120 degree at constant intervals (at the same angle). However, the bonding sections 111 are disposed in the positions, of which the temperatures at the time of driving become equal, around the through-hole 16a such that intervals therebetween are as approximate as possible. Accordingly, even though an adhesive injected into the bonding sections 111 is contracted when hardening, a force which pulls the object lens 10 from the lens holder 16 is reduced, so that the positioned object lens 10 is hardly shifted.

Although the bonding sections 111 are composed of three sections in this embodiment, the number of the bonding sections 111 is not limited thereto. For example, when the bonding sections 111 are composed of two sections, the bonding sections 111 are disposed around the central axis of the through-hole 16a at an interval of 180 degrees. When the bonding sections 111 are composed of four sections, the bonding sections 111 are disposed around the central axis of the through-hole 16a at an interval of 90 degrees. As such, even when the number of the bonding sections 111 is varied, it is preferable that the bonding sections 111 are disposed around the central axis of the through-hole 16a at even angles. However, if the number of the bonding sections 111 decreases, a force for fixing the object lens 10 to the lens holder 16 is weakened, or the bonding sections need to be widened in order to prevent the force from being weakened. Further, if the number of the bonding sections 111 increases, the respective bonding sections 111 can be constructed to be small. However, a large number of positions where the temperature is substantially identical are needed on the lens holder 16, and the number of places into which an adhesive should be injected increases so that the number of assembling processes increases. Therefore, it is preferable that the bonding sections 111 are composed of three sections.

In this embodiment, the bonding sections 111a, 111b, and 111c are constructed to have the same area and are disposed in positions where the temperatures are approximate to each other on the lens holder 16. However, the areas of the bonding sections 111 are varied by the following method. The area of the bonding section 111, provided in a place where the temperature is high on the lens holder 16, is reduced, and the area of the bonding section 111, provided in a place where the temperature is low on the lens holder 16, is enlarged. Then, an amount of heat which flows from each of the bonding sections 111 can be uniformized.

The object lens support surfaces 110a and 110b are adjacent to the bonding sections 111a and 111b, respectively, and are provided in positions closer to the set of the focus coil 33 and the sub-tracking coil 37 than the bonding sections 111a and 111b. Further, the object lens support surface 110c is adjacent to the bonding section 111c and is provided in a position closer to the tracking coil 35 than the bonding section 111c. As the object lens support surfaces 110 are provided adjacent to the bonding sections 111, the object lens support surfaces 110 are disposed in positions where the temperature is low on the lens holder 16, which makes it possible to suppress heat from being transmitted to the object lens 10. Further, as the object lens support surfaces 110 are provided adjacent to the bonding sections 111, the object lens support surfaces 110 are also disposed around the central axis of the through-hole 16a at even intervals. Such a construction allows the object lens 10 to be stably supported by the object lens support surfaces 110.

In this embodiment, the object lens support surfaces 110 supporting the object lens 10 are composed of three of the object lens support surfaces 110a, 110b, and 110c. In such a construction, the lens holder 16 comes in contact with the object lens circumferential section 10a at three points, so that the surface of the object lens 10 to be supported can be determined uniquely. Although the object lens support surfaces 110 are composed of three surfaces in this embodiment, the number of points supporting the object lens 10 is not limited thereto.

In this embodiment, the object lens support surface 110 and the bonding surface 111 are provided as different surfaces on the lens holder 16. In such a construction, an adhesive is prevented from being adhered on the object lens support surfaces 110 for pitching adjustment, and the object lens 10 can be adjusted with high precision. Further, the bonding sections 111 are provided separately from the object lens support surfaces 110 so as to perform bonding between the object lens 10 and the lens holder 16. Therefore, the object lens 10 and the lens holder 16 can be fixed robustly to each other.

The object lens support surfaces 110a and 111b, respectively, are provided in positions closer to the set of the focus coil 33 and the sub-tracking coil 37 than the bonding sections 111a and 111b, and the object lens support surface 110c is provided in a position closer to the tracking coil 35 than the bonding section 111c. However, the object lens 10 and the lens holder 16 come in contact with only the object lens support surfaces 110, and the bonding sections 111 to which heat is easily transmitted can be disposed in positions separated from high-temperature portions. Therefore, it is possible to suppress the object lens 10 from increasing in temperature.

In this embodiment, it is preferable that the entire portion or at least a portion of the lens holder 16 is also formed of a material (composite material) in which fiber is dispersed in resin, as described in FIGS. 25 and 30. As for resin, liquid crystal polymer, epoxy resin, polyimide-based resin, polyamide-based resin, acrylic resin or the like is preferably used. As for fiber, carbon fiber, carbon black, metallic fiber such as copper, nickel, aluminum, or stainless steel, or composite fiber therefrom is preferably used. As such, when the lens holder 16 is formed of the composite material, the lens holder 16 has conductivity. However, the rigidity of the lens holder 16 increases, and the resonance frequency increases. Therefore, at least one of recording and reproducing can be performed on the optical disk 2 at high double speed. In this embodiment, the lens holder 16 is formed of a material in which carbon fiber is dispersed in liquid crystal polymer. It is considered that such a construction increases the heat conductivity of the lens holder 6. If the heat conductivity increases, the temperature of the lens holder 16 is easily equalized, and the positions of the bonding sections 111 can be selected from a wide range and can be easily disposed around the through-hole 16a at even angles (about 120 degrees, when three of the bonding sections 111 are provided).

Next, the light receiving section 1b of the short wavelength optical unit 1 will be described in detail with reference to FIGS. 36 to 49. Further, members shown in FIGS. 36 to 49 have a slightly different shape from the members shown in FIGS. 9 and 10. However, the members have the same functions.

Figure 36:
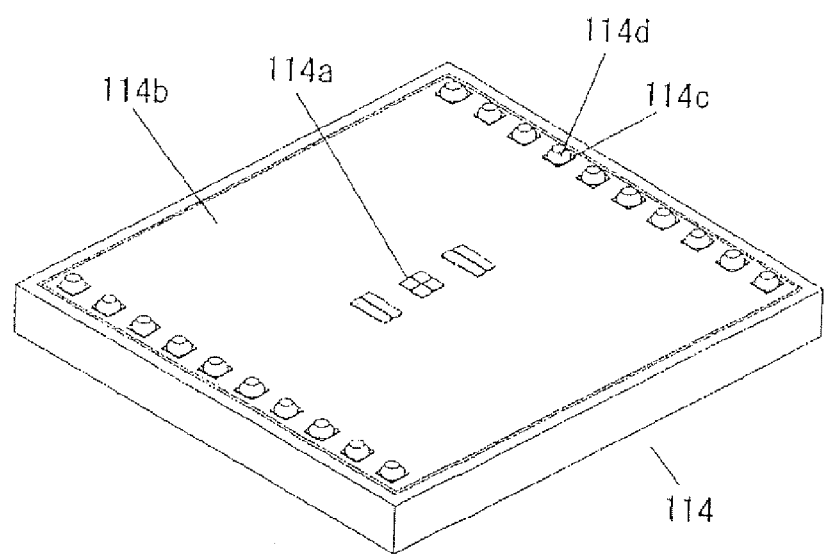
FIG. 36 is a diagram showing a portion of the optical pickup device according to the embodiment of the invention.

FIG. 36 is perspective view illustrating a light receiving element 114 composing the light receiving section 1b, seen from the surface of an integrated circuit (IC).

In FIG. 36, reference numeral 114 represents a light receiving element composed of a bare chip IC which converts reflected light from the information recording surface of an optical disk into an electrical signal. In the light receiving element 114, reference numeral 114a represents a light detecting section which is disposed in the center of the light receiving element 114 so as to detect light incident on the light receiving element 114, 114b represents an electrical circuit section, 114c represents an electrode pad for inputting and outputting an electrical signal, and 114d represents a bump formed of gold or solder, which is provided on the electrode pad 114c so as to secure electrical connection. When the electrical connection between the electrode pad 114c and an electrode pad section 116 on the flexible printed board 49 can be reliably secured by an adhesive resin layer 115 for fixing a light receiving element to be described below, the bump 114d may be omitted. In the light receiving element 114, the surface having the light detecting section 114a and the electrode pad 114c is referred to as a light detecting surface.

Figure 37:
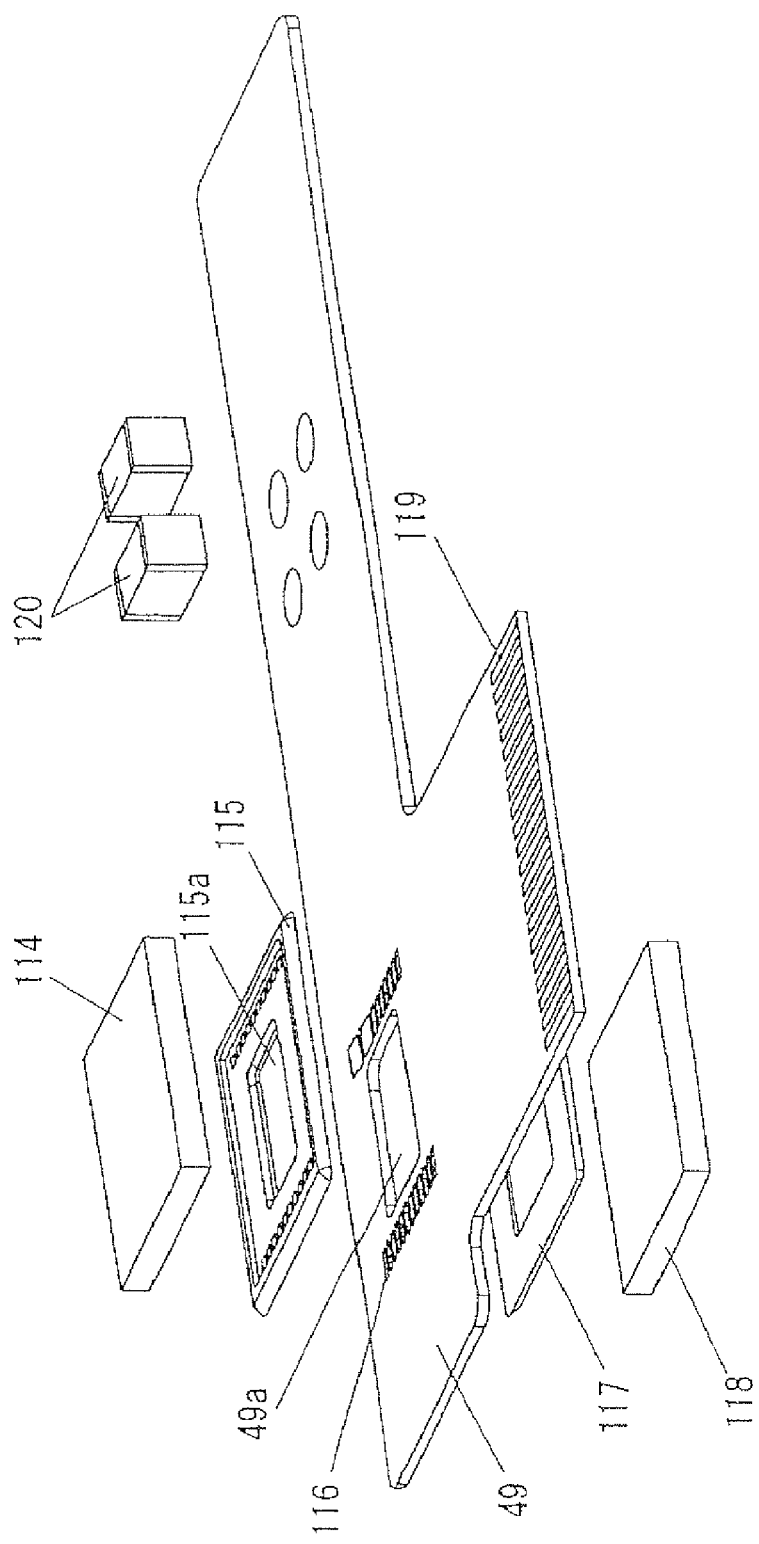
FIG. 37 is a diagram showing a portion of the optical pickup device according to the embodiment of the invention.
Figure 38:
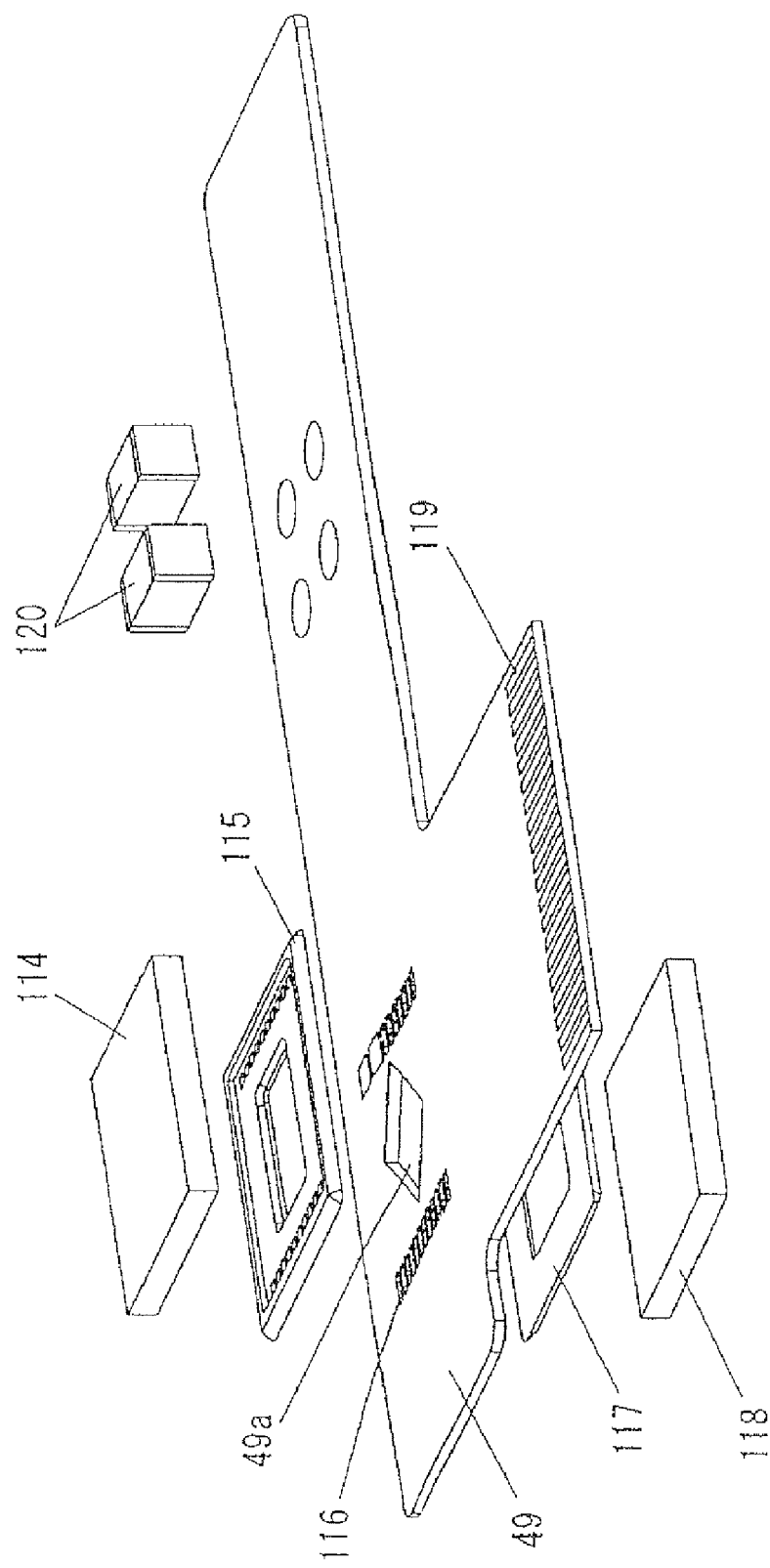
FIG. 38 is a diagram showing a portion of the optical pickup device according to the embodiment of the invention.
Figure 39:
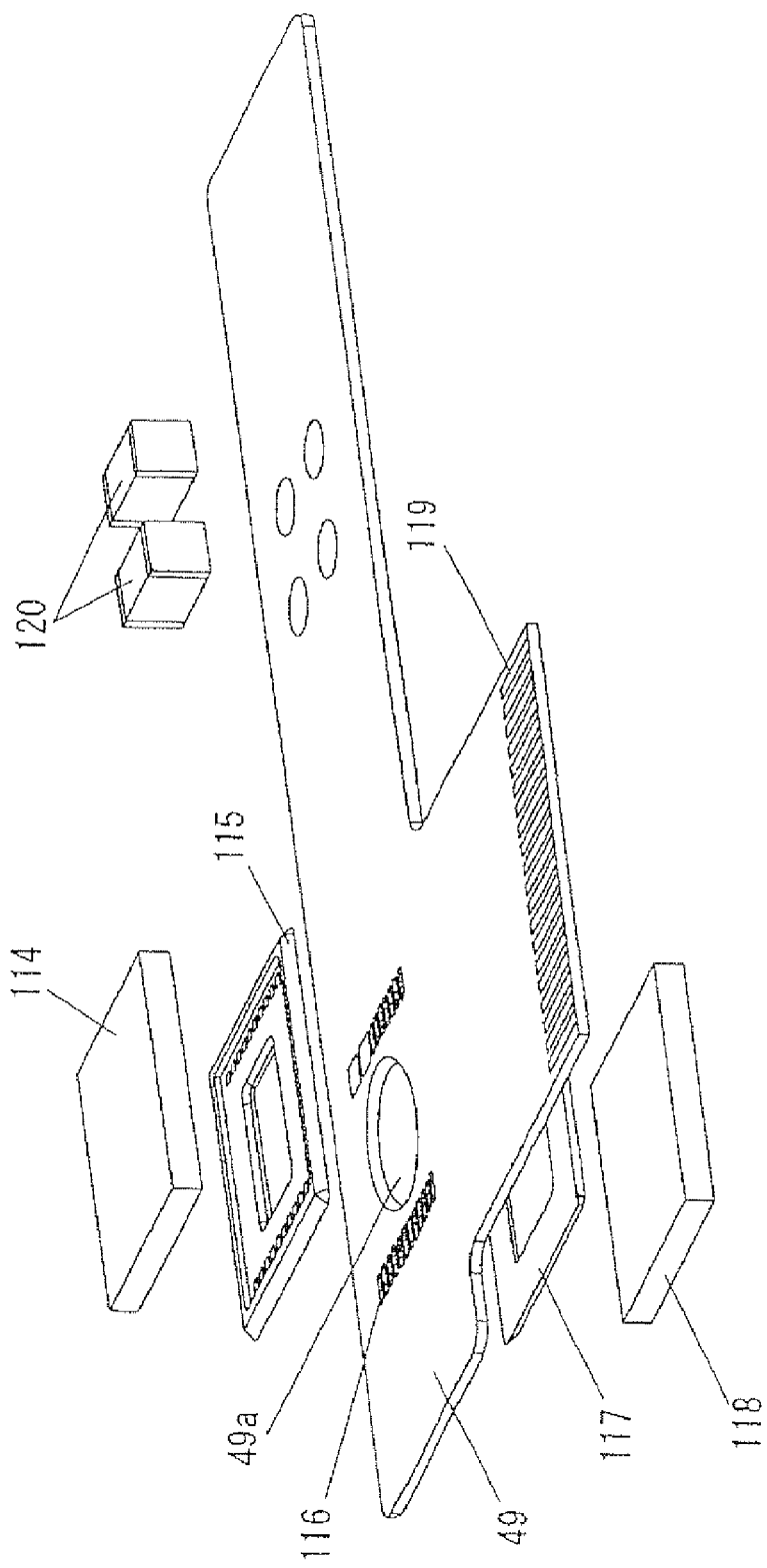
FIG. 39 is a diagram showing a portion of the optical pickup device according to the embodiment of the invention.

FIG. 37 is a perspective and exploded view illustrating constituent parts of a flexible printed board unit 121 in order to explain the construction and assembling method thereof.

In FIG. 37, reference numeral 49 represents the flexible printed board which is an electrical wiring board having flexibility, reference numeral 114 represents a light receiving element (the electrode surface thereof is not shown) explained in FIG. 36, reference numeral 115 represents an adhesive resin layer for fixing a light receiving element which is an anisotropic conductive film (ACF) for protecting the connection between electrodes and fixing the flexible printed board 49 and the light receiving element 114, reference numeral 116 represents electrode pad sections which are arranged in two lines on the flexible printed board 49 at the same intervals as those between the electrode pads 114c, reference numeral 118 represents a transparent glass substrate which protects the electrode pads 114c of the light receiving element 114 and through which reflected light from the disk passes, reference numeral 117 represents an adhesive for bonding the flexible printed board 49 and the transparent glass substrate 118, reference numeral 119 represents an electrode pattern formed on the end portion of the flexible printed board 49, reference numeral 120 represents a decoupling capacitor between power source grounds, the decoupling capacitor improving electrical characteristics of the light receiving element 114, and reference numeral 49a represents a through-hole which is provided in the substantial center between two lines of the electrode pad sections 116 and through which reflected light from the optical disk passes. As the flexible printed board 49, a single-sided board is used in order to realize ease in manufacture and reduce a manufacturing cost. The single-sided board has wiring lines and electrode pads formed on only one side. However, a double-sided board may be used, which has wiring lines and electrode pads formed on both sides. In the light receiving element 114, the surface on which the wiring lines and electrode pads are formed is referred to as an electrode surface.

Figure 40:
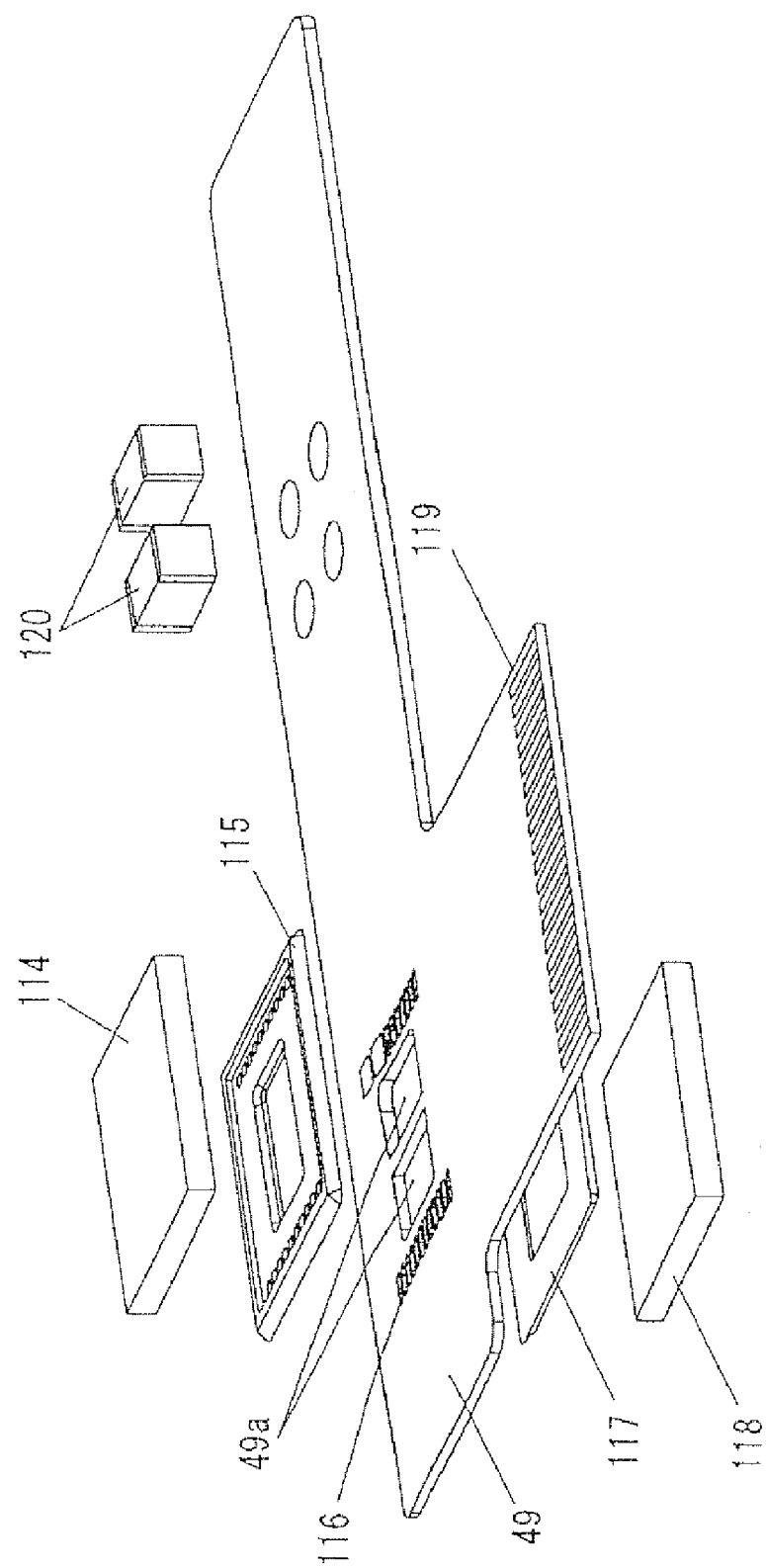
FIG. 40 is a diagram showing a portion of the optical pickup device according to the embodiment of the invention.

In FIG. 37, the through-hole 49a having a substantially rectangular shape is provided. Therefore, when the flexible printed board 49 and the light receiving element 114 are bonded to each other, at least a portion of the electrode pad 114c for inputting and outputting an electrical signal is seen from the through-hole 49a, and the reflected light from the information recording surface of the optical disk, which has passed through the transparent glass substrate 118, reaches the light detecting section 114a of the light receiving element 114. However, the through-hole 49a may be formed in a diamond shape shown in FIG. 38, a triangle shape, or a star shape. Alternately, the through-hole 49a may be formed in an elliptical or circular shape shown in FIG. 39. Further, in such a construction where the reflected light from the information recording surface of the optical disk, which has passed through the transparent glass substrate 118, reaches the light detecting section 114a of the light receiving element 114, a plurality of through-holes 49a can be provided, as shown in FIG. 40.

As the through-hole 49a is provided in the flexible printed board 49, that is, as the through-hole 49a through which the reflected light from the optical disk passes is constructed to be surrounded by the flexible printed board 49, the distance between two lines of the electrode pad sections 116 arranged in two lines hardly changes even in the flexible printed board formed of a flexible material. Further, the electrode pads 114a of the light receiving element 114 and the electrode pad sections 116 of the flexible printed board 49 can be reliably connected to each other.

Figure 41:
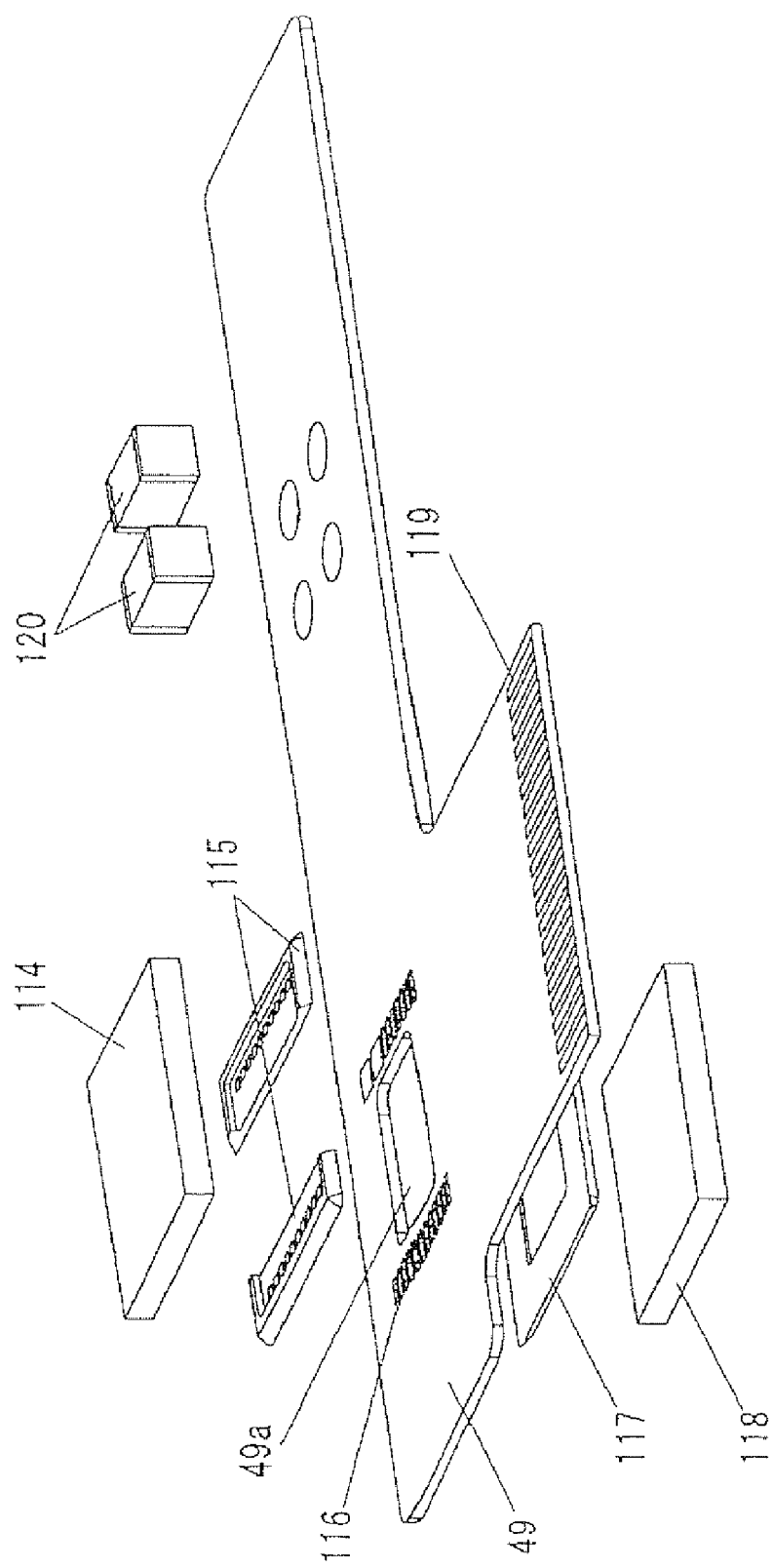
FIG. 41 is a diagram showing a portion of the optical pickup device according to the embodiment of the invention.
Figure 42:
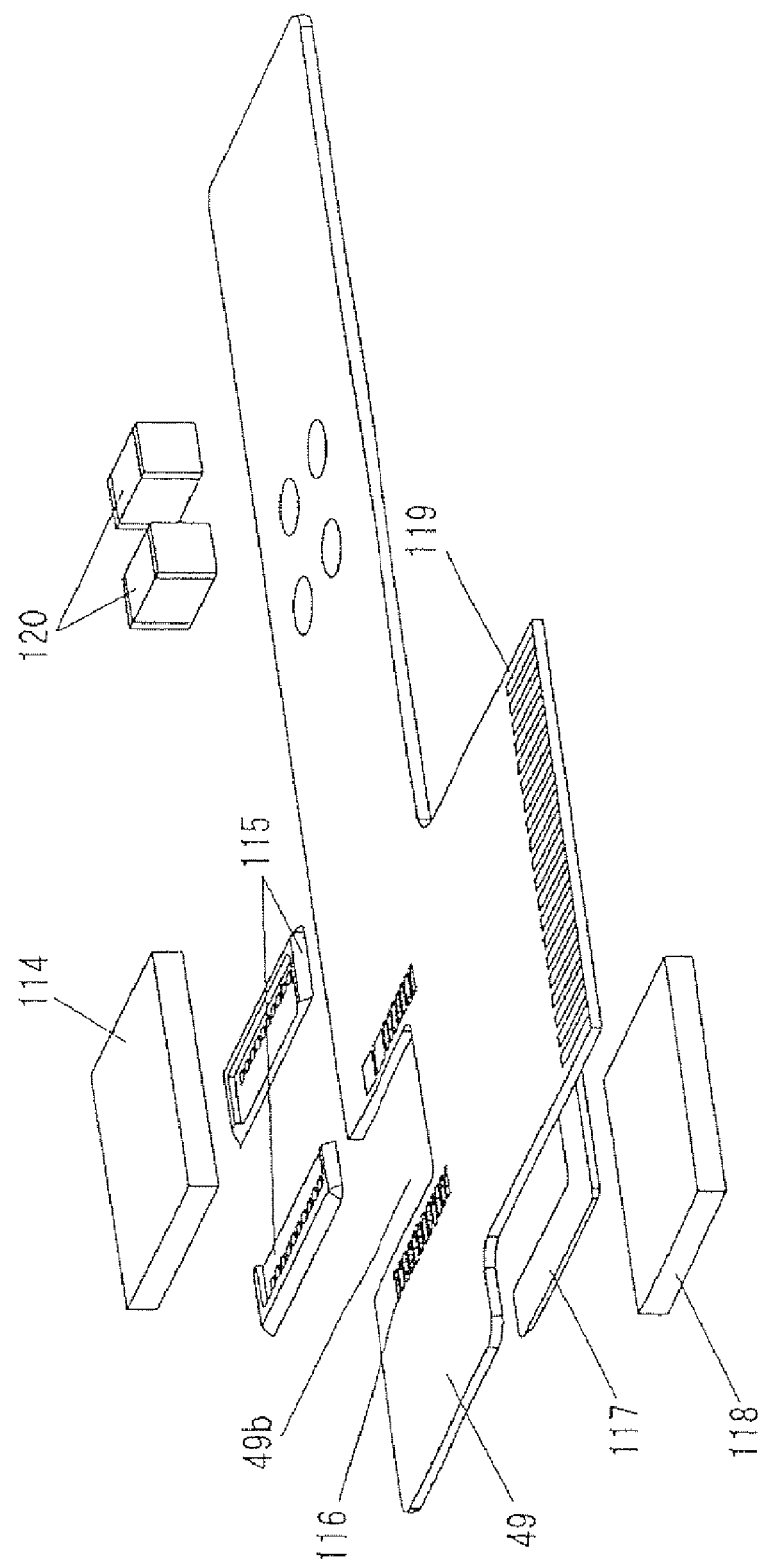
FIG. 42 is a diagram showing a portion of the optical pickup device according to the embodiment of the invention.

In FIG. 37, the through-hole 115a having a substantially rectangular shape is provided in the center of the adhesive resin layer 115 for fixing a light receiving element. However, if the adhesive resin layer 115 is provided at least between the electrode pads 114c of the light receiving element 114 and the electrode pad sections 116 of the flexible printed board 49, the adhesive resin layer 115 may be composed of two pieces of small adhesive resin layers, as shown in FIG. 41. In such a construction, the through-hole 115a does not need to be provided in the adhesive resin layer 115, and the used amount of adhesive resin layer 115 can be reduced.

As a wiring board, the flexible printed board 49 is preferably used. Further, other wiring boards such as a glass epoxy board, a ceramic board and the like can be used. However, when the flexible printed board 49 is used, it is possible to construct a light and slim optical pickup device.

As shown in FIG. 37, the light receiving element 114 and the flexible printed board 49 is fixed to each other by so-called flip-chip mounting, in which the light receiving element 114 having the bumps 114d formed thereon is fixed to the electrode pad sections 116 by pressing and heating, with the adhesive resin layer 115 interposed therebetween. As the adhesive resin layer 115, an anisotropic conductive film (ACF) is preferably used. However, the adhesive resin layer 115 is not limited thereto.

Further, the transparent glass substrate 118 is fixed to the rear surface of the flexible printed board 49, having the light receiving element 114 mounted thereon, by pressing and heating with the adhesive 117 interposed therebetween. Further, the through-hole 49a passing the reflected light from the optical disk is provided in the substantial center between the lines of the electrode pads 114c arranged in two lines on the flexible printed board 49, so that the reflected light from the optical disk, which is incident from the side of the transparent glass substrate 118, can reach the light detecting section 114a within the light receiving element 114. In such a construction, the light detecting section 114a within the light receiving element 114 can be hermetically sealed, and the protection of connection between the light receiving element 114 and the electrodes and the fixing between the parts can be secured.

In the above descriptions, the through-hole 49a is provided in the flexible printed board 49. However, if the reflected light from the information recording surface of the optical disk, which has passed through the transparent glass substrate 118, can reach the light detecting section 114a of the light receiving element 114, a notched portion 49b shown in FIG. 42 can be provided in the flexible printed board 49. The notched portion 49b can be provided by a pressing process after the flexible printed board 49 is formed, or can be provided when the outer shape of the flexible printed board 49 is formed.

Figure 43:
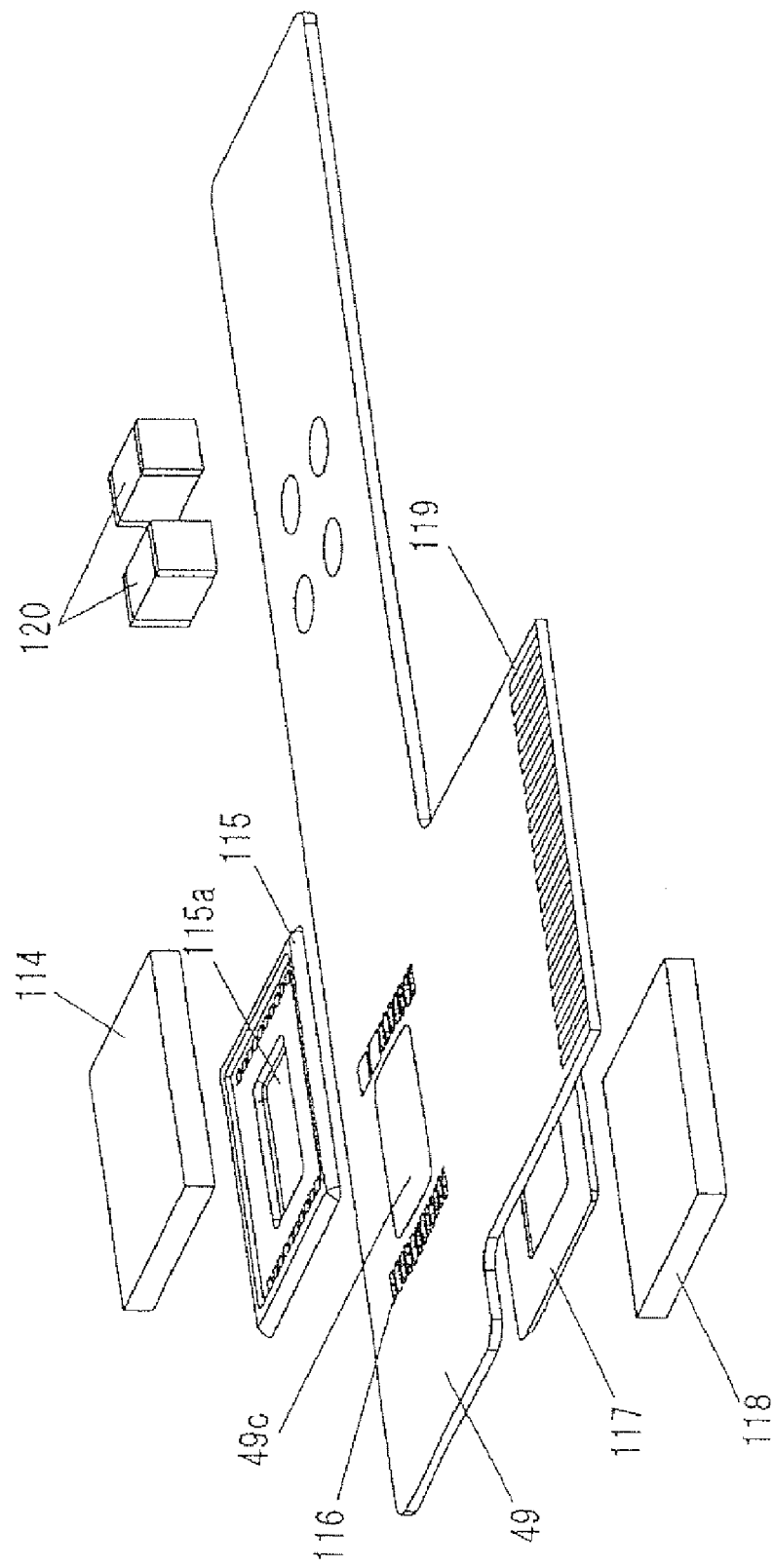
FIG. 43 is a diagram showing a portion of the optical pickup device according to the embodiment of the invention.

Similarly, if the reflected light from the information recording surface of the optical disk, which has passed through the transparent glass substrate 118, can reach the light detecting section 114a of the light receiving element 114, a window portion 49c may be provided, the window portion 49c being combined with the flexible printed board 49. The window portion 49c is a transparent glass member. In FIG. 43, the window portion 49c is formed in such a shape that a transparent glass member is assembled into the through-hole 49a which has been explained using FIG. 37. However, the window portion 49c may be formed in such a shape that a transparent glass member is assembled into the through-hole 49a or the notched portion 49b or may be formed in another shape. Since the window portion 49c is not degraded by the transmission of short-wavelength laser, the reflected light from the information recording surface of the optical disk can be effectively guided to the light detecting section 114a of the light receiving element 114. Further, when the window portion 49c is provided in the flexible printed board 49, it is also considered that the light receiving section 1b of the short wavelength optical unit 1 is constructed without the transparent glass substrate 118.

Figure 44:
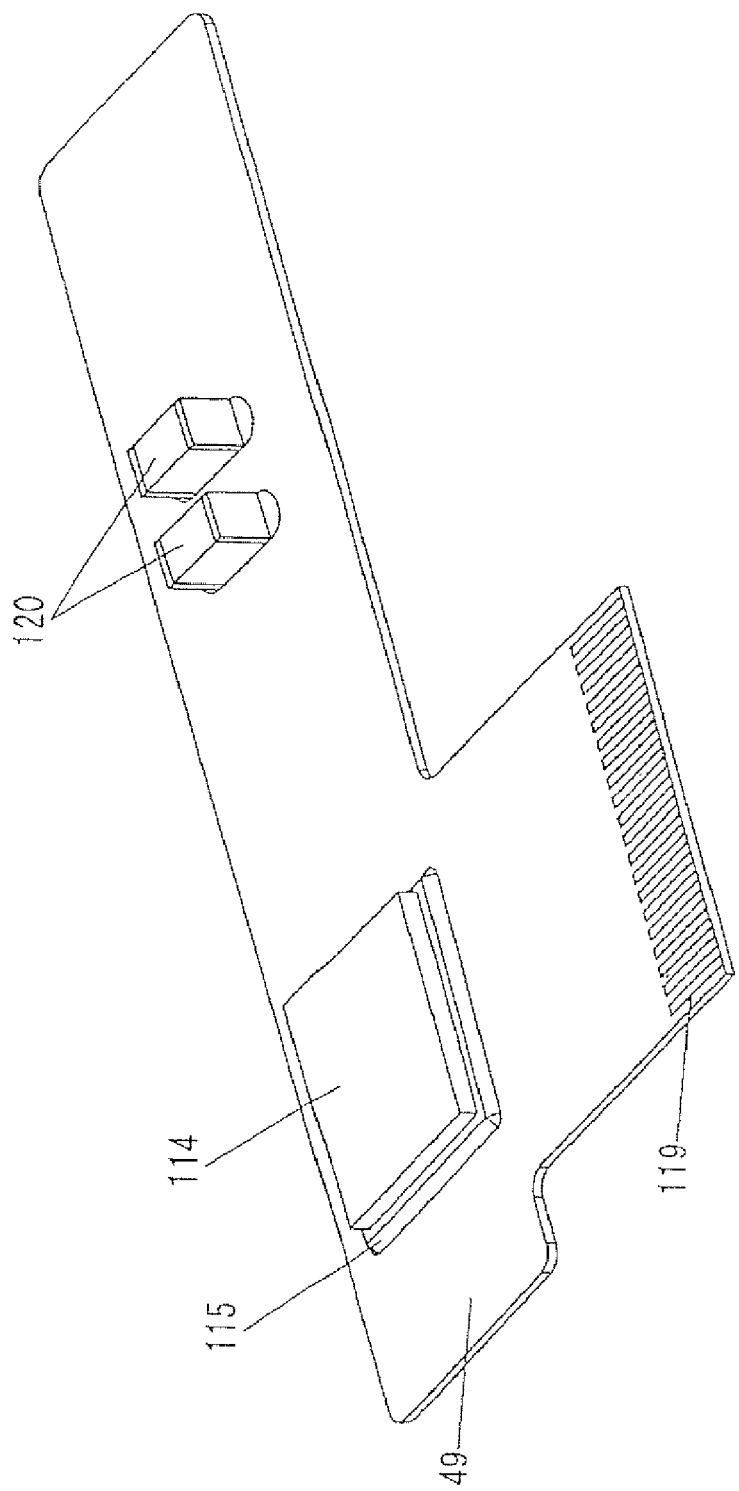
FIG. 44 is a diagram showing a portion of the optical pickup device according to the embodiment of the invention.

FIG. 44 is a perspective view of a flexible printed board unit 121 constructed and assembled as described above.

As such, the light receiving element 114 composed of a bare chip IC is mounted on the flexible printed board 49 by using flip-chip mounting, thereby constructing a light receiving unit 123. Then, a photoelectric conversion integrated circuit device of a package which is sealed by a lid made of glass does not need to be manufactured, and the light receiving section 1b corresponding to short-wavelength laser can be constructed at a low cost. Further, the light receiving element 114 composed of a bare chip IC is mounted on the flexible printed board 49 as it is. Therefore, it is possible to achieve the miniaturization of the optical pickup device.

Figure 45:
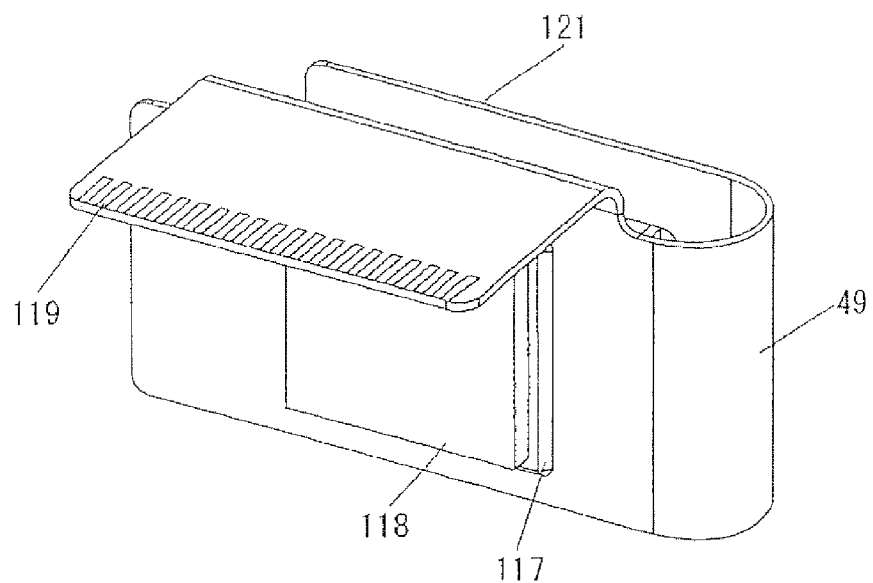
FIG. 45 is a diagram showing a portion of the optical pickup device according to the embodiment of the invention.

FIG. 45 is a perspective view showing a state where the flexible printed board unit 121 shown in FIG. 44 is bent. The decoupling capacitor 120 between power source grounds is soldered on the surface of the flexible printed board 49 and is then folded so as to face the rear surface of the surface having the light detecting section 114a of the light receiving element 114.

Figure 46:
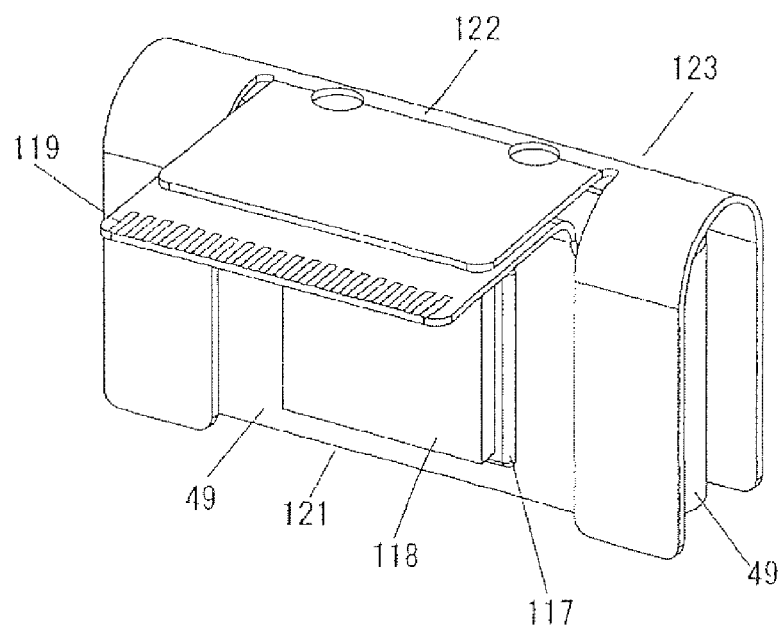
FIG. 46 is a diagram showing a portion of the optical pickup device according to the embodiment of the invention.

FIG. 46 is a perspective view of the light receiving unit 123. Reference numeral 122 represents a flexible printed board housing part which houses and holds the flexible printed board unit 121. The bent flexible printed board unit 121 shown in FIG. 45 is fixed to the flexible printed board housing part 122 by using a light-curing adhesive. As the adhesive, a light-curing adhesive such as ultraviolet curing adhesive is used, which is cured when ultraviolet rays are irradiated thereon. However, an instant adhesive or another adhesive may be used. Further, the flexible printed board unit housing part 122 is formed of metal or resin. Preferably, metal is used.

Figure 47:
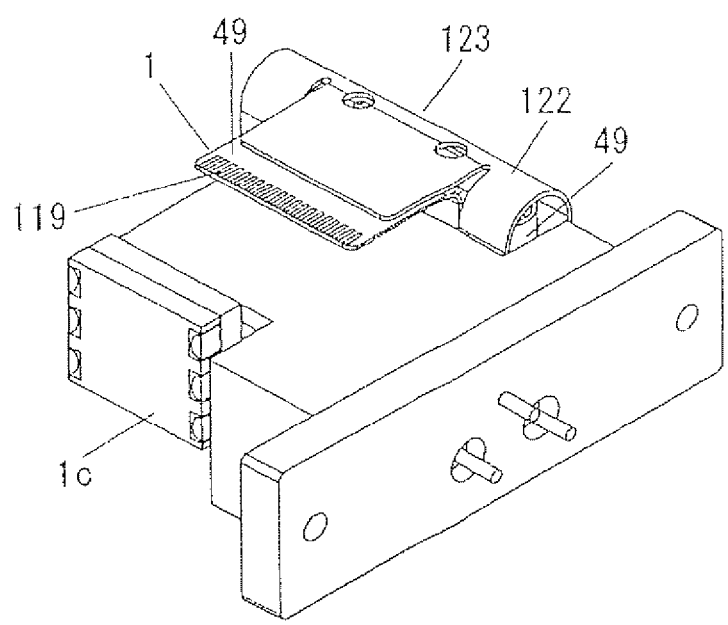
FIG. 47 is a diagram showing a portion of the optical pickup device according to the embodiment of the invention.
Figure 48:
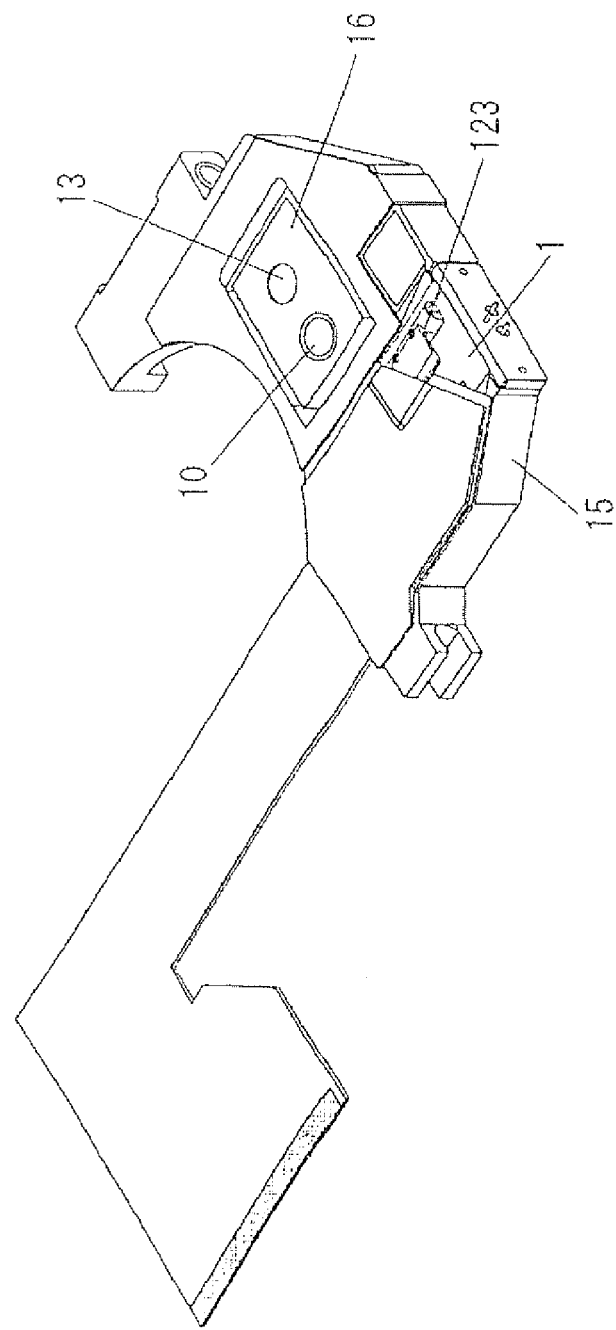
FIG. 48 is a diagram showing a portion of the optical pickup device according to the embodiment of the invention.

FIG. 47 is a diagram illustrating the short wavelength optical unit 1 using the light receiving unit 123 serving as the light receiving section 1b. Reference numeral 1c represent a light receiving section which is provided so as to monitor an amount of light emitted from the light source section 1a (not shown) of the short wavelength optical unit 1. After relative positions with respect to the wave length optical unit 1 are fine-adjusted, the light receiving unit 123 and the light receiving section 1c are fixed to the short wavelength optical unit 1 and are then embedded in the base 15, as shown in FIG. 48. The light receiving unit 123 is fixed to the loading section 43 of the short wavelength optical unit 1 by using a light-curing adhesive, after the flexible printed board unit housing part 122 is fine-adjusted with respect to the short wavelength optical unit 1 in a state where it is held by a jig. As the adhesive, a light-curing adhesive such as ultraviolet curing adhesive is also used, which is cured when ultraviolet rays are irradiated thereon. However, an instant adhesive or another adhesive may be used.

In the light receiving unit 123, the flexible printed board unit 121 is housed and held by the flexible printed board unit housing part 122 which is more robust than the flexible printed board unit 121. Therefore, the fine adjustment of the relative position with respect to the short wavelength optical unit 1 can be smoothly performed.

Here, an operation will be simply described with reference to FIG. 48, focusing on a recoding information reproducing function of the optical pickup device.

Inside the optical pickup device shown in FIG. 48, laser light (outward light) for recording information reproduction, irradiated by the short wavelength optical unit 1, is focused on the information recording surface of the optical disk (not shown) through a plurality of optical elements (not shown) by the object lens 13.

The light (inward light) reflected by the information recording surface of the optical disk follows the same light path as the outward light immediately before the inward light reaches the beam splitter (not shown) inside the short wavelength optical unit 1. Then, the light is turned in the direction of the light receiving unit 123 by the operation of the beam splitter.

Figure 49:
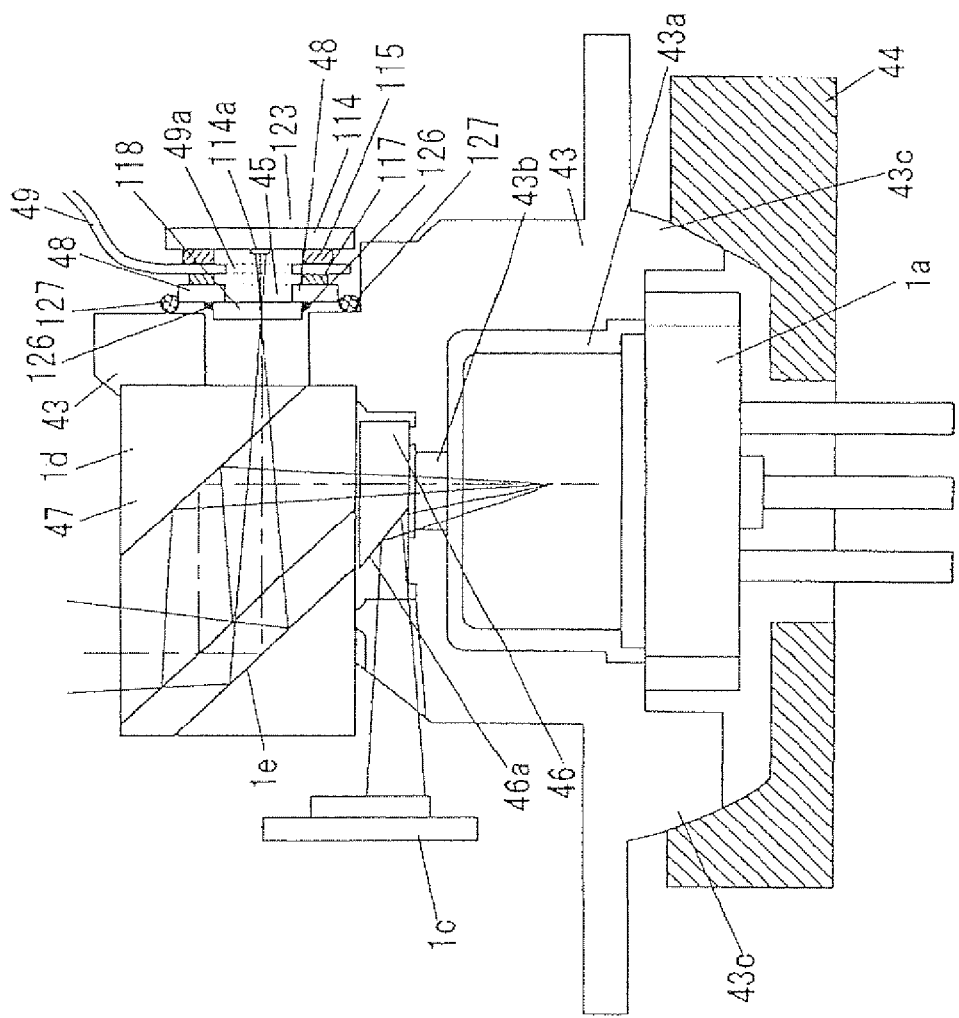
FIG. 49 is a diagram showing a portion of the optical pickup device according to the embodiment of the invention.

Next, other components of the light receiving unit 123 serving as the light receiving section 1b will be shown with reference to FIG. 49.

The construction of the light receiving element 123 shown in FIG. 49 is the same as that of the light receiving unit 123 described by referring to FIGS. 37 to 48, except that the flexible printed board unit housing part 122 for housing the flexible printed board unit 121 is not provided and the light receiving section attaching portion 48 is provided between the flexible printed board 49 and the transparent glass substrate 118. The light receiving section attaching portion 48 is provided separately from the loading section 43 so as to fix the flexible printed board 49 and the light receiving element 114 to the short wavelength optical unit 1, the light receiving element 114 being fixed to the flexible printed board 49. Preferably, the loading section 43 is formed of a metallic material such as zinc die-cast. In the light receiving element 114 composed of a bare chip IC, the light detecting section 114a for detecting laser light is directed toward the flexible printed board 49 having the through-hole 49a. The light receiving element 114 and the flexible printed board 49 are bonded to each other by pressing and heating, with the adhesive resin layer 115 for fixing a light receiving element interposed therebetween. The adhesive resin layer 115 is formed of an anisotropic conductive film (ACF). The light receiving section attaching portion 48 is disposed in the side opposite to the side of the flexible printed board 49 where the light receiving element 114 is fixed. The light receiving section attaching portion 48 is formed of a metallic plate and has the through-hole 45 provided in the center thereof. The light receiving section attaching portion 48 is bonded to the flexible printed board 49 by using the adhesive 117 which is an organic adhesive such as a heat-curing adhesive. The transparent glass substrate 118 is disposed in the side of the light receiving section attaching portion 48 opposite to the flexible printed board 49 so as to block the through-hole 45 of the light receiving section attaching portion 48. The transparent glass substrate 118 is bonded by the adhesive 126 such as a light-curing adhesive. The light receiving unit 123 constructed in such a manner is fixed to the loading section 43 of the short wavelength optical unit 1 by a light-curing adhesive or the like, after the position thereof is fine-adjusted with respect to the short wavelength optical unit 1.

Preferably, the light receiving section attaching portion 48 is formed of a metallic material such as zinc die-cast. As the light receiving section attaching portion 48 is formed of a metallic material such as zinc die-cast, the position of the light detecting section 114a of the light receiving unit 123 can be reliably fine-adjusted with respect to the short wavelength optical unit 1, and the loading section 43 formed of a metallic material can be easily fixed by the adhesive 127 or the like. As the adhesive 127, a light-curing adhesive such as ultraviolet curing adhesive is used, which cures when ultraviolet rays are irradiated thereon. Then, the loading section 43, of which the position has been fine-adjusted, and the light receiving unit 123 can be easily bonded to each other.

As described by referring to FIGS. 36 to 49, resin is not present in the path to the light emitting element of the reflected light from the optical disk. Therefore, even in the optical disk drive using short-wavelength laser, which is considered to be the mainstream in the future, the light receiving section 1b is suppressed from being degraded by the passing of laser, so that high-efficiency light detection can be performed.

In the light receiving section 1b, the electrode of the light receiving element 114 composed of a bare chip IC is directly connected to the electrode pad section 116 on the flexible printed board 49. Therefore, the dimension of the light receiving unit in the thickness direction of the optical pickup device can be reduced so that the optical disk drive can be reduced in size.

In the above descriptions, the flexible printed board 49 is provided between the light receiving element 114 and the transparent glass substrate 118 in the light receiving section 1b of the short wavelength optical unit 1, and the light receiving section 1b and the transparent glass substrate 118 are disposed to face each other through the through-hole 45 of the flexible printed board 49. However, as the light receiving section 1c of the short wavelength optical unit 1 is constructed in the same manner, the light receiving section 1b is suppressed from being degraded by the passing of short-wavelength laser such that light detection can be effectively performed. The light receiving sections 3b and 3c of the long wavelength optical unit 3 can be constructed in the same manner.

Figure 50:
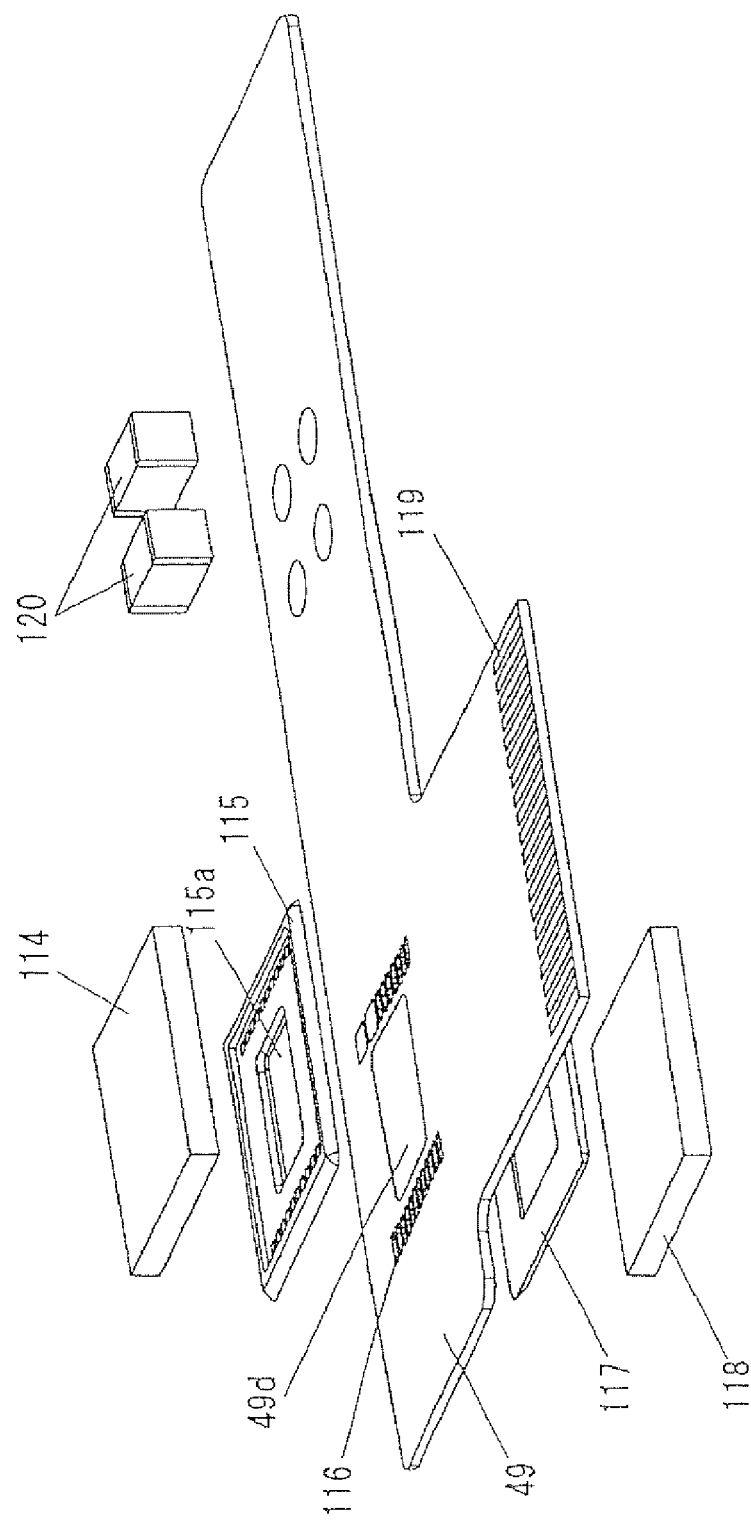
FIG. 50 is a diagram showing a portion of the optical pickup device according to the embodiment of the invention.

Hereinafter, the light receiving section 3b of the long wavelength optical unit 3 will be described with reference to FIG. 50. Moreover, members to which the same reference numerals as those shown in FIGS. 36 to 49 are attached have the same functions, FIGS. 36 to 49 describing the light receiving section 1b of the shot wavelength optical unit 1. In FIG. 50, the members correspond to long-wavelength laser.

In FIG. 50, reference numeral 49d represents a transparent board section formed of transparent resin in the flexible printed board 49. The reflected light from the information recording surface of the optical disk is transmitted through the transparent glass substrate 118 and is then transmitted through the transparent board section 49d so as to reach the light detecting section 114a of the light receiving element 114. The transparent board section 49d may be such a member that a portion corresponding to the through-hole 49a or the notched portion 49b is constructed by using a transparent resin member. Alternately, the transparent board section 49d may be formed in another shape. With the transparent board section 49d being provided in the flexible printed board 49, the reflected light from the information recording surface of the optical disk can be effectively guided to the light detecting section 114a of the light receiving section 114, even though the through-hole 49a or the notched portion 49b is not provided. Further, when the transparent board section 49d is provided in the flexible printed board 49, it is also considered that the light receiving section 3b of the long wavelength optical unit 3 is constructed without the transparent glass substrate 118. Further, the transparent board section 49d serving as a light transmitting section of the flexible printed board 49 may be formed of an opaque member, if the member can effectively transmit light. Further, the transparent board section 49d may be formed of another member except for resin.

In FIG. 50, the transparent board section 49d is provided in the flexible printed board 49. However, if the flexible printed board 49 itself is formed of transparent resin, the flexible printed board 49 may be constructed without the transparent board section 49d.

As described above, the light receiving section 3c can be constructed in the same manner as the light receiving section 3b of the long wavelength optical unit 3.

The light transmitting sections such as the transparent glass substrate 118 and the window portion 49c formed of transparent glass can be formed of an opaque member or another member except for glass, if the member can effectively transmit light.

As described with reference to FIGS. 36 to 50, the transparent glass substrate 118 is fixed to the rear surface of the flexible printed board 49 having the light receiving element 114 mounted thereon by pressing and heating, with the adhesive 117 interposed therebetween. Further, the light transmitting section is provided in the center between two lines of the electrode pad sections 116 arranged in two lines on the flexible printed board 49, and the light receiving unit 123 is constructed in which the reflected light from the optical disk, incident from the side of the transparent glass substrate 118, reaches the light detecting section 114a within the light receiving element 114. Therefore, the light receiving section can be constructed at a low cost, and the dimension thereof in the thickness direction of the optical pickup device can be reduced.

Figure 51:
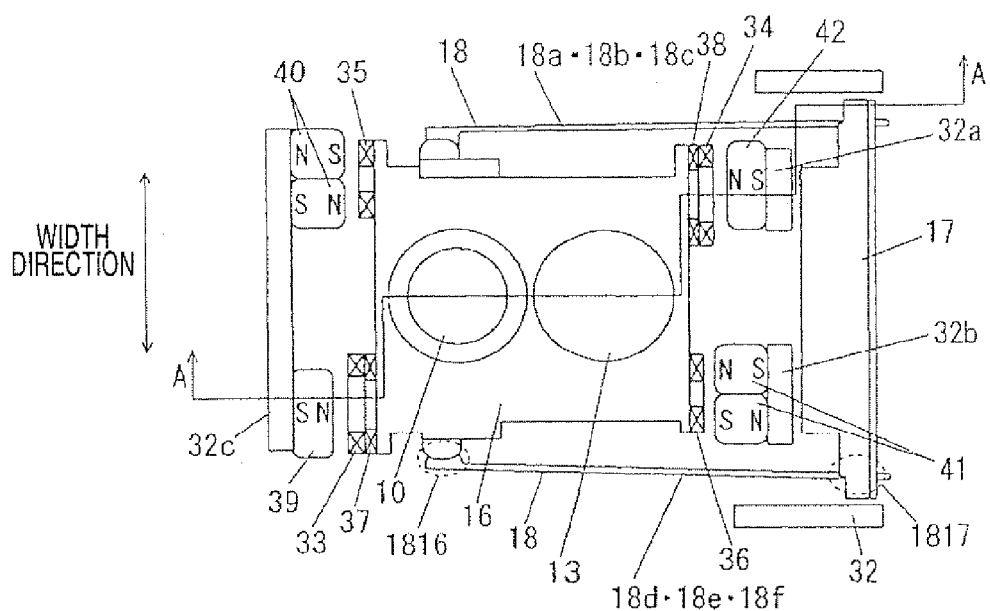
FIGS. 51a and 51b are diagrams showing a portion of the optical pickup device according to the embodiment of the invention.
Figure 51:
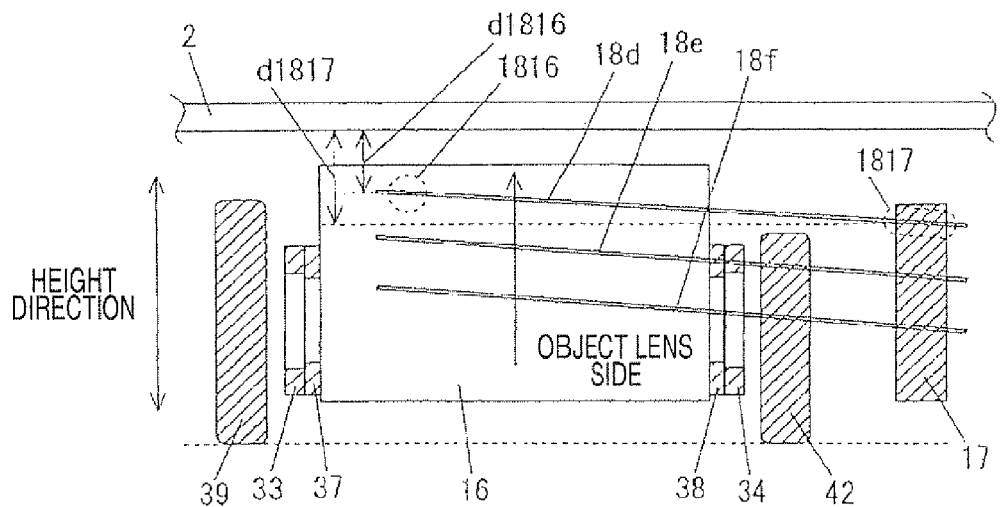
Figure 52:
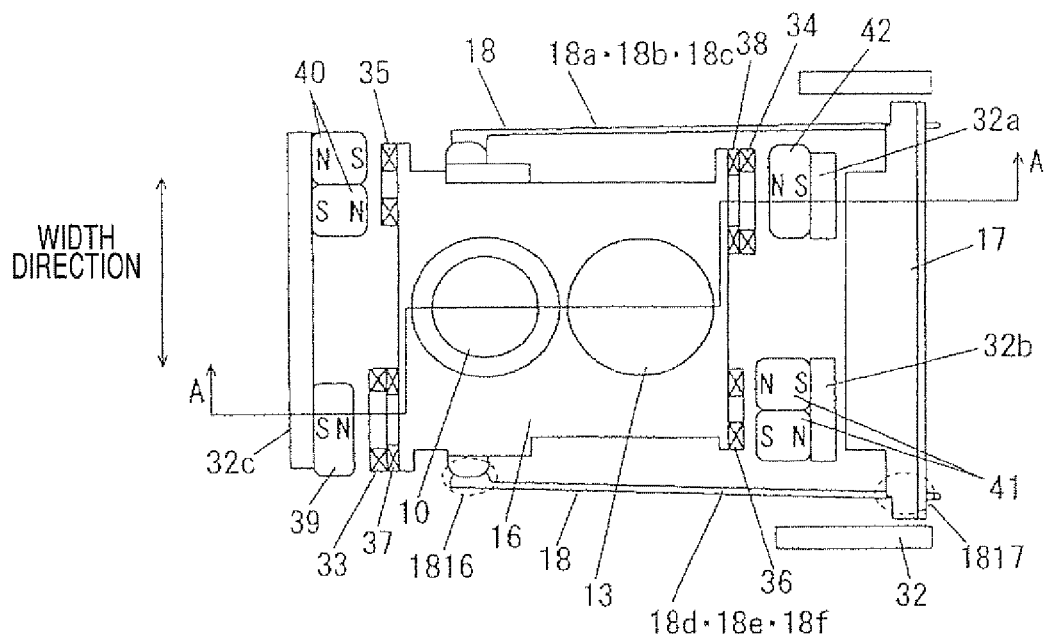
FIGS. 52a and 52b are diagrams showing a portion of the optical pickup device according to the embodiment of the invention.
Figure 52:
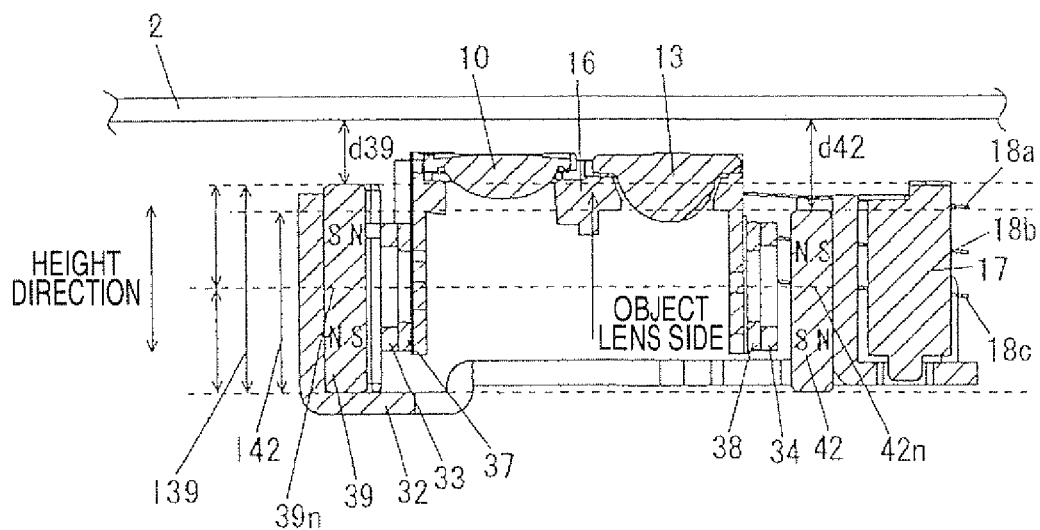

Next, the construction of the magnets 39 to 42 of the optical pickup device will be described in detail with reference to FIGS. 51 to 53. Further, members shown in FIGS. 51 to 53 have a slightly different shape from the members shown in FIGS. 6 to 7. However, the members to which the same reference numerals are attached have the same functions.

First, the suspensions 18 will be described with reference to FIG. 51. FIG. 51A is a diagram illustrating the optical pickup device according to this embodiment, and FIG. 51B is a sectional view taken along A-A line of FIG. 51A. In FIG. 51B, the suspensions 18d, 18e, and 18f are shown for description. FIG. 51B shows a positional relationship among the optical disk 2, the lens holder 16, the suspension holder 17, the suspensions 18d, 18e, and 18f, the focus coils 33 and 34, the tracking coils 37 and 38, and the magnets 39 and 42, when an electric current does not flow in the focus coils 33 and 34, the tracking coils 35 and 36, and the sub-tracking coils 37 and 38, that is, when the lens holder 16 is not driven.

In FIG. 51B, descriptions will be made by attaching reference numeral to the suspension 18d. However, as the suspensions 18f and 18e are also suspended substantially parallel to the suspension 18d between the lens holder 16 and the suspension holder 17, the same effect can be obtained. The suspensions 18a, 18b, and 18c, which are positioned in the side of the lens holder 16 opposite to the suspensions 18d, 18e, and 18f and are not shown in FIG. 51B, have the same effect. Hereinafter, the suspensions 18a, 18b, 18c, 18d, 18e, and 18f are collectively referred to as the suspensions 18.

In FIGS. 51A and 51B, reference numeral 1816 represents a coupling portion in which the suspension 18 is coupled to the lens holder 16, and reference numeral 1817 represents a coupling portion in which the suspension 18 is coupled to the suspension holder 17. The suspension 18 is elastically deformed more in the side of the suspension holder 17 than in the coupling portion 1816 and more in the side of the lens holder 16 than in coupling portion 1817, that is, between the coupling portion 1816 and the coupling portion 1817. Then, the suspension 18 moves the lens holder 16 in the height direction and the width direction shown in FIGS. 51A and 51B, respectively.

As shown in FIG. 51B, the coupling portion 1816 between the suspension 18 and the lens holder 16 is positioned closer to the object lenses 10 and 13 than the coupling portion 1817 between the suspension 18 and the suspension holder 17. Here, the side of the object lenses 10 and 13 serving as condensing members in the optical pickup device according to this embodiment indicates a direction where short-wavelength laser or long-wavelength laser, emitted from the short wavelength optical unit 1 or the long wavelength optical unit 3 so as to pass through the beam splitter 7, the collimator lens 8 or the like, is emitted toward the optical disk 2 from the object lenses 10 and 13. Next, the relationship with the optical disk 2 will be described.

Reference numerals d1816 and d1817, respectively, represent distances between the coupling portions 1816 and 1817 and the surface of the optical disk 2 on which information is recoded, the optical disk 2 being mounted on the spindle motor 25. As shown in FIG. 51B, the relationship between the distances d1816 and d1817 when the lens holder 16 is not driven is as follows: distance d1816<distance d1817. That is, the suspension 18 is supported obliquely in a direction approaching the optical disk 2 by the suspension holder 17 so as to elastically support the lens holder 16. In other words, the coupling portion 1817 between the suspension 18 and the suspension holder 17 is closer to the optical disk 2 than the coupling portion 1816 between the suspension 18 and the lens holder 16.

In such a construction, the suspension holder 17 and the suspensions 18 are supported in the position separated from the optical disk 2. Therefore, the suspension holder 17 itself can be constructed in a low level in the optical pickup device, which makes it possible to achieve the miniaturization of the optical disk drive.

Next, the magnets 39 to 42 will be described with reference to FIGS. 52A and 52B. FIG. 52B is a sectional view taken along A-A line of FIG. 51A.

In FIGS. 52A and 52B, the magnets 39 and 42, respectively, are focus magnets which drive the lens holder 16 in the height direction shown in FIG. 52B, and the magnets 40 and 41, respectively, are tracking magnets which drive the lens holder 16 in the width direction shown in FIG. 52A. The magnets 39 to 42 are magnetized and disposed as described by referring to FIGS. 6 to 8. As in FIGS. 6 and 7, the magnet 42 serving as a focus magnet is disposed between the lens holder 16 and the suspension holder 17, and the magnet 39 serving as a focus magnet is disposed in the opposite side to the magnet 42 by reference to the lens holder 16. Further, the magnet 41 serving as a tracking magnet is disposed between the lens holder 16 and the suspension holder 17, and the magnet 40 serving as a tracking magnet is disposed in the opposite side to the magnet 41 by reference to the lens holder 16. Further, the magnets 39 and 42 are disposed in diagonal positions of the lens holder 16, and the magnets 40 and 41 are disposed in the other diagonal positions of the lens holder 16. The ends of the magnets 39 to 42 in the height direction which are opposite to the ends thereof at the optical disk 2, that is, the lower ends of the magnets 39 to 42, respectively, are positioned on the same plane. Further, the magnets 39 to 42 are disposed so that the long sides thereof, respectively, are substantially perpendicular to the surface of the optical disk 2 on which information is recorded, the optical disk 2 being mounted on the spindle motor 25.

In FIG. 6, each of the magnets 40 and 41 is composed of one magnet. As shown in FIG. 52A, however, each of the magnets 40 and 41 can be composed of two magnets. The magnet 40 is disposed so that the N-pole of one magnet and the S-pole of the other magnet are exposed so as to face the tracking coil 35. In the width direction, the magnets are disposed so that the magnetic poles can be exposed to the surface facing the tracking coil 35 in an order of the N-pole and the S-pole from the center surface (the cross-section taken along A-A line of FIG. 6) between the suspensions 18a, 18b, and 18c and the suspensions 18d, 18e, and 18f toward the suspensions 18a, 18b, and 18c. The magnet 41 is disposed so that the N-pole of one magnet and the S-pole of the other magnet are exposed so as to face the tracking coil 36. In the width direction, the magnets can be disposed so that the magnetic poles are exposed to the surface facing the tracking coil 36 in an order of the N-pole and the S-pole from the center surface (the cross-section taken along A-A line of FIG. 6) between the suspensions 18a, 18b, and 18c and the suspensions 18d, 18e, and 18f toward the suspensions 18d, 18e, and 18f.

In such a construction, the magnet pole disposition described in FIG. 6 can be achieved. Further, when each of the magnets is composed of one magnet as described in FIG. 6, portions of the magnets 40 and 41, which are not magnetized because the orientations of magnet poles of the magnets 40 and 41 are switched, can be reduced, and the operation sensitivity of the lens holder 16 in the width direction can be increased.

Referring to FIG. 52B, the magnets 39 and 42 serving as focus magnets, which drive the lens holder 16 in the height direction, will be described in detail.

As shown in FIG. 52B, the magnet 39 disposed in the opposite side to the lens holder 16 is constructed so as to project toward the object lenses 10 and 13 more than the magnet 42 disposed between the lens holder 16 and the suspension holder 17. Hereinafter, the descriptions will be made by using the relationship with the optical disk 2.

In FIG. 52B, reference numerals 139 and 142, respectively, represent the lengths of the magnets 39 and 42 in the height direction, that is, the lengths of the long sides of the magnets 39 and 42. Reference numerals d39 and d42, respectively, represents distances from the surface of the optical disk 2, on which information is recorded, to the magnets 39 and 42 in a state where the optical disk 2 is mounted on the spindle motor 25.

The relationship between the lengths of the magnets 39 and 42 is as follows: length 139>length 142. That is, the magnet 42 is shorter than the magnet 39. The relationship among the dimensions d39, d42, 139, and 142 related to the magnets 39 and 42 is expressed by the following equation: d39+139≈d42+142. That is, the distance from the optical disk 2 to the lower end of the magnet 39 is substantially equal to the distance from the optical disk 2 to the lower end of the magnet 42. In other words, the distance from the surface of the optical disk 2 on which information is recorded to the end of the magnet 39 in the height direction which is opposite to the end thereof at the optical disk 2 is substantially equal to the distance from the surface of the optical disk 2 on which information is recorded to the end of the magnet 42 in the height direction which is opposite to the end thereof at the optical disk 2, in a state where the optical disk 2 is mounted on the spindle motor 25. Accordingly, the relationship between the distance d39 between the optical disk 2 and the magnet 39 and the distance d42 between the optical disk 2 and the magnet 42 is as follows: d39<d42. That is, the distance from the optical disk 2 to the end of the magnet 42 in the height direction at the optical disk 2 is larger than the distance from the optical disk 2 to the end of the magnet 39 at the optical disk 2.

Further, the distance from the extending surface of an optical-disk mounting surface of the spindle motor 25, on which the optical disk 2 is mounted, to the end of the magnet 42 in the height direction at the optical disk 2 is larger than the distance from the extending surface to the end of the magnet 39 at the optical disk 2.

Further, as for the distance from the case of the object lenses 10 and 13 of the optical disk, the distance from the case of the optical disk at the optical disk 2 to the end of the magnet 42 in the height direction at the optical disk 2 is larger than the distance from the case of the optical disk to the end of the magnet 39 in the height direction at the optical disk 2.

The distances between the optical disk 2 and the magnets 40 and 41, which are tracking magnets for driving the lens holder 16 in the width direction, are substantially equal to d39, and the ends of the magnets 40 and 41 in the height direction at the optical disk 2 and the end of the magnet 39 at the optical disk 2 are positioned at the same distance from the optical disk 2. Further, the lengths of the magnets 40 and 41 in the height direction, that is, the lengths of the long sides of the magnets 40 and 41 are equal to the length of the magnet 39, which is represented by 139. The distances from the optical disk 2 to the lower ends of the magnets 40 and 41, respectively, are substantially equal to the distance from the optical disk 2 to the lower end of the magnet 39. Further, the distances are substantially equal to d39+139. That is, the distances from the surface of the optical disk 2, on which information is recorded, to the ends of the magnets 39 to 42 in the height direction, which are opposite to the ends thereof at the optical disk 2, are substantially equal to each other, in a state where the optical disk 2 is mounted on the spindle motor 25. In other words, the lower end surfaces of the magnets 39 to 42, formed by connecting the ends of the magnets 39 to 42 in the height direction which are opposite to the ends thereof at the optical disk 2, is substantially parallel to the surface of the optical disk 2 on which the information is recorded.

As shown in FIG. 52B, the magnets 39 and 42 are magnetized and disposed in such a manner as described in FIGS. 6 and 7. Reference numerals 39*n* and 42*n* represent a neutral zone which occurs in a portion where the orientations of magnetic poles of the magnets 39 and 42 are switched and which is not magnetized. The neutral zone 39*n* is positioned at half the length of the magnet 39 in the longitudinal direction, and the length from the lower end of the magnet 42 to the neutral zone 42*n* is set to be substantially equal to the length from the lower end of the magnet 39 to the neutral zone 39*n*. That is, the lower end surface of the magnets 39 to 42 is substantially parallel to a surface formed by connecting the neutral zones 39*n* and 42*n*. Further, when the lens holder 16 is not driven, the center positions of the focus coils 33 and 34 and the sub-tracking coils 37 and 38 in the height direction coincide with the position of the surface formed by connecting the neutral zones 39*n* and 42*n* in the height direction. In other words, a portion corresponding to the S-pole of the magnet 39 facing the focus coil 33 and the sub-tracking coil 37, a portion corresponding to the N-pole of the magnet 39 facing the focus coil 33 and the sub-tracking coil 37, and a portion corresponding to the S-pole of the magnet 42 facing the focus coil 34 and the sub-tracking coil 38 have the same area as each other. However, a portion corresponding to the N-pole of the magnet 42 facing the focus coil 34 and the sub-tracking coil 38 has a smaller area than the above-described portions. Such a construction can suppress the tilting of the lens holder 16, which occurs when the lens holder 16 is driven.

Figure 53:
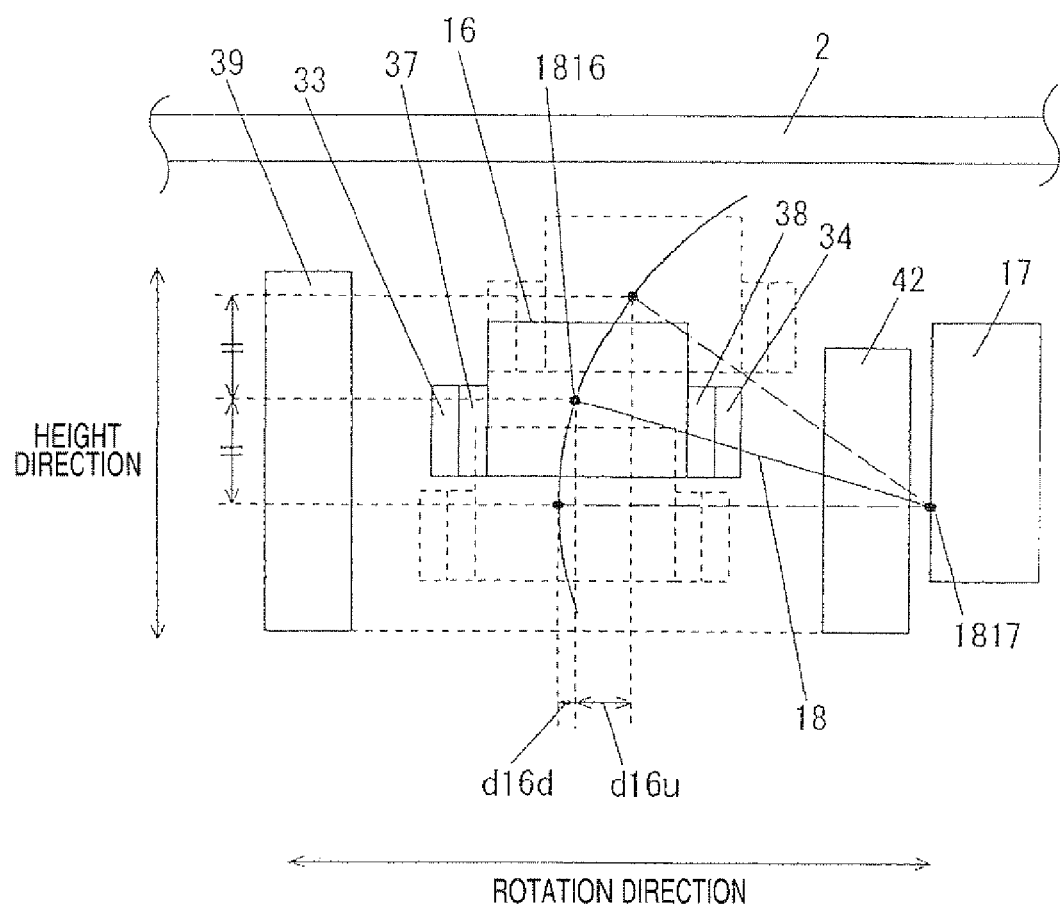
FIG. 53 is a diagram showing a portion of the optical pickup device according to the embodiment of the invention.

FIG. 53 is a diagram for schematically explaining the behavior of the lens holder 16 when an electric current flows in the focus coils 33 and 34 so as to drive the lens holder 16 up and down in the height direction. In FIG. 53, the suspensions 18*a* to 18*f* are collectively shown as the suspension 18. If the suspension 18 is seen from the width direction of FIG. 51A, the suspension 18 has such a straight-line shape as shown in FIG. 51B, when the lens holder 16 is not driven. Further, the suspension 18 is fixed to the lens holder 16 and the suspension holder 17, respectively, by the coupling portions 1816 and 1817. Practically, when the lens holder 16 is driven, the suspension 18 itself is curved so that the lens holder 16 moves in the height direction. However, FIG. 53 schematically shows that the suspension 18 has a straight line shape even when the lens holder 16 is driven.

When the lens holder 16 is moved equally up and down in the height direction from a non-driving position shown by a solid line of FIG. 53, the suspension 18 is stretched obliquely with respect to the surface of the optical disk 2 on which information is recorded. Therefore, a large difference occurs in displacement in the rotation direction (tangential direction) of the optical disk 2 shown in FIG. 53.

When an electric current flows in the focus coils 33 and 34 so as to move the lens holder 16 in a direction away from the optical disk 2, the distance between the focus coil 33 and the magnet 39 and the distance between the focus coil 34 and the magnet 42 do not change too much.

Therefore, there is no large difference between electromagnetic power generated in the side of the focus coil 34 and electromagnetic power generated in the side of the focus coil 33.

Meanwhile, when an electric current flows in the focus-coils 33 and 34 so as to move the lens holder 16 in a direction approaching the optical disk 2, the difference between the distance between the focus coil 33 and the magnet 39 and the distance between the focus coil 34 and the magnet 42 becomes large. As the lens holder 16 moves in a direction approaching the optical direction, the distance between the focus coil 33 and the magnet 39 becomes large and the electromagnetic power generated in the side of the focus coil 33 becomes small. However, the magnet 42 is constructed to be shorter in the height direction than the magnet 39 (that is, the magnet 42 is positioned in a lower level than the magnet 39). Therefore, as the lens holder 16 moves in a direction approaching the optical disk 2, electromagnetic power of the magnet 42 flowing through the focus coil 34 is reduced, and electromagnetic power generated in the side of the focus coil 34 also becomes small. Accordingly, even when the lens holder 16 is moved in a direction approaching the optical disk 2, there is no large difference between electromagnetic power generated in the side of the focus coil 34 and electromagnetic power generated in the side of the focus coil 33. Therefore, it is possible to suppress the inclination of the lens holder 16.

Next, the inclined-right mirror 9 of the optical pickup device will be described with reference to FIGS. 54 to 59. Further, members shown in FIGS. 54 to 59 have a slightly different shape from the members shown in FIGS. 1 and 5, but have the same functions. Further, although not shown, the optical pickup device shown in FIGS. 54 to 59 is also provided with the quarter wavelength member 9*a* shown in FIGS. 1 and 5.

The inclined-right mirror 9 can be constructed in such a manner as will be described below with reference to FIG. 54.

FIGS. 54A and 54B are diagrams illustrating the inclined-right mirror 9 when the inclined-right mirror 9 is seen from the Z direction of FIG. 5 in a direction of the light flux of laser light which is emitted from the short wavelength optical unit 1 or the long wavelength optical unit 3 so as to pass through the beam splitter 7 or the collimator lens 8. Reference numeral A shown in FIGS. 54A and 54B represents a light flux of laser light reaching the inclined-right mirror 9.

The inclined-right mirror 9 shown in FIG. 9 includes a reflecting plate 9*d* and an actuator 9*e*. The reflecting plate 9*d* is provided with a wavelength selecting film 9*b* and a reflecting section 9*c*. The actuator 9*e* moves the reflecting plate 9*d*. The wavelength selecting film 9*b* and the reflecting section 9*c* are provided on the surface of the reflecting plate 9*d* at the beam splitter 7 and are formed of a dielectric multilayer or metal.

The wavelength selecting film 9*b* provided in the reflecting plate 9*d* has a function of transmitting most of light with a predetermined wavelength regardless of the polarization state and reflecting most of light with other wavelengths regardless of the polarization state. In this embodiment, short-wavelength light (light with a wavelength of about 405 nm) emitted from the short wavelength optical unit 1 is transmitted, and red light (light with a wavelength of about 660 nm) and infrared light (light with a wavelength of about 780 nm) emitted from the long wavelength optical unit 3 are reflected. That is, the wavelength selecting film 9*b* has the same construction and function as that described in FIG. 1.

The reflecting section 9*c* provided in the reflecting plate 9*d* has a function of reflecting most of arriving light regardless of the wavelength or the polarization state. Further, when the wavelength selecting film 9*b* and the reflecting section 9*c* are provided in the reflecting plate 9*d*, the reflecting section 9*c* may reflect light with a predetermined wavelength regardless of the polarization state. In this embodiment, the reflecting section 9*c* may reflect at least short-wavelength light (light with a wavelength of about 405 nm) emitted from the short-wavelength optical unit 1.

The actuator 9e is provided with a gear 9f and a motor (not shown) which rotates the gear 9f. As a motor, a small-sized direct-current motor is used. Meanwhile, a rack gear 9g is provided in one side of the reflecting plate 9d so as to mesh with the gear 9f. The reflecting plate 9d and a case 9h are constructed so as to freely slide.

In the optical pickup device provided with the reflecting plate 9d constructed in such a manner, when the optical disk 2 is mounted on the spindle motor 25 shown in FIGS. 2 to 4, a control member (not shown) discriminates the type of the optical disk 2 and applies a control signal to the actuator 9e. In accordance with the control signal, the actuator 9e drives the motor so as to rotate the gear 9f such that the reflecting plate 9d can be inserted into the case 9h of the actuator 9e. Here, the actuator 9e has been described as a member which moves the reflecting plate 9d by using a motor. However, if the actuator 9e is such an actuator that is driven in accordance with a control signal, a solenoid, a linear motor, a hydraulic piston and the like may be used so as to move the reflecting plate 9d.

FIG. 54A is a diagram showing a state where the reflecting plate 9d is moved by the actuator 9e such that the wavelength selecting film 9b is present on a light path, and FIG. 54B is a diagram showing a state where the reflecting plate 9d is moved by the actuator 9e such that the reflecting section 9c is present on the light path.

Hereinafter, the movement of the reflecting plate 9d depending on the type of the optical disk 2 to be mounted on the spindle motor 25 will be described.

When the optical disk 2 mounted on the spindle motor 25 is an optical disk in which a distance between the surface of the optical disk 2 and the recording layer is 0.1 mm and recording/reproducing of information is performed by short-wavelength light (light with a wavelength of about 405 nm), the inclined-right mirror 9 is set in such a state that the wavelength selecting film 9b of the reflecting plate 9d is positioned on the light path by the driving of the actuator 9e.

Further, even when the optical disk 2 mounted on the spindle motor 25 is an optical disk in which a distance between the surface of the optical disk 2 and the recording layer is 0.6 mm and the recording/reproducing of information is performed by red light (light with a wavelength of about 660 nm), the inclined-right mirror 9 is set in such a state that the wavelength selecting film 9b of the reflecting plate 9d is positioned on the light path by the driving of the actuator 9e.

Further, even when the optical disk 2 mounted on the spindle motor 25 is an optical disk in which a distance between the surface of the optical disk 2 and the recording layer is 1.2 mm and the recording/reproducing of information is performed by infrared light (light with a wavelength of about 780 nm), the inclined-right mirror 9 is set in such a state that the wavelength selecting film 9b of the reflecting plate 9d is positioned on the light path by the driving of the actuator 9e.

Meanwhile, when the optical disk 2 mounted on the spindle motor 25 is an optical disk in which a distance between the surface of the optical disk 2 and the recording layer is 0.6 mm and the recording/reproducing of information is performed by short-wavelength light (light with a wavelength of about 405 nm), the inclined-right mirror 9 is set in such a state that the reflecting section 9c of the reflecting plate 9d is positioned on the light path by the driving of the actuator 9e. Further, even when the optical disk 2 mounted on the spindle motor 25 is an optical disk, in which a distance between the surface of the optical disk 2 and the recording layer is 0.6 mm and the recording/reproducing of information is performed by red light (light with a wavelength of about 660 nm), or an optical disk in which a distance between the surface of the optical disk 2 and the recording layer is 1.2 mm and the recording/ reproducing of information is performed by infrared light (light with a wavelength of about 780 nm), the inclined-right mirror 9 may be set in such a state that the reflecting section 9c of the reflecting plate 9d is positioned on the light path by the driving of the actuator 9e.

Figure 54:
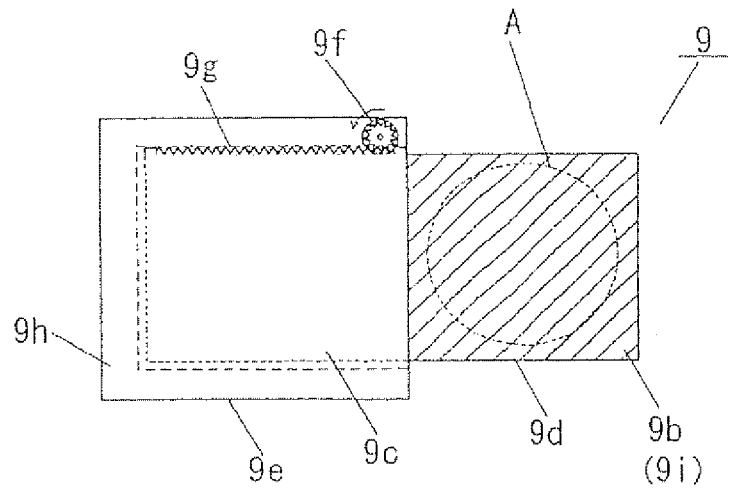
FIGS. 54a and 54b are diagrams showing a portion of the optical pickup device according to the embodiment of the invention.
Figure 54:
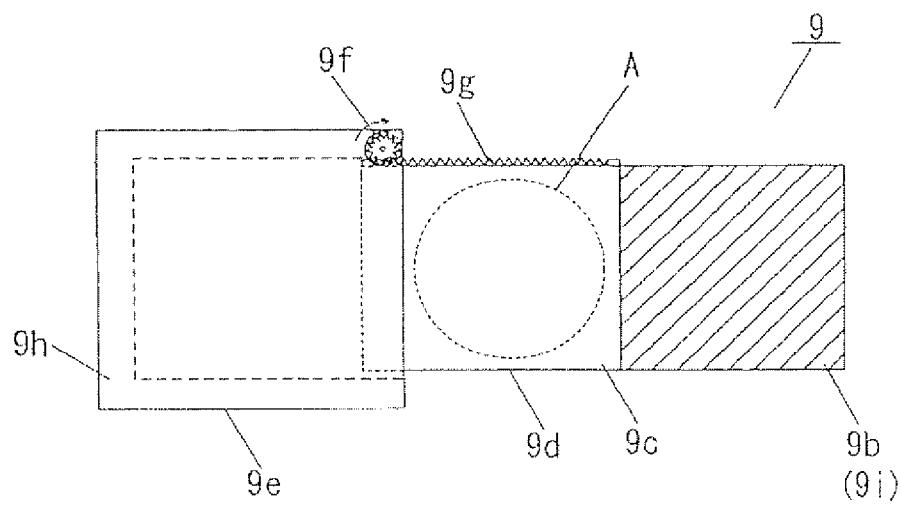

FIGS. 55A and 55B are schematic views illustrating a light path of laser light in the optical pickup device using the inclined-right mirror 9 of FIG. 54. FIG. 55A shows a state where the wavelength selecting film 9b is positioned on the light path, and FIG. 55B shows a state where the reflecting section 9c is positioned on the light path. In addition to the construction described by referring to FIG. 1, the optical part 11 provided between the inclined-right mirror 9 and the object lens 10 includes an aperture filter and an auxiliary hologram. The aperture filter provides a number of apertures which are required for the optical disk 2 in which a distance between the surface of the optical disk 2 and the recording layer is 0.6 mm and the recording/reproducing of information is performed by short-wavelength light (light with a wavelength of about 405 nm). The auxiliary hologram having wavelength selection properties reacting with short-wavelength light (light with a wavelength of 405 nm) performs spherical aberration correction or color correction. The aperture filter and the auxiliary hologram may be constructed integrally with the optical part 11 or may be constructed separately from the optical part 11.

Hereinafter, the light path of the optical pickup device depending on a difference in type of the optical disk 2 mounted on the spindle motor 25 will be described.

When the optical disk 2 mounted on the spindle motor 25 is an optical disk in which a distance between the surface of the optical disk 2 and the recording layer is 0.1 mm and recording/reproducing of information is performed by short-wavelength light (light with a wavelength of about 405 nm), the inclined-right mirror 9 is set in such a state that the wavelength selecting film 9b of the reflecting plate 9d is positioned on the light path, as shown in FIG. 55A. The short-wavelength light (light with a wavelength of about 405 nm), which has been emitted from the short wavelength optical unit 1 so as to pass through the beam splitter 7 or the collimator lens 8, is transmitted through the wavelength selecting film 9b of the inclined-right mirror 9 so as to be reflected by the inclined-right mirror 12. Then, the short-wavelength light passes through the object lens 13 so as to be condensed on a recording layer which is positioned where a distance from the surface of the optical disk 2 is 0.1 mm.

Further, even when the optical disk 2 mounted on the spindle motor 25 is an optical disk in which a distance between the surface of the optical disk 2 and the recording layer is 0.6 mm and the recording/reproducing of information is performed by red light (light with a wavelength of about 660 nm), the inclined-right mirror 9 is set in such a state that the wavelength selecting film 9b of the reflecting plate 9d is positioned on the light path, as shown in FIG. 55A. The red light (light with a wavelength of about 660 nm), which has been emitted from the long wavelength optical unit 3 so as to pass through the beam splitter 7 or the collimator lens 8, is reflected by the wavelength selecting film 9b of the inclined-right mirror 9. Then, the red light passes through the optical part 11 and the object lens 10 so as to be condensed in a recording layer which is positioned where a distance from the surface of the optical disk 2 is 0.6 mm.

Further, even when the optical disk 2 mounted on the spindle motor 25 is an optical disk in which a distance between the surface of the optical disk 2 and the recording layer is 1.2 mm and the recording/reproducing of information is performed by infrared light (light with a wavelength of about 780 nm), the inclined-right mirror 9 is set in such a state that the wavelength selecting film 9b of the reflecting plate 9d is positioned on the light path, as shown in FIG. 55A. The infrared light (light with a wavelength of about 780 nm), which has been emitted from the long wavelength optical unit 3 so as to pass through the beam splitter 7 or the collimator lens 8, is reflected by the wavelength selecting film 9b of the inclined-right mirror 9. Then, the infrared light passes through the optical part 11 and the object lens 10 so as to be condensed in a recording layer which is positioned where a distance from the surface of the optical disk 2 is 1.2 mm.

Meanwhile, when the optical disk 2 mounted on the spindle motor 25 is an optical disk in which a distance between the surface of the optical disk 2 and the recording layer is 0.6 mm and the recording/reproducing of information is performed by short-wavelength light (light with a wavelength of about 405 nm), the inclined-right mirror 9 is set in such a state that the reflecting section 9c of the reflecting plate 9d is positioned on the light path, as shown in FIG. 55B. The short-wavelength light (light with a wavelength of about 405 nm), which has been emitted from the short wavelength optical unit 1 so as to pass through the beam splitter 8 or the collimator lens 8, is reflected by the wavelength selecting film 9b of the inclined-right mirror 9. Then, the short-wavelength light passes through the object lens 10 so as to be condensed in the recording layer which is positioned where a distance from the surface of the optical disk 2 is 0.6 mm.

The reflecting plate 9d of the inclined-right mirror 9, described in the FIG. 54, can be constructed in such a manner as will be described with reference to FIG. 56. Further, portions which are not described are the same as those described by referring to FIGS. 54 and 55.

In the portion of the wavelength selecting film 9b shown in FIG. 54, a base material portion 9i in which a base material of the reflecting plate 9d is exposed is set without the wavelength selecting film 9b. The surface of the reflecting plate 9d at the beam splitter 7 is composed of a portion (base material portion 9i), which is not provided with the reflecting section 9c, and a portion provided with the reflecting section 9c described by referring to FIG. 54.

The base material portion 9i provided on the reflecting plate 9d has a function of transmitting most of arriving light regardless of the wavelength or the polarization state. When the base material portion 9i and the reflecting section 9c are provided on the reflecting plate 9d, the base material 9i may transmit light with a predetermined wavelength regardless of the polarization state. Here, the base material portion 9i may be constructed so as to reflect at least short-wavelength light (light with a wavelength of 405 nm) emitted from the short wavelength optical unit 1.

The reflecting section 9c provided on the reflecting plate 9d has a function of reflecting most of arriving light regardless of the wavelength or the polarization state. Here, the reflecting section 9c is constructed so as to reflect at least short-wavelength light (light with a wavelength of about 405 nm), emitted from the short wavelength optical unit 1, and red light (light with a wavelength of about 660 nm) and infrared light (light with a wavelength of about 780 nm), emitted from the long wavelength optical unit 3.

Hereinafter, the movement of the reflecting plate 9d, provided with the base material portion 9i and the reflecting section 9c, depending on the optical disk 2 mounted on the spindle motor 25 will be described.

When the optical disk 2 mounted on the spindle motor 25 is an optical disk in which a distance between the surface of the optical disk 2 and the recording layer is 0.1 mm and recording/reproducing of information is performed by short-wavelength light (light with a wavelength of about 405 nm), the inclined-right mirror 9 is set in such a state that the base material portion 9i of the reflecting plate 9d is positioned on the light path by the driving of the actuator 9e.

Further, even when the optical disk 2 mounted on the spindle motor 25 is an optical disk in which a distance between the surface of the optical disk 2 and the recording layer is 0.6 mm and the recording/reproducing of information is performed by red light (light with a wavelength of about 660 nm), the inclined-right mirror 9 is set in such a state that the reflecting section 9c of the reflecting plate 9d is positioned on the light path by the driving of the actuator 9e.

Further, even when the optical disk 2 mounted on the spindle motor 25 is an optical disk in which a distance between the surface of the optical disk 2 and the recording layer is 1.2 mm and the recording/reproducing of information is performed by infrared light (light with a wavelength of about 780 nm), the inclined-right mirror 9 is set in such a state that the reflecting section 9c of the reflecting plate 9d is positioned on the light path by the driving of the actuator 9e.

Further, even when the optical disk 2 mounted on the spindle motor 25 is an optical disk in which a distance between the surface of the optical disk 2 and the recording layer is 0.6 mm and recording/reproducing of information is performed by short-wavelength light (light with a wavelength of about 405 nm), the inclined-right mirror 9 is set in such a state that the reflecting section 9c of the reflecting plate 9d is positioned on the light path by the driving of the actuator 9e.

FIG. 56A and 56B are schematic views illustrating the light path of laser light in the optical pickup device using the inclined-right mirror 9 provided with the base material portion 9i and the reflecting section 9c. FIG. 56A shows a state where the base material 9i is positioned on the light path, and FIG. 56B shows a state where the reflecting section 9c is positioned on the light path.

Figure 55:
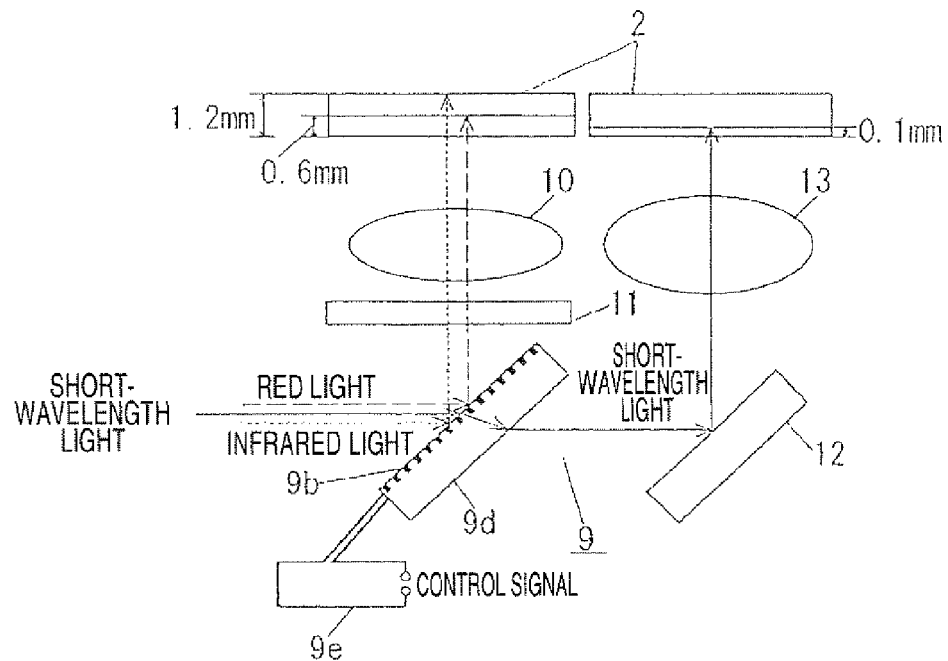
FIGS. 55a and 55b are diagrams showing a portion of the optical pickup device according to the embodiment of the invention.
Figure 55:
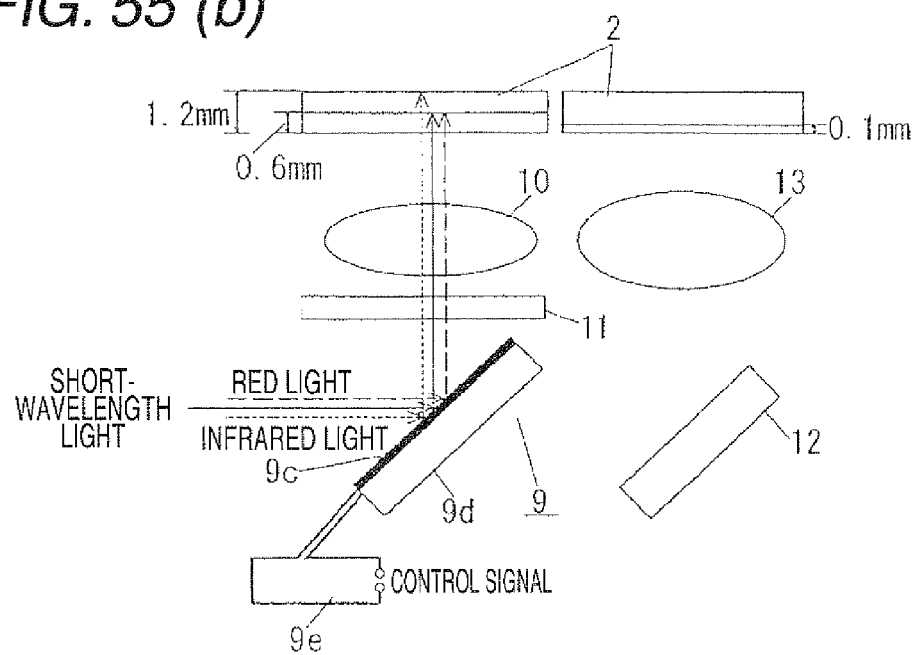
Figure 56:
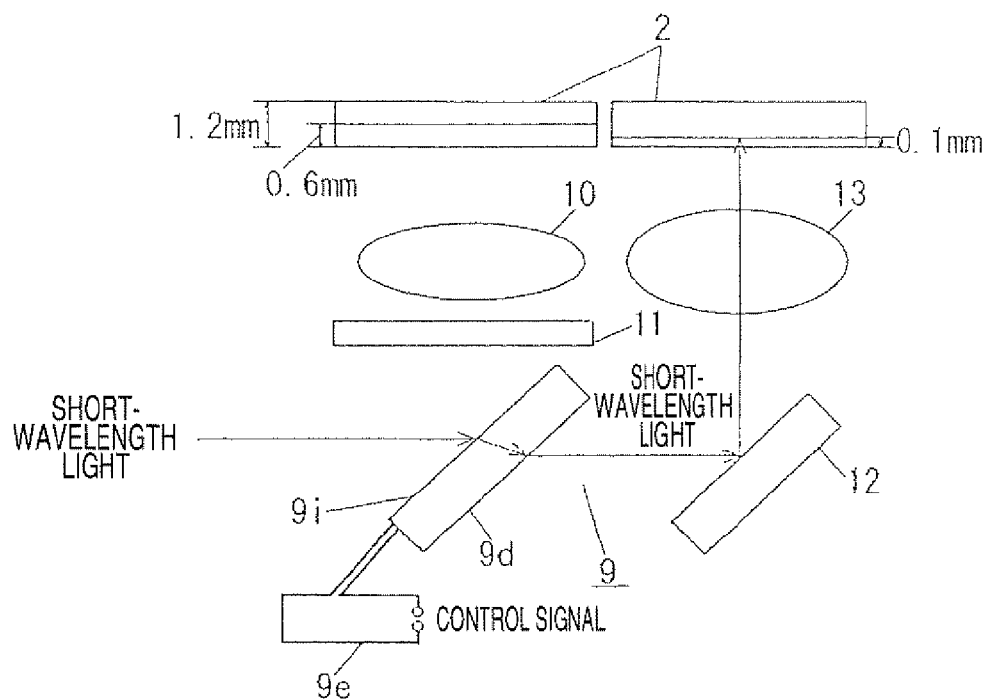
FIGS. 56a and 56b are diagrams showing a portion of the optical pickup device according to the embodiment of the invention.
Figure 56:
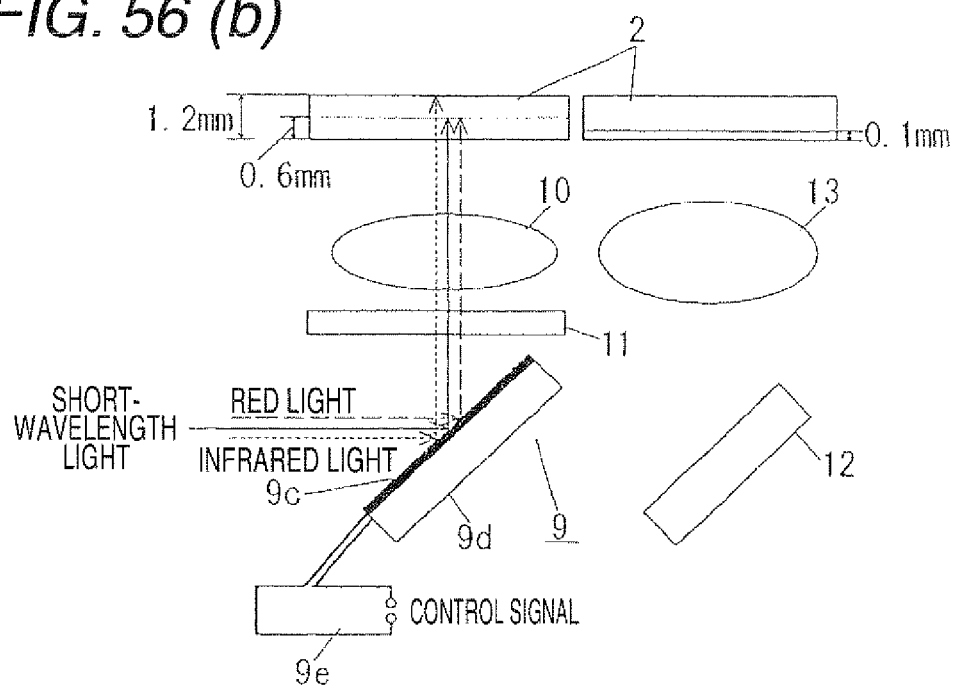

Even when the reflecting plate 9d provided with the base material portion 9i and the reflecting section 9c is used, the light path of laser light shown in FIGS. 56A and 56B is the same as that when the reflecting plate 9d described by referring to FIGS. 54 and 55 is used.

The inclined-right mirror 9 can be constructed in such a manner as will be described with reference to FIG. 57.

Similar to FIG. 54, FIGS. 57A and 57B are diagrams illustrating the inclined-right mirror 9 when the inclined-right mirror 9 is seen from the Z direction of FIG. 5 in a direction of the light flux of laser light which is emitted from the short wavelength optical unit 1 or the long wavelength optical unit 3 so as to pass through the beam splitter 7 or the collimator lens 8. Reference numeral A shown in FIGS. 57A and 57B represents a light flux of laser light reaching the inclined-right mirror 9.

Figure 57:
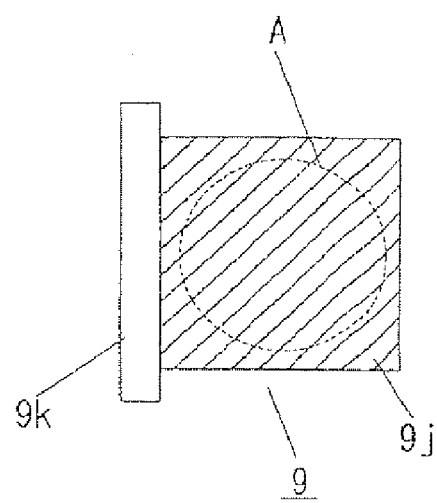
FIGS. 57a and 57b are diagrams showing a portion of the optical pickup device according to the embodiment of the invention.
Figure 57:
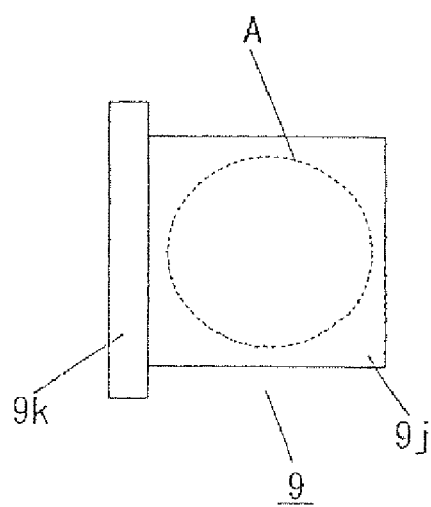
Figure 58:
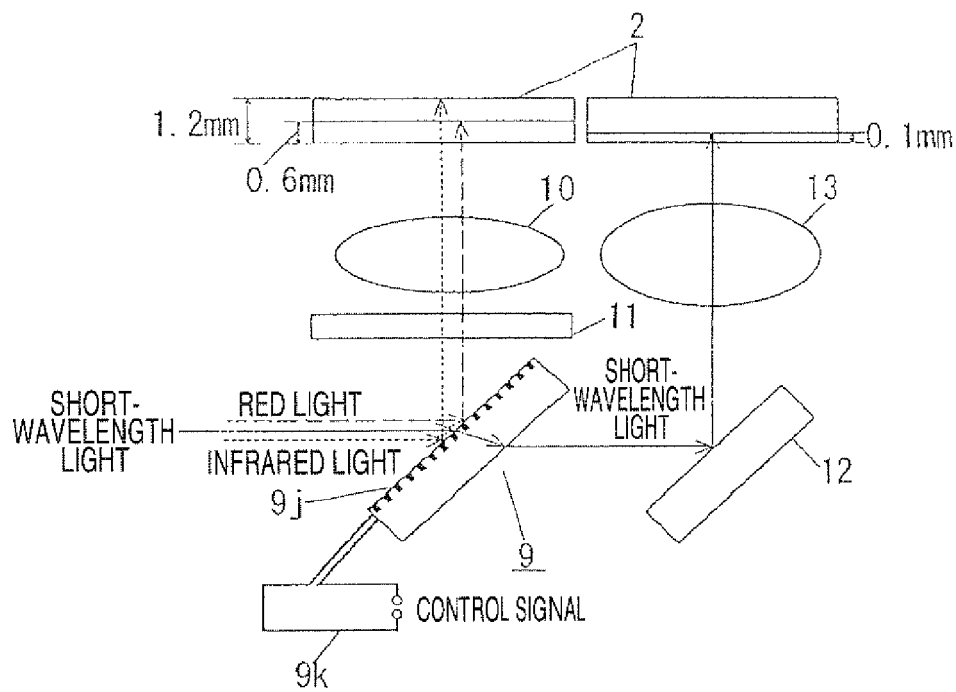
FIGS. 58a and 58b are diagrams showing a portion of the optical pickup device according to the embodiment of the invention.
Figure 58:
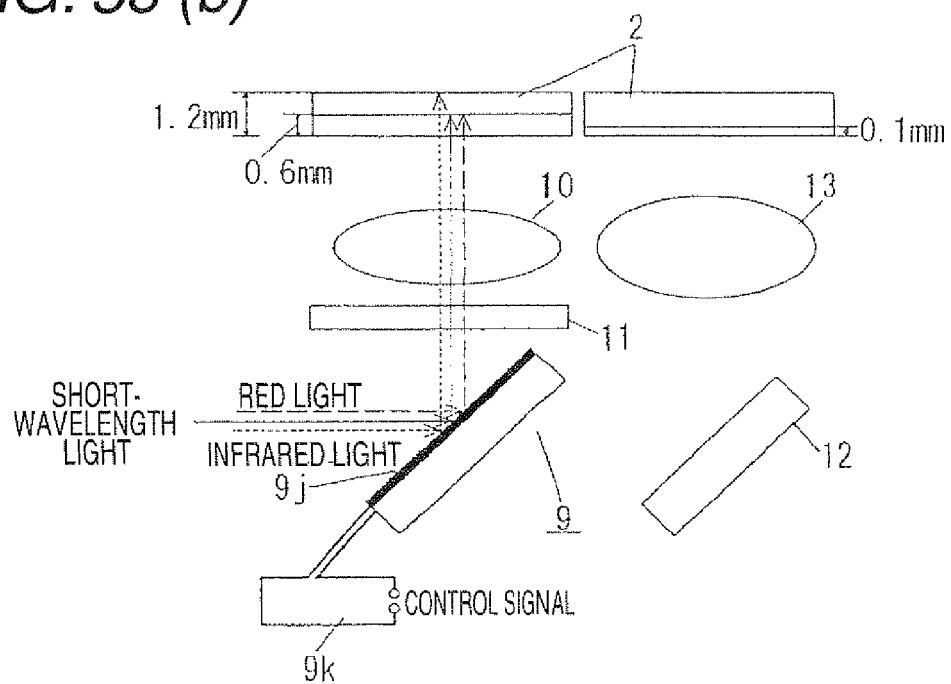
Figure 59:
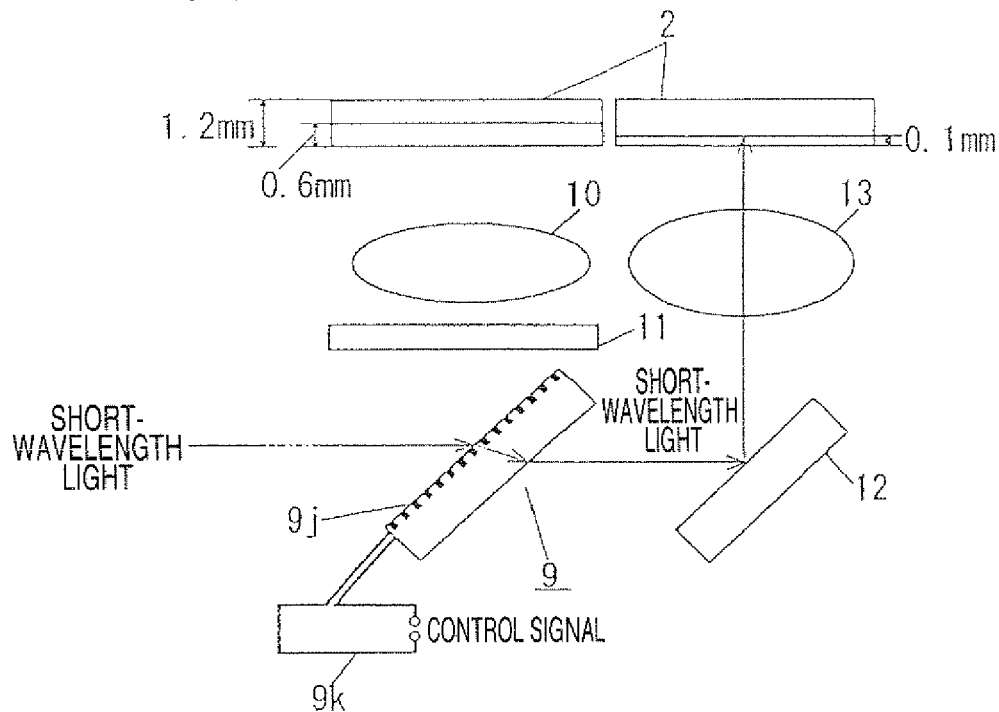
FIGS. 59a and 59b are diagrams showing a portion of the optical pickup device according to the embodiment of the invention.
Figure 59:
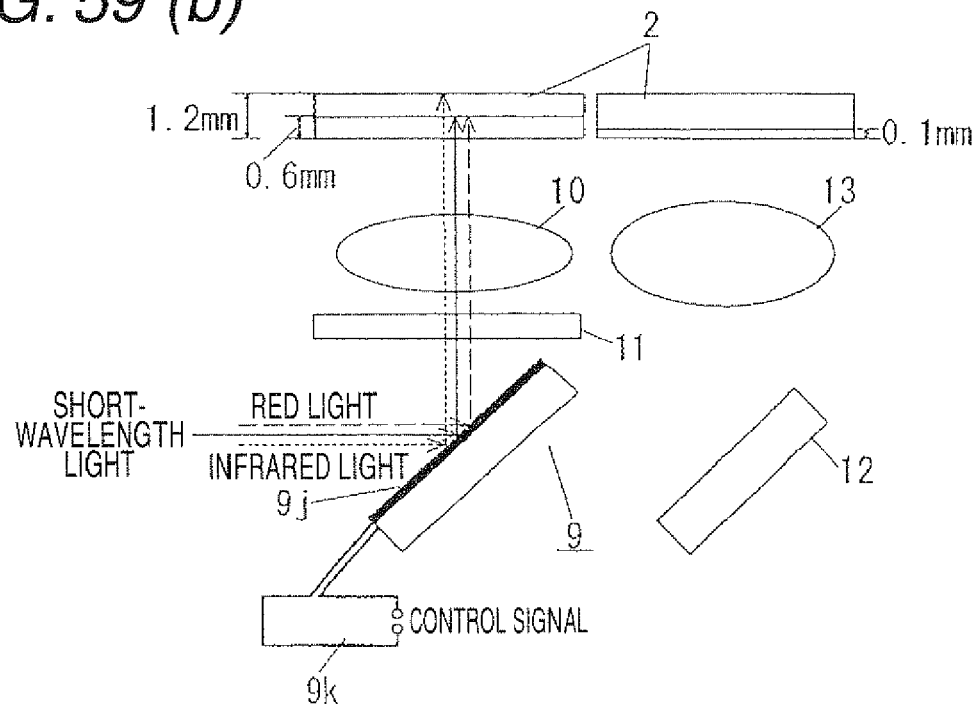

In FIG. 57, the inclined-right mirror 9 includes an electric control film 9j and a signal applying section 9k, which are provided on the surface thereof at the beam splitter 7. The electric control film 9j is a switching unit of which the optical characteristics changes in accordance with a control signal, and the signal applying section 9k applies a control signal to the electric control film 9j.

The electric control film 9j has a state of the wavelength selecting film 9b and a state of the reflecting section 9c, which have been described with reference to FIG. 54. In accordance with a control signal, two of the states are switched. The states of the electric control film 9j are switched depending on the type of the optical disk 2 mounted on the spindle motor 25 so as to correspond to the movement of the reflecting plate 9d described in FIGS. 54 and 55. Then, as shown in FIGS. 58A and 58B, the light path of laser light can be switched the same as in FIGS. 55A and 55B.

Moreover, the electric control film 9j is constructed to have a state of the base material 9i and a state of the reflecting section 9c, which have been described with reference to FIG. 54. In accordance with a control signal, two of the states are switched. The states of the electric control film 9j are switched depending on the type of the optical disk 2 mounted on the spindle motor 25 so as to correspond to the movement of the reflecting plate 9d described in FIGS. 54 and 56. Then, as shown in FIGS. 59A and 59B, the light path of laser light can be switched the same in FIGS. 56A and 56B.

According to the optical pickup device described with reference to FIGS. 54 to 59, the light path of laser light can be switched depending on the type of the optical disk 2. Therefore, recording/reproducing can be performed on great variety of optical disks 2 of which the distances to the recording layer or the wavelengths to be used are different from each other. Particularly, since short-wavelength light (with a wavelength of about 405 nm) is used, recording/reproducing of information can be also performed on both of the optical disks 2 in which the distances between the surface and the recording layer are different from each other (0.1 mm and 0.6 mm).

As the construction around the lens holder 16 described with reference to FIGS. 6 to 8, such a construction as will be described with reference to FIGS. 60 to 74 can be also applied. Further, members which are not described are the same as those described so far. Therefore, the same reference numerals will be attached thereto, and the descriptions thereof will be omitted.

Figure 60:
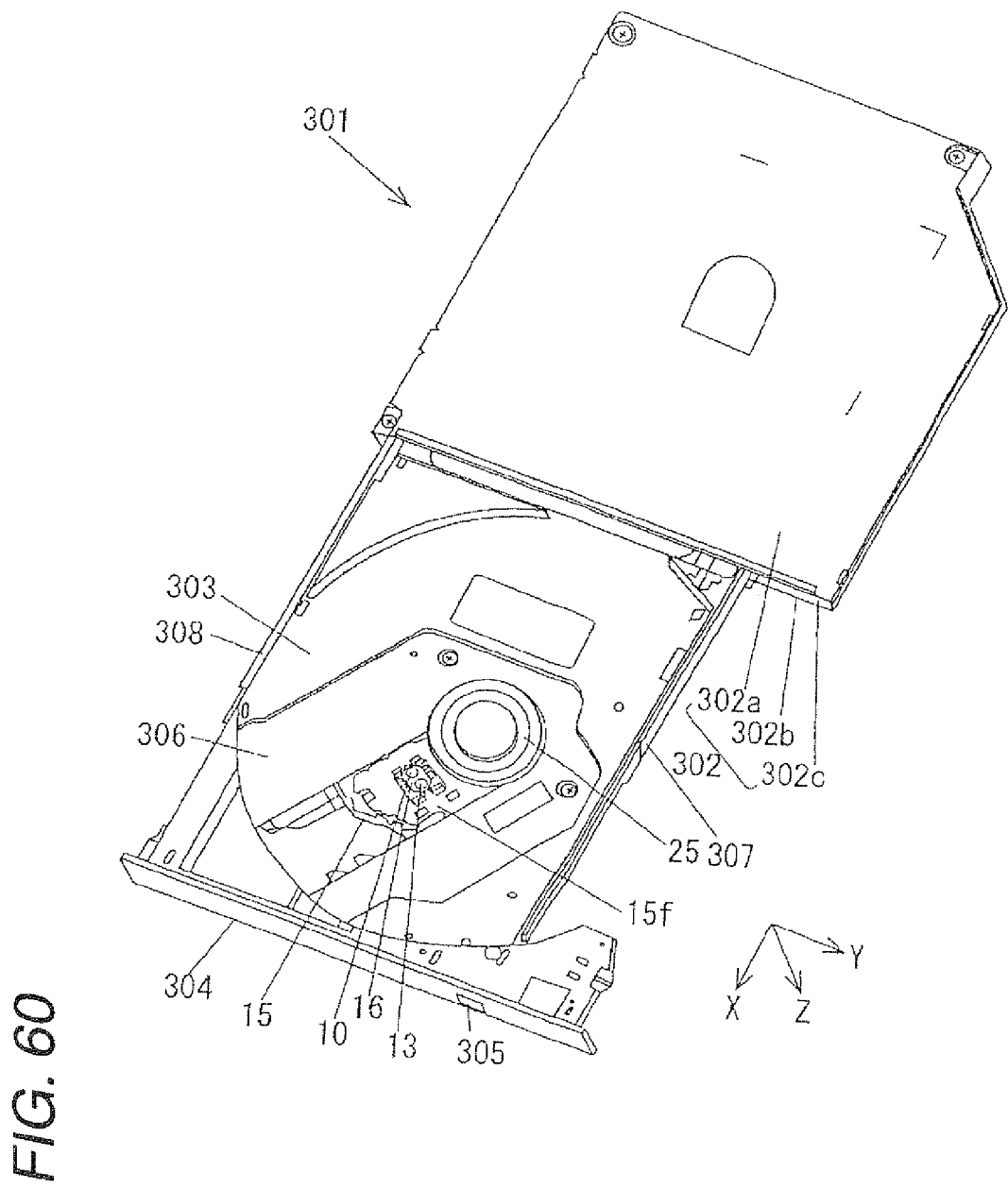
FIG. 60 is a diagram showing an optical disk drive according to an embodiment of the invention.

FIG. 60 is a diagram illustrating the optical pickup device according to this embodiment. In the optical pickup device 301 shown in FIG. 60, reference numeral 302 represents a cover which is composed of an upper cover 302a and a lower cover 302b. The cover 302 is formed in a bag shape, having an opening 302c formed on one end thereof. A tray 303 is held by the cover 303 so as to be inserted into and drawn out of the cover 303 in the X direction shown in FIG. 60. The tray 303 is formed of a light material such as resin or the like. The tray 303 has a bezel 304 provided on the front portion thereof. The bezel 304 serves to block the opening 302c when the tray 303 is housed into the cover 302. The bezel 304 has an eject button 305 exposed thereon. With the eject button 305 being pressed, the tray 303 is slightly popped out of the cover 302 by a mechanism (not shown) in the X direction shown in FIG. 303. Then, the tray 303 can be put into or drawn out of the cover 302 in the X direction.

The tray 303 has a pickup module 306 attached thereto. The pickup module 306 has the spindle motor 25 provided thereto, the spindle motor 25 rotationally driving the optical disk 2. Further, the base 15 is movably provided to the pickup module 306 so as to approach or depart from the spindle motor 25. Although not described in detail, the lens holder 16 is attached to the base 15 so as to be elastically moved. The lens holder 16 has the object lenses 10 and 13 attached thereto. In the base 15, a base cover 15f is attached on the surface of the base 15 which is opposite to the information recording surface of the optical disk 2 to be mounted on the spindle motor 25, the base cover 15f being formed of a metallic plate. The base cover 15 covers at least portions of the flexible board 29, the lens holder 16 and the like, which are attached to the base 15. Accordingly, the parts attached to the base 15 can be prevented from coming in contact with the optical disk 2. Reversely, these parts can be protected from dust or electric noise.

Reference numerals 307 and 308 represent rails which are held by the lower cover 302b and are engaged with both sides of the tray 303. The rails 307 and 308 are constructed so as to slide in a predetermined range with respect to the lower cover 302b and the tray 303 in the X direction where the tray 303 is inserted and drawn out.

Next, the base 15 provided to the pickup module 306 will be described in detail.

Figure 61:
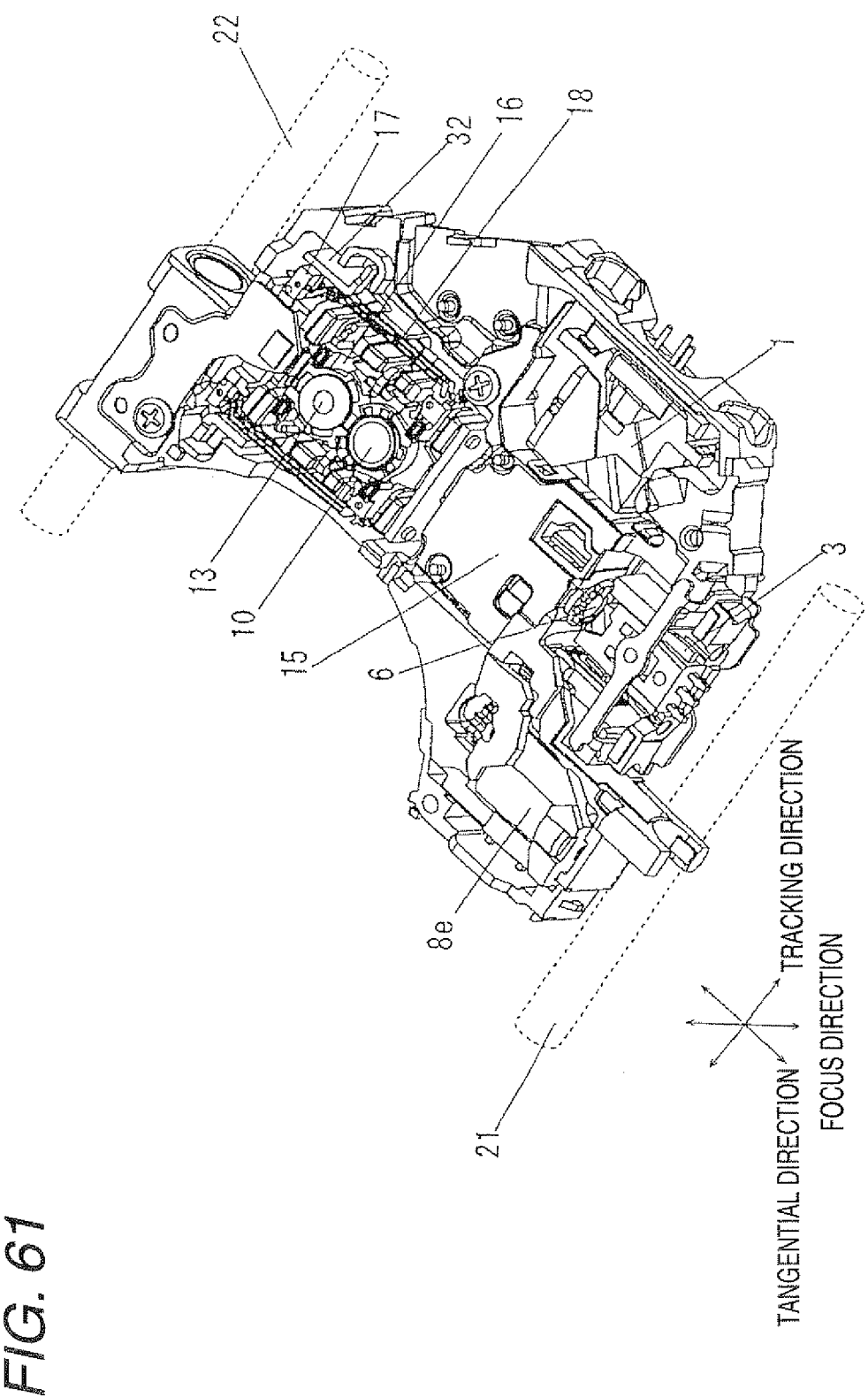
FIG. 61 is a diagram showing a portion of the optical disk drive according to the embodiment of the invention.

FIG. 61 is a perspective view illustrating the overall base 15. For the sake of description, FIG. 61 shows a state where such parts as the base cover 15f, the flexible board 29 and the like are removed from the base 15. In FIG. 61, the focus direction indicates a direction of the optical axes of the object lenses 10 and 13. The focus direction is parallel to the rotating shaft of the spindle motor 25. The tracking direction indicates a direction which is parallel to the surface of the suspension holder 17, on which the suspension 18 is fixed, and is perpendicular to the focus direction. The tangential direction indicates a direction which is perpendicular to the focus direction and the tracking direction.

As described with reference to FIGS. 3 and 4, the base 15 is movably attached to the shafts 21 and 22.

Roughly speaking, the base 15 includes the short wavelength optical unit 1 which emits and receives short-wavelength light, the long wavelength optical unit 3 which emits and receives long-wavelength light, and the lens holder 16 having the object lenses 10 and 13 mounted thereon.

The lens holder 16 and the suspension holder 17 are elastically supported by the suspensions 18. The suspension holder 17 is fixed to the yoke member 32 by a technique such as bonding, and the yoke member 32 is also bonded to the base 15 by a technique such as bonding.

Next, the construction around the lens holder 16 including the yoke member 32 to be attached to the base 15 will be described in detail.

Figure 62:
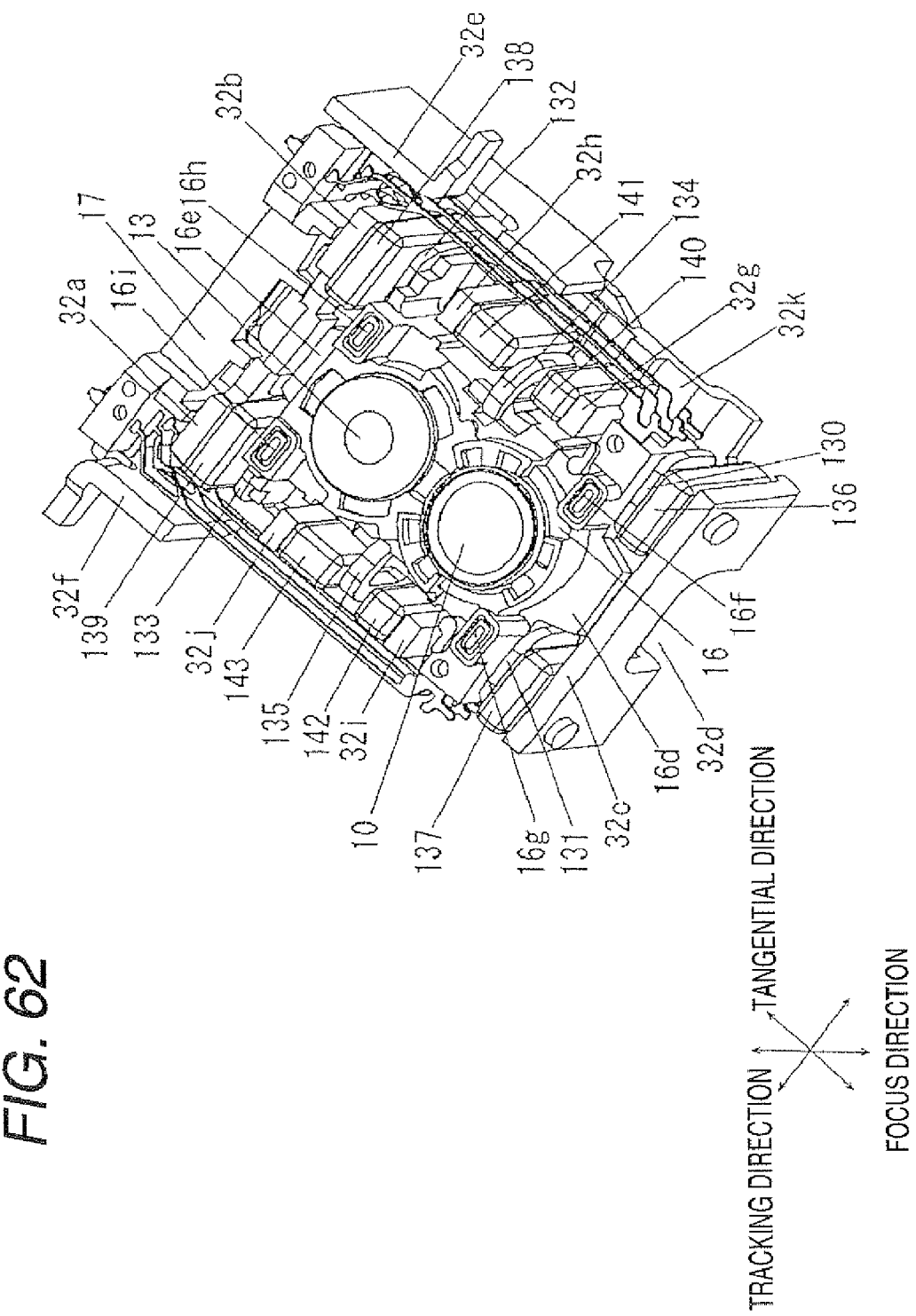
FIG. 62 is a diagram showing a portion of the optical pickup device according to the embodiment of the invention.
Figure 63:
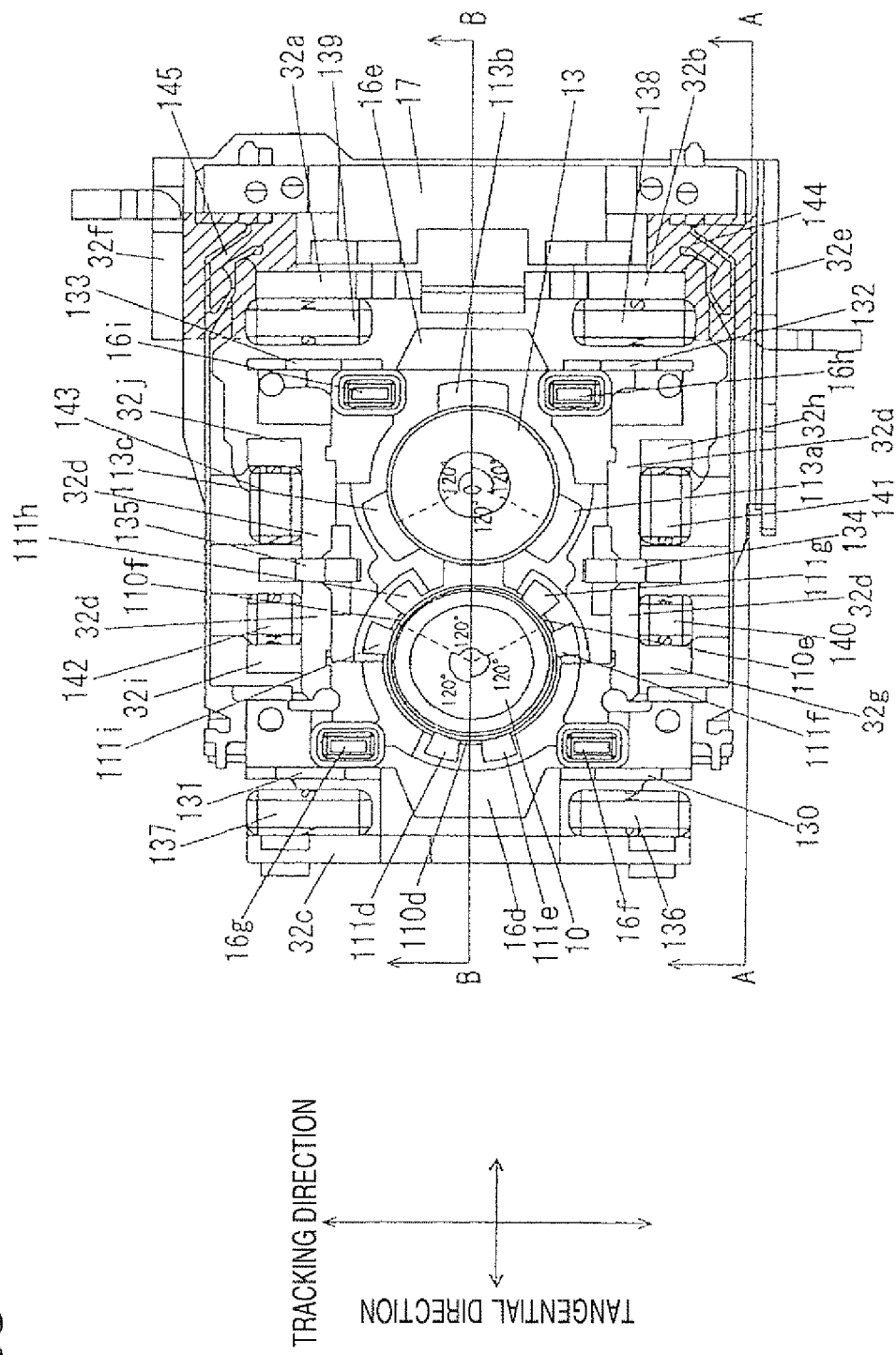
FIG. 63 is a diagram showing a portion of the optical pickup device according to the embodiment of the invention.
Figure 64:
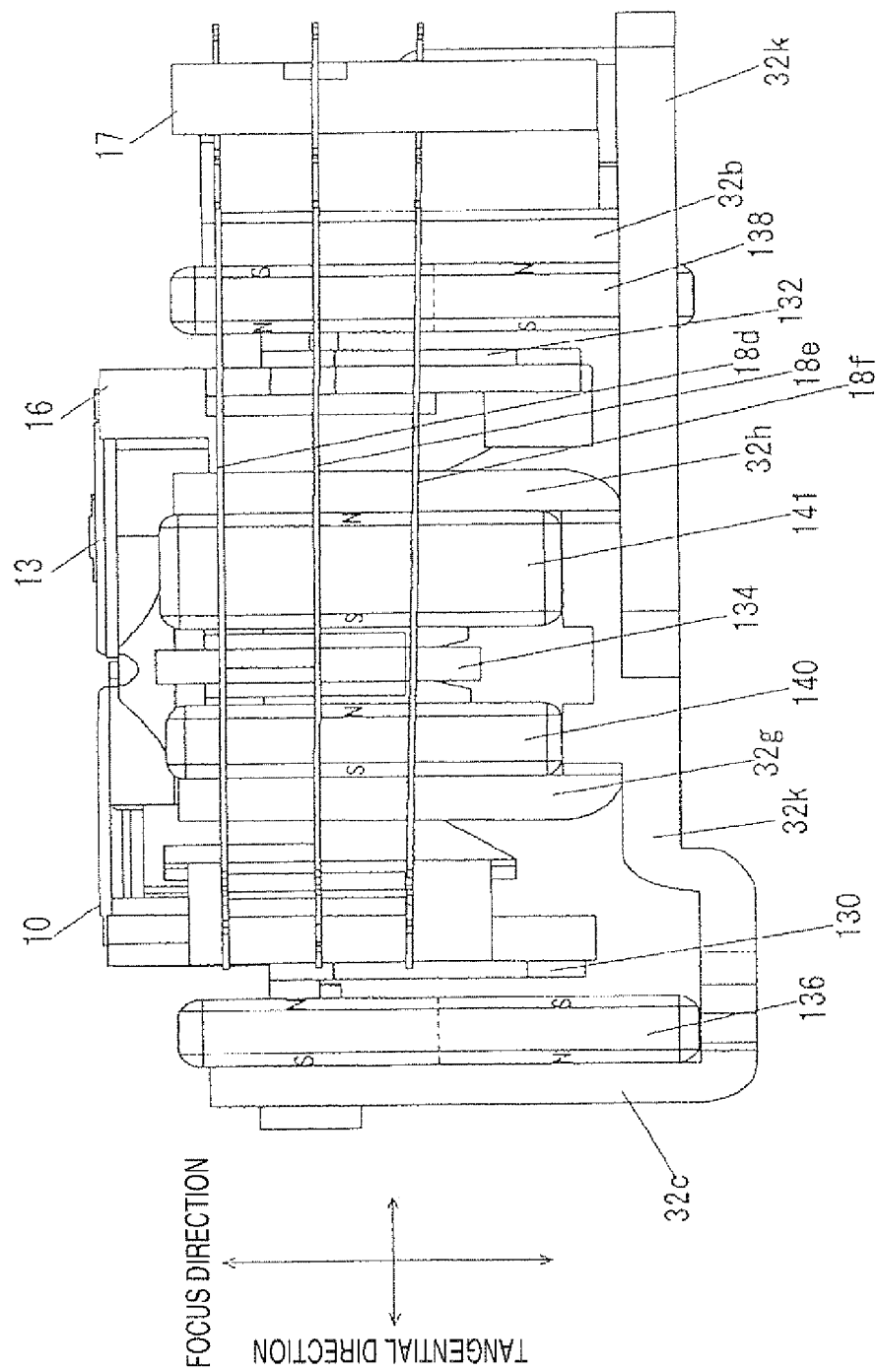
FIG. 64 is a diagram showing a portion of the optical pickup device according to the embodiment of the invention.
Figure 65:
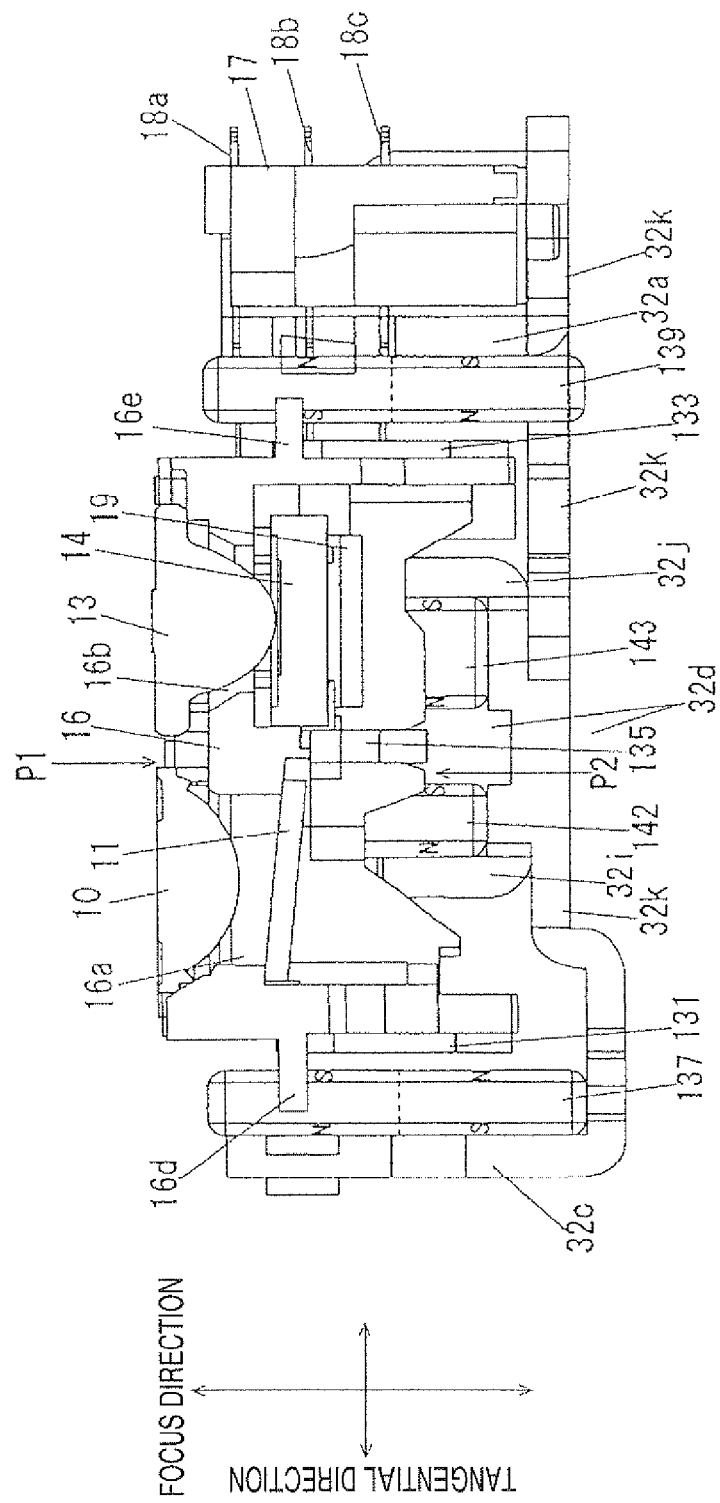
FIG. 65 is a diagram showing a portion of the optical pickup device according to the embodiment of the invention.

FIGS. 62 to 65 are diagrams showing a state where such parts as the lens holder 16, the suspension holder 17, the suspensions 18, the yoke member 32 and the like are detached from the optical pickup device described in FIG. 61. FIG. 62 is a perspective view of the optical pickup device, FIG. 63 is a plan view of the optical pickup device shown in FIG. 62, FIG. 64 is a sectional view of the optical pickup device taken along A-A line of FIG. 63, and FIG. 65 is a sectional view of the optical pickup device taken along B-B line of FIG. 63.

Referring to FIGS. 62 to 65, the yoke member 32 will be described. The yoke member 32 has upright portions 32a to 32j, which are integrally provided thereon by a cutting and raising process. Among them, the upright portions 32a, 32b, 32c, 32g, 32h, 32i, and 32j are formed so as to face the respective coils provided in the lens holder 16, and the upright portions 32e and 32f, respectively, are formed so as to face the suspensions 18 such that the pair of three suspensions 18 interpose the lens holder 16.

On the lower surface of the yoke member 32, an opening 32d is provided, from which the inclined-right mirrors 9 and 12 fixed to the base 15 enter.

When the yoke member 32 is attached to the base 15, the yoke member 32 becomes parallel to the plane formed in the center axes of the shafts 21 and 22 shown in FIG. 61. A portion forming the opening 32d is referred to as a main surface portion 32k of the yoke member 32. The upright portions 32a to 32j are provided so as to be substantially perpendicular to the main surface portion 32k.

In the yoke member 32, focus magnets 136 to 139 and tracking magnets 140 to 143 are provided by a technique such as bonding.

The magnet 136 is attached on the upright portion 32c so as to face the focus coil 130, the magnet 137 is attached on the upright portion 32c so as to face the focus coil 131, the magnet 138 is attached on the upright portion 32b so as to face the focus coil 132, and the magnet 139 is attached on the upright portion 32a so as to face the focus coil 133. The magnets 136 and 137 are attached on both ends of the upright 32c in the tracking direction shown in FIG. 63 so as to face the focus coils 130 and 131, respectively. In this embodiment, the upright portion 32c is widely formed in the tracking direction shown in FIG. 63, in order to increase the rigidity of the yoke member 32. However, the upright portions 32c may be divided into two portions such that the focus magnet 136 is attached on one portion by bonding or the like and the focus magnet 137 is attached on the other portion.

The tracking magnet 140 is attached on the upright portion 32g so as to face the tracking coil 134, the tracking magnet 141 is attached on the upright portion 32h so as to face the tracking coil 134, the tracking magnet 142 is attached on the upright portion 32i so as to face the tracking coil 135, and the tracking magnet 143 is attached on the upright portion 32j so as to face the tracking coil 135.

In the focus magnets 136 and 137 and the tracking magnets 140 to 143, at least portions of the bottom surfaces thereof are supported or fixed to the main surface portion 32k. Through such a construction, the positioning of the magnets is easily performed.

Next, an example of the magnetization of magnet will be shown. The focus magnets 136 and 138 are magnetized so that the magnetic poles thereof are exposed to the surfaces facing the focus coils 130 and 132, respectively, in an order of the S-pole and the N-pole in the focus direction of FIG. 64 from the bottom surface toward the objects lenses 10 and 13. The focus magnets 137 and 139 are magnetized so that the magnetic poles thereof are exposed to the surfaces facing the focus coils 131 and 133, respectively, in an order of the N-pole and the S-pole in the focus direction of FIG. 65 from the bottom surface toward the object lenses 10 and 13. Further, the tracking magnets 140 and 143 are magnetized so that the N-pole is exposed to the surfaces facing the tracking coils 134 and 135, respectively, and the tracking magnets 141 and 142 are magnetized so that the S-pole is exposed to the surfaces facing the tracking coils 134 and 135.

The suspensions 18 are formed, disposed, and constructed as described with reference to FIG. 6. Through the suspensions 18, an electric current flows in the respective coils provided in the lens holder 16.

An example of wiring lines between the suspensions 18 and the respective coils provided in the lens holder 16 will be described.

The focus coils 130 and 132 are connected in series to each other, and both ends of the coil group are electrically connected to the suspensions 18a and 18b, respectively. Further, the focus coils 131 and 133 are connected in series to each other, and both ends of the coil group are electrically connected to the suspensions 18d and 18e, respectively. Further, the focus coils 134 and 135 are connected in series to each other, and both ends of the coil group are electrically connected to the suspensions 18c and 18f, respectively. The ends of the respective coils and the suspensions 18 are electrically connected by a metallic bonding material such as solder or lead-free solder.

As shown by oblique lines in FIG. 63, the optical pickup device according to this embodiment includes a gel pocket 144 composed of the suspension holder 17, the upright portion 32b, the upright portion 32e, and the focus magnet 138 and a gel pocket 145 composed of the suspension holder 17, the upright portion 32a, the upright portion 32f, and the focus magnet 139. In the gel pockets 144 and 145 through which portions of the suspensions 18 penetrate, an elastic material such as damper gel for damping is filled. That is, portions of the suspensions 18, or more specifically, the roots of the suspensions 18 at the suspension holder 17 are wrapped by the elastic material. Accordingly, it is possible to suppress unnecessary resonance of the suspensions 18 when the lens holder 16 is driven in the focus or tracking direction. As for the elastic material, such a material that is gelated by the irradiation of ultraviolet rays can be used.

Next, a portion of the lens holder 16, which holds the lens holder 10 and 13, will be described with reference to FIG. 63.

As shown in FIG. 63, the lens holder 16 includes the object lens support surfaces 110d, 110e, 110f (collectively referred to as the object lens support surfaces 110) formed in the substantially same shape, the bonding sections 111d, 111e, 111f, 111g, 111h, and 111i (collectively referred to as the bonding sections 111) formed in the substantially same shape, and the bonding sections 113a, 113b, and 113c (collectively referred to as the bonding sections 113) formed in the substantially same shape.

As shown in FIG. 63, the object lens support surfaces 110d, 110e, and 110f are disposed at even intervals around the circumferential edge of the object lens 10 (more specifically, the through-hole 16a). In other words, the object lens support surfaces 110d, 110e, and 110f are disposed at an interval of 120 degrees, seen from the center of the object lens 10 (more specifically, the through-hole 16a). Further, the bonding sections 111d and 111e are disposed in both ends of the object lens support surface 110d, the bonding sections 111f and 111g are disposed in both ends of the object lens support surface 110e, and the bonding sections 111h and 111i are disposed in both ends of the object lens support surface 110f. That is, the bonding sections 111d, 111f, and 111h are disposed at even intervals, and the bonding sections 111e, 111g, and 111i are also disposed at even intervals. As the object lens support surfaces 110 are disposed at even intervals around the center axis of the object lens 10 (more specifically, the through-hole 16a), the object lens 10 can be stably supported by the object-lens support surface 110. Further, with the bonding sections being disposed as described above, a force by which the object lens 10 is pulled from the lens holder 16 is canceled, even though an adhesive injected into the bonding sections 111 is contracted when being solidified. Further, the positioned object lens 10 is hardly shifted.

Except for the disposition of the object lens support surfaces 110 and the bonding sections 111 with respect to the circumferential edge of the through-hole 16a and the setting of angle occupied in the circumferential edge of the through-hole 16a by the object lens support surfaces 110, the construction of the portion shown in FIG. 63 is almost the same as that described with reference to FIGS. 31 to 35. Therefore, the descriptions thereof will be omitted.

In the object lenses 10 and 13, the object lens 10 is formed of a combination of glass and resin. Accordingly, since a technique such as metallic molding can be used, a hologram is easily provided on the object lens 10, and it is possible to adjust a spherical aberration of light with various kinds of wavelengths. Except that the object lens 10 is formed of a combination of glass and resin, the construction of the object lens 10 is the same as that described with reference to FIGS. 34 and 35. As the object lens 13, an object lens formed of glass is used, similar to that of FIGS. 31 to 35.

FIG. 65 is a sectional view illustrating the optical pickup device according to this embodiment, taken along A-A line of FIG. 63.

As shown in FIG. 65, the lens holder 16 is provided with the through-holes 16a and 16b. The object lenses 10 and 13 are brought down into the through-holes 16a and 16b, respectively, from a direction of an arrow P1 shown in FIG. 65 and are fixed by a light-curing adhesive. At this time, the outer circumferences of the object lenses 10 and 13 are abutted on the circumferential edges of the through-holes 16a and 16b of the lens holder 16. Further, the optical part 11, the achromatic diffraction lens 14, and the quarter wavelength plate 19 are inserted into the through-holes 16a and 16b from a direction of an arrow P2 of FIG. 65 and are also fixed by a light-curing adhesive or instant adhesive. At this time, the outer circumferences of the optical part 11, the achromatic diffraction lens 14, and the quarter wavelength plate 19 are abutted on the circumferential edges of the through-holes 16a and 16b of the lens holder 16. Further, these parts are disposed in the lens holder 16 in an order of the object lens 10 and the optical part 11 and in an order of the object lens 13, the achromatic diffraction lens 14, and the quarter wavelength plate 19, when seen from the side of the optical disk 2 in the focus direction.

On the end surface of the lens holder 16 at the focus coils 130 and 131, a mechanical stopper 16d is provided so as to project from the lens holder 16 toward the upright portion 32c. On the end surface of the lens holder 16 at the focus coils 132 and 133, a mechanical stopper 16e is provided so as to project from the lens holder 16 toward the suspension holder 17. If the lens holder 16 largely moves toward the object lenses 10 and 13, that is, toward the optical disk 2 in the focus direction shown in FIG. 65, the upper surfaces of the mechanical stoppers 16d and 16e are abutted on the rear surface of the base cover 15f described in FIG. 60. Then, the movement of the lens holder 16 is regulated so as not to approach the side of the optical disk 2 any more.

Next, the construction around the lens holder 16 to be attached to the yoke member 32 will be described in detail.

Figure 66:
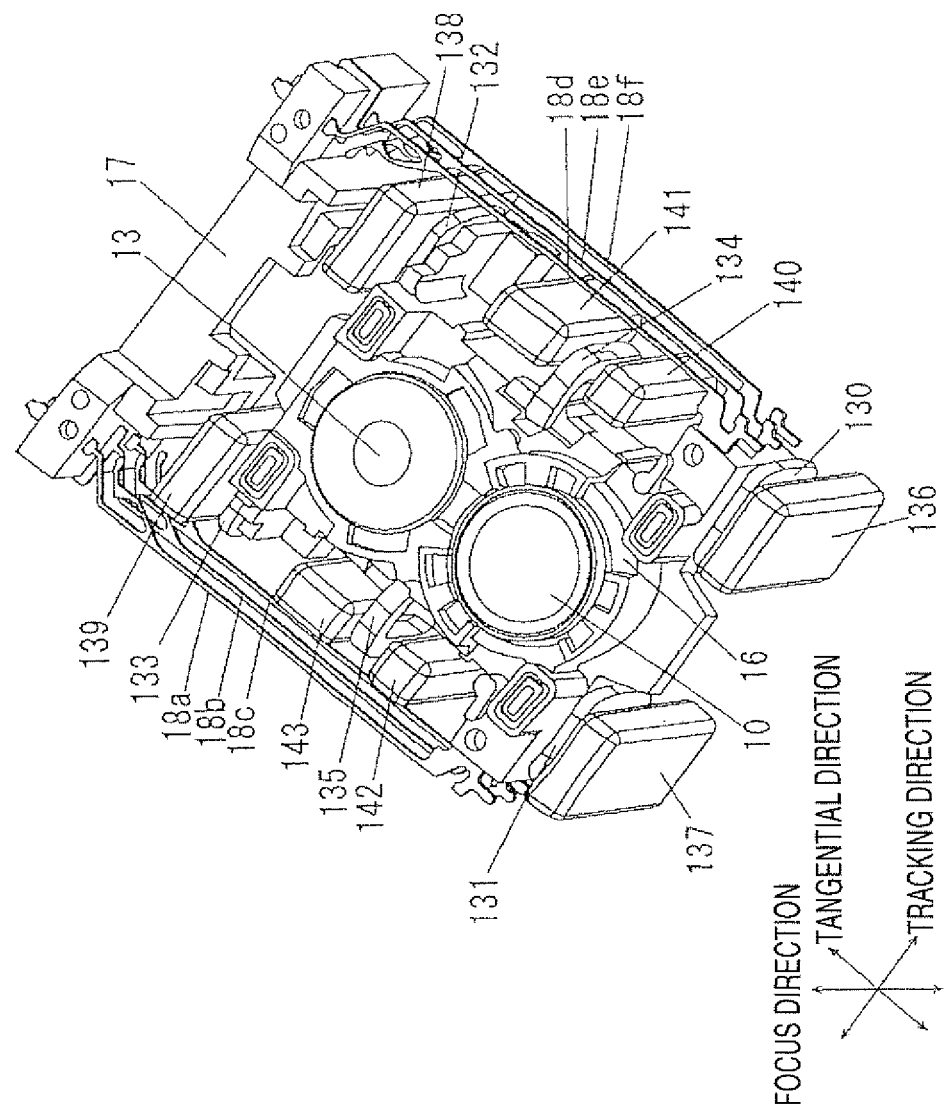
FIG. 66 is a diagram showing a portion of the optical pickup device according to the embodiment of the invention.
Figure 67:
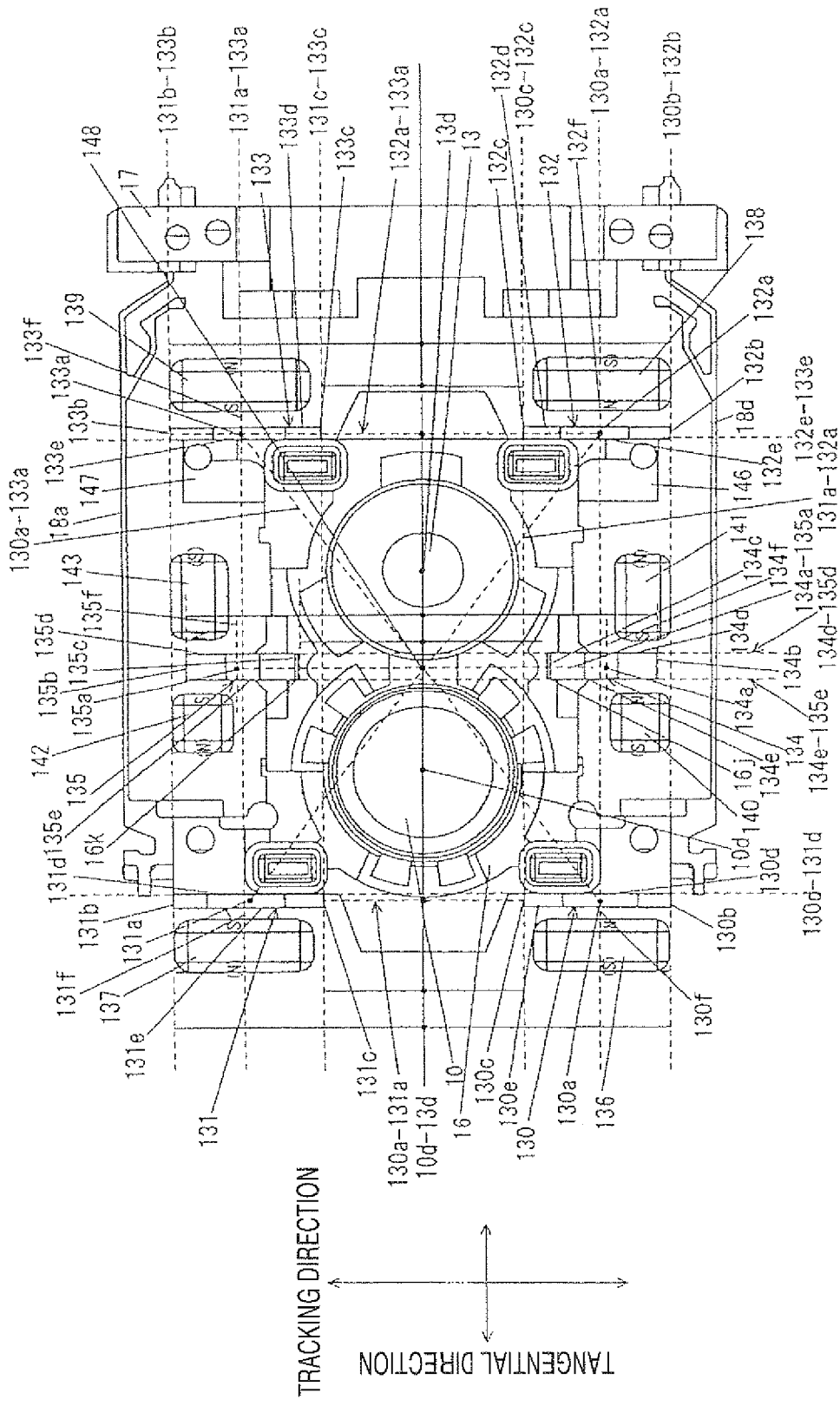
FIG. 67 is a diagram showing a portion of the optical pickup device according to the embodiment of the invention.
Figure 68:
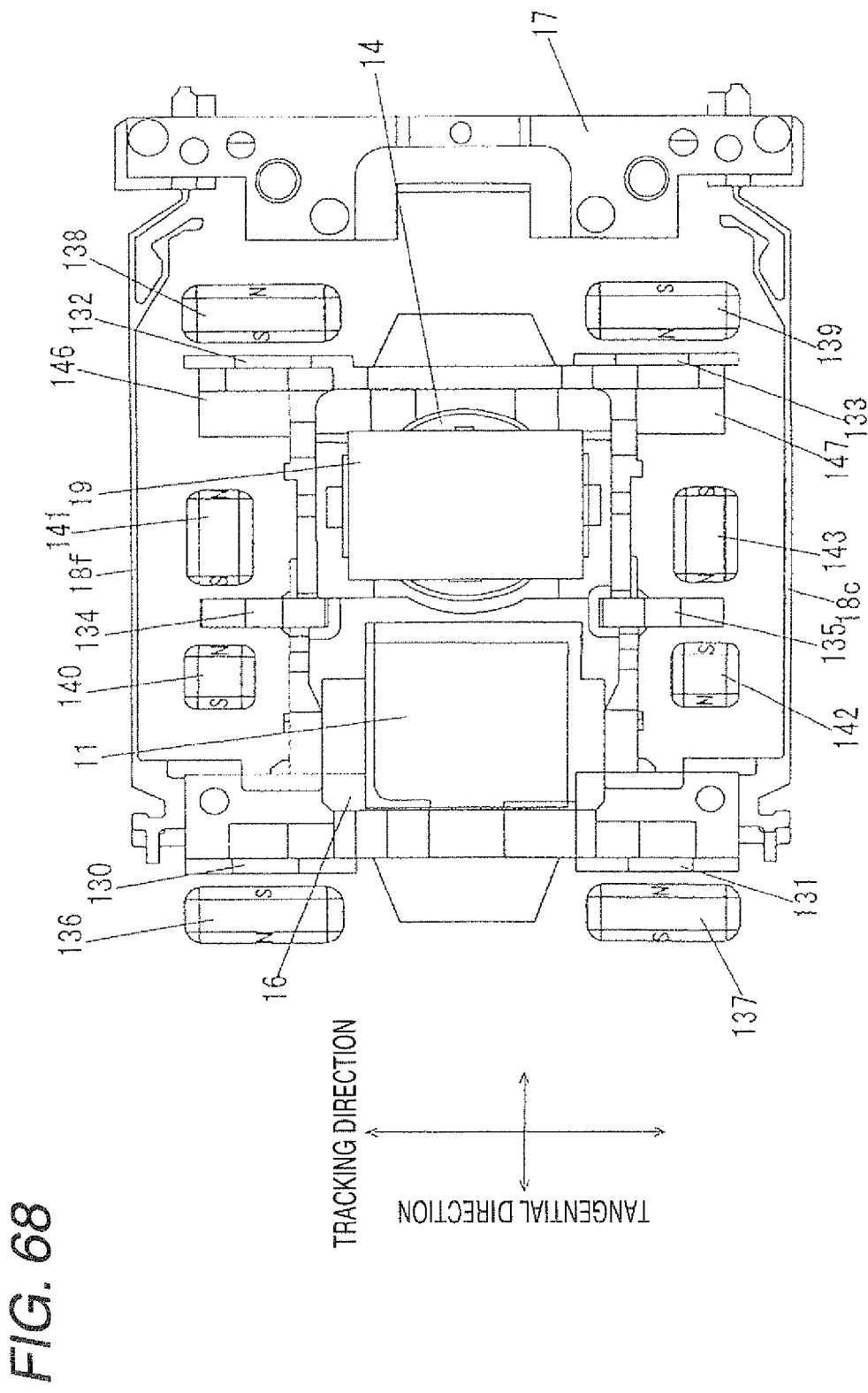
FIG. 68 is a diagram showing a portion of the optical pickup device according to the embodiment of the invention.

FIGS. 66 and 68 are diagrams illustrating the optical pickup device in a state where the yoke member 32 is omitted from the optical pickup device described in FIGS. 62 to 65. FIG. 66 is a perspective view of the optical pickup device, FIG. 67 is a plan view of the optical pickup device shown in FIG. 66, and FIG. 68 is a bottom view of the optical pickup device shown in FIG. 66.

As shown in FIG. 67, the lens holder 16 has the object lenses 10 and 13 attached thereon.

An object-lens principal point 10d, which is the principal point of the object lens 10, substantially coincides with the center of the spherical surface of the object lens support surface 110 and is present on the center axis of the through-hole 16a. Although the optical axis of the object lens 10 substantially coincides with the center axis of the through-hole 16a, the optical axis of the object lens 10 can be shifted because the object lens 10 is tilt-adjusted. Since FIG. 67 is a plan view, the object lens principal point 10d also indicates the center axis of the through-hole 16a and the optical axis of the object lens 10.

An object-lens principal point 13d, which is the principal point of the object lens 13, is present on the center axis of the through-hole 16b. The center axis of the through-hole 16b substantially coincides with the optical axis of the object lens 13. Since FIG. 67 is a plan view, the object lens principal point 13d also indicates the center axis of the through-hole 16b and the optical axis of the object lens 13.

A surface, which passes through the object-lens principal points 10d and 13d and is perpendicular to the horizontal portion of the lens holder upper surface 16c or the main surfaces of the mechanical stoppers 16d and 16e, is set to a surface 10d-13d. Naturally, the surface 10d-13d coincides with a plane including the center axis of the through hole 16a and the center axis of the through-hole 16b and substantially coincides with a plane including the optical axis of the object lens 10 and the optical axis of the object lens 13. In other words, the surface 10d-13d is such a surface that is defined by the tangential direction and the focus direction through the center of the tracking direction of the lens holder 16.

Next, the disposition of the coils will be described.

Figure 69:
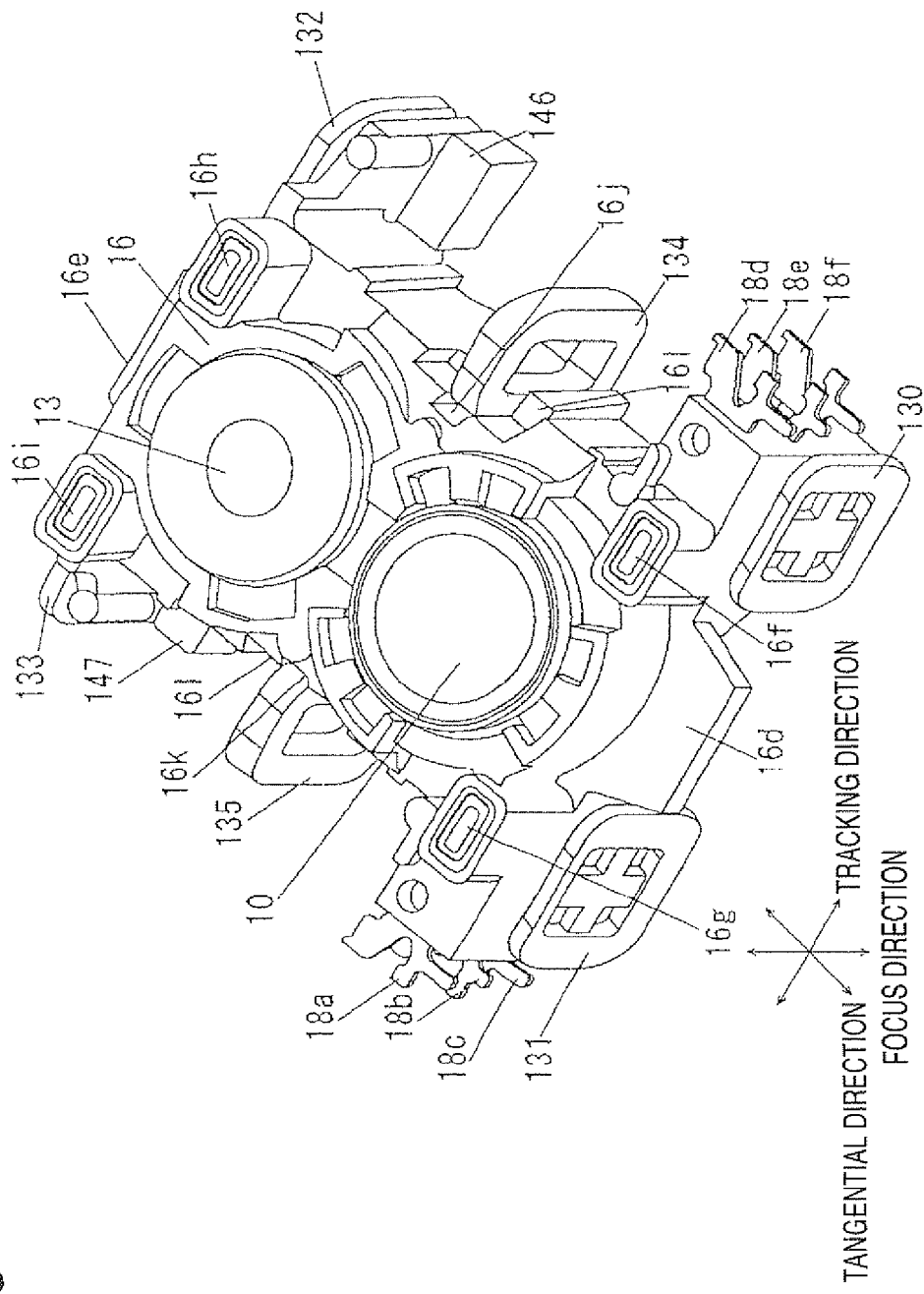
FIG. 69 is a diagram showing a portion of the optical pickup device according to the embodiment of the invention.

As shown in FIG. 69, the focus coils 130 to 133 are wound in a substantial ring shape and in the substantially same shape as each other. Further, the focus coils 130 to 133 are provided in four corners of the lens holder 16, respectively. The tracking coils 134 and 135 are wound in a substantial ring shape and the substantially same shape as each other. Further, one sides of the tracking coils 134 and 135 are inserted into grooves 16j and 16k, respectively, provided in the central portion of the lens holder in the tangential direction. The tracking coil 134 is provided between the focus coils 130 and 132, and the tracking coil 135 is provided between the focus coils 131 and 133. The other sides of the tracking coils 134 and 135, which are not inserted into the grooves 16j and 16k, are respectively disposed in the position interposed between the tracking magnets 140 and 141 and the position interposed between the tracking magnets 142 and 143. As the respective coils are disposed in such a manner, it is possible to suppress unnecessary inclination of the lens holder. When the coils are bonded to the lens holder 16, a heat-curing adhesive is preferably used. However, the bonding can be performed by using a light-curing adhesive or another adhesive. Further, if the respective coils and the lens holder 16 can be reliably disposed in predetermined positions, the bonding may be performed by other methods.

Further, the disposition of the coils will be described in detail.

FIG. 67 is a diagram illustrating the vicinities of the lens holder 16 in the optical disk drive, seen from the Z direction shown in FIG. 61. In other words, FIG. 67 is a diagram seen from the side of the optical disk 2 in the optical axis direction of the object lenses 10 and 13 or a diagram seen from the side of the optical disk 2 in the focus direction.

The focus coil 130 is provided in the end surface of the lens holder 16 which is opposite to the suspension holder 17 and is provided in the side of the lens holder 16 where the suspensions 18d, 18e, and 18f are provided.

The focus coil 131 is provided in the end surface of the lens holder 16 which is opposite to the suspension holder 17 and is provided in the side of the lens holder 16 where the suspensions 18a, 18b, and 18c are provided.

The focus coil 132 is provided in the end surface of the lens holder 16 at the suspension holder 17 and is provided in the side of the lens holder 16 where the suspensions 18d, 18e, and 18f are provided.

The focus coil 133 is provided in the end surface of the lens holder 16 at the suspension holder 17 and is provided in the side of the lens holder 16 where the suspensions 18a, 18b, and 18c are provided.

Further, the tracking coils 134 and 135 are respectively provided in the position interposed between the focus coils 130 and 132 and in the position interposed between the focus coils 131 and 133.

In the focus coils 130 to 133, reference numerals 130a, 131a, 132a, and 133a represent the respective centers thereof, reference numerals 130b, 131b, 132b, and 133b represent the respective outer circumferences thereof opposite to the surface 10d-13d, reference numerals 130c, 131c, 132c, and 133c represent the respective outer circumferences thereof at the surface 10d-13d, reference numerals 130d, 131d, 132d, and 133*d* represent the respective winding coil surfaces thereof at the suspension holder 17, reference numerals 130*e*, 131*e*, 132*e*, and 133*e* represent the respective winding coil surfaces thereof opposite to the suspension holder 17, and reference numerals 130*f*, 131*f*, 132*f*, and 133*f* represent the respective axes thereof. The focus coils 130 to 133 are formed by winding in a ring shape. For example, when the focus coil 130 is formed, winding is performed in a state where a line, which passes through the center 130*a* defined after the formation of the focus coil 130 and is perpendicular to the substantially ring-shaped plane obtained after the formation of the focus coil 130, that is, the winding coil surfaces 130*d* and 130*e*, is set to a virtual center axis for winding coil. Similarly, when the focus coil 131 is formed, winding is performed in a state where a line passing through the center 131*b* and perpendicular to the winding coil surfaces 131*d* and 131*e* is set to a virtual center axis for winding coil. Similarly, when the focus coil 132 is formed, winding is performed in a state where a line passing through the center 132*b* and perpendicular to the winding coil surfaces 132*d* and 132*e* is set to a virtual center axis for winding coil. Similarly, when the focus coil 133 is formed, winding is performed in a state where a line passing through the center 133*b* and perpendicular to the winding coil surfaces 133*d* and 133*e* is set to a virtual center axis for winding coil. Then, the virtual center axes defined when the focus coils 130 to 133 are formed become the axes 130*f*, 131*f*, 132*f*, and 133*f* shown in FIG. 70, respectively.

In the tracking coils 134 and 135, reference numerals 134*a* and 135*a* represent the respective centers thereof, reference numerals 134*b* and 135*b* represent the outer circumferences thereof opposite to the surface 10*d*-13*d*, reference numerals 134*c* and 135*c* represent the outer circumferences thereof at the surface 10*d*-13*d*, reference numerals 134*d* and 135*d* represent the winding coil surfaces thereof at the suspension holder 17, reference numerals 134*e* and 135*e* represent the winding coil surfaces thereof opposite to the suspension holder 17, and reference numerals 134*f* and 135*f* represent the axes thereof. The tracking coils 134 and 135 are formed by winding in a ring shape. For example, when the tracking coil 134 is formed, winding needs to be performed in a state where a line, which passes through the center 134*a* defined after the formation of the tracking coil 134 and is perpendicular to the ring-shape plane defined after the formation of the tracking coil 134, that is, the winding coil surfaces 134*d* and 134*e*, is set to a virtual center axis for winding coil. Similarly, when the tracking coil 135 is formed, winding is performed in a state where a line passing through the center 135*b* and perpendicular to the winding coil surfaces 135*d* and 135*e* is set to a virtual center axis. Then, the virtual center axes for winding coil defined when the tracking coils 134 and 135 are formed become the axes 134*f* and 135*f* shown in FIG. 70, respectively.

The axis 130*f* passing through the center 130*a*, which is the center for winding coil, is substantially perpendicular to the winding coil surfaces 130*d* and 130*e*, is substantially parallel to the surface 10*d*-13*d*, and is substantially perpendicular to the center axes of the through-holes 16*a* and 16*b* and the optical axes of the object lenses 10 and 13. The distance from the outer circumference 130*b* to the axis 130*f* is equal to the distance from the outer circumference 130*c* to the axis 130*f*. In other words, the axis 130*f* is substantially perpendicular to the rotating shaft of the spindle motor 25 and is substantially parallel to the main surface of the optical disk 2 mounted on the spindle motor 25.

The axes 131*f*, 132*f*, 133*f*, 134*f*, and 135*f* are in the above-described relationship with the centers 131*a*, 132*a*, 133*a*, 134*a*, and 135*a*, the outer circumferences 131*b*, 132*b*, 133*b*, 134*b*, and 135*b*, the outer circumferences 131*c*, 132*c*, 133*c*, 134*c*, and 135*c*, the winding coil surfaces 131*d*, 132*d*, 133*d*, 134*d*, and 135*d*, and the winding coil surfaces 131*e*, 132*e*, 133*e*, 134*e*, and 135*e*. Further, the axes 131*f*, 132*f*, 133*f*, 134*f*, and 135*f* are in the above-described relationship with the main surface of the optical disk 2 mounted on the spindle motor 25. That is, the axes 130*f*, 131*f*, 132*f*, 133*f*, 134*f*, and 135*f* are substantially parallel to each other. Through such a construction, a projected area of the optical pickup device in the focus direction is reduced. Therefore, a proportion occupied by the moving section of the optical pickup device on the base 15 can be reduced, so that a multi-wavelength responsive optical pickup device having a large number of parts can be reduced in size. Further, when two object lenses 10 and 13 are attached on the lens holder 16, and if at least one of the object lenses is such an object lens that condenses blue light corresponding to a wavelength of 400 to 415 nm, the number of parts notably increases, which makes it difficult to reduce the size of the optical pickup device. However, when the axes 130*f* to 133*f* of the focus coils 130 to 133 and the axes 134*f* and 135*f* of the tracking coils 134 and 135 are set to be substantially perpendicular to the optical axes of the object lenses 10 and 13, it is possible to suppress the optical pickup device from increasing in size due to an increase in the number of parts. In addition, when the axes 130*f* to 133*f* of the focus coils 130 to 133 are set to be substantially parallel to the axes 134*f* and 135*f* of the tracking coils 134 and 135, the optical pickup device can be suppressed at the minimum from increasing in size due to an increase in the number of parts. In this embodiment, the short wavelength optical unit 1 emits blue laser light with a wavelength of 400 to 415 m, and the object lens 13 condenses the blue laser light.

Lines connecting the centers 130*a*, 131*a*, 132*a*, and 133*a*, respectively, set to a line 130*a*-131, a line 132*a*-133*a*, a line 130*a*-132*a*, a line 131*a*-133*a*, a line 130*a*-133*a*, and a line 131*a*-132*a*, and a line connecting the centers 134*a* and 135*a* is set to a line 134*a*-135*a*. If such virtual lines are defined, the object lenses 10 and 13 are positioned within a region which is formed by the lines 130*a*-131*a*, 132*a*-133*a*, 130*a*-132*a*, and 131*a*-133*a*, as can be seen from FIG. 67. As such, the plurality of focus coils are disposed so as to surround the region, in which the object lenses 10 and 13 are attached, in a rectangular shape, and the tracking coils 134 and 135 are disposed between the center 10*d* of the object lens and the center 13*d* of the object lens in the tangential direction. Then, the heat generated from the focus coils 130 to 133 and the tracking coils 134 and 135 is transmitted so that a difference in temperature can be prevented from occurring depending on a place when the object lenses 10 and 13 are nonuniformly heated. Therefore, the heat generated from the focus coils 130 to 133 and the tracking coils 134 and 135 can be prevented from having an effect on the optical characteristics of the object lenses 10 and 13.

Figure 70:
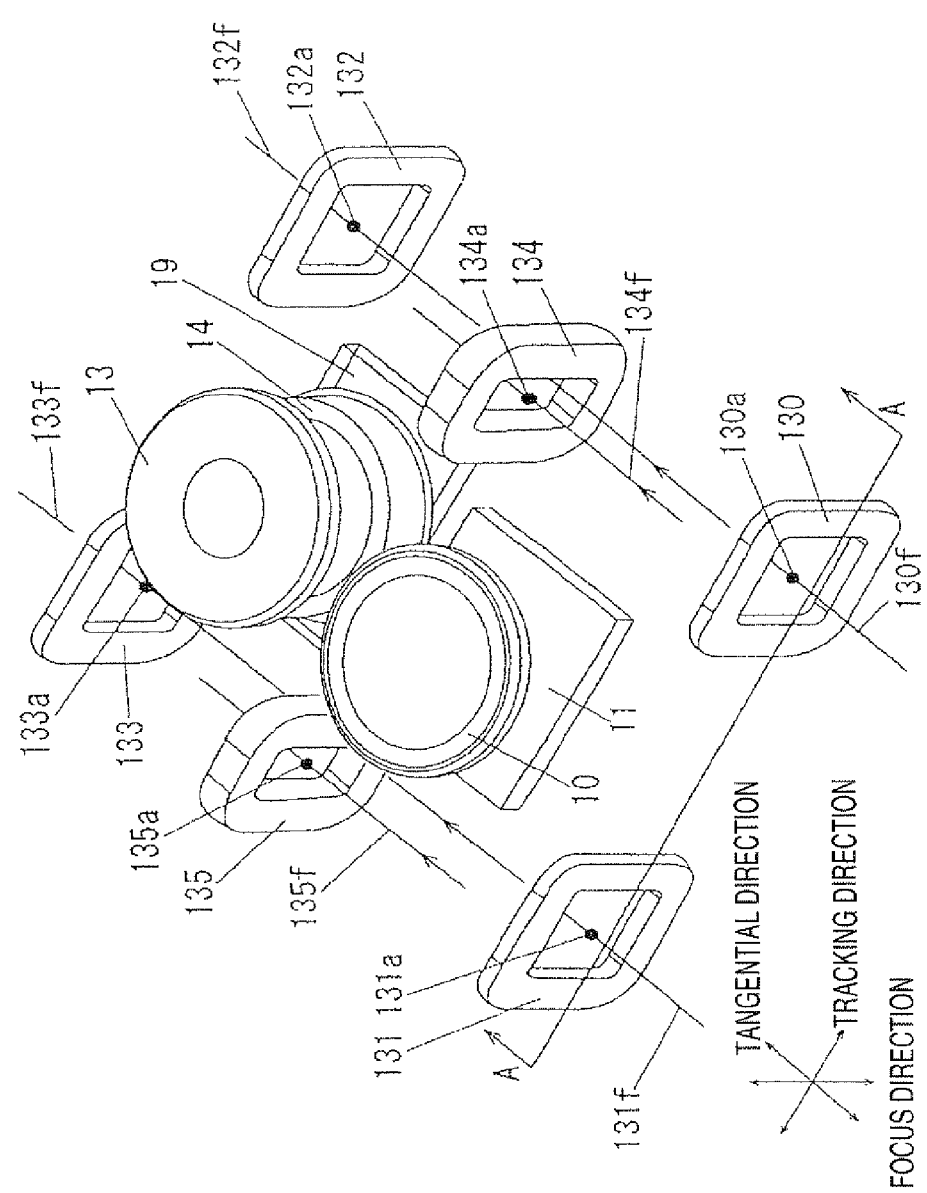
FIG. 70 is a diagram showing a portion of the optical pickup device according to the embodiment of the invention.

As shown in FIG. 70, the line 130*a*-132*a* coincides with the axes 130*f* and 132*f*, and the line 131*a*-133*a* coincides with the axes 131*f* and 133*f*.

As shown in FIG. 67, all the center points of the line 130*a*-131*a*, the line 132*a*-133*a*, the line 130*a*-133*a*, the line 131*a*-132*a*, and the line 134*a*-135*a* are present on the surface 10*d*-13*d*. Particularly, the center point of the line 130*a*-133*a* and the center point of the line 131*a*-132*a* cross each other at one point, through which the center point of the line 134*a*-135*a* is present on the straight line parallel to the focus direction. The straight line is referred to as the center axis 148.

Further, the winding coil surfaces 130*d* and 131*d*, the winding coil surfaces 132*e* and 133*e*, the winding coil surfaces 134*e* and 135*e*, and the winding coil surfaces 134*d* and 135*d*, respectively, are present on the same plane. Surfaces including the respective sets of the winding coil surfaces are set to a surface 130*d*-131*d*, a surface 132*e*-133*e*, a surface 134*e*-135*e*, and a surface 134*d*-135*d*, respectively. Four of the surfaces are substantially parallel to each other. A distance from the surface 130*d*-131*d* to the surface 134*e*-135*e* is equal to a distance from the surface 132*e*-133*e* to the surface 134*d*-135*d*, and a distance from the surface 130*d*-131*d* to the line 134*a*-135*a* is also equal to a distance from the surface 132*e*-133*e* to the line 134*a*-135*a*. In other words, the distance from the focus coil 130 to the tracking coil 134, the distance from the focus coil 131 to the tracking coil 135, the distance from the focus coil 132 to the tracking coil 134, and the distance from the focus coil 133 to the tracking coil 135 are all the same.

Further, the distance from the focus coil 130 to the focus coil 133 is equal to the distance from the focus coil 131 to the focus coil 132.

The outer circumferential portions 130*b* and 132*b*, the outer circumferential portions 131*b* and 132*b*, the outer circumferential portions 130*c* and 132*c*, and the outer circumferential portions 131*c* and 133*c*, respectively, are present on the same plane. Surfaces including the respective sets of the outer circumferential portions are set to a surface 130*b*-132*b*, a surface 131*b*-133*b*, a surface 130*c*-132*c*, and a surface 131*c*-133*c*. Four of the surfaces are substantially parallel to the surface 10*d*-13*d*. That is, the focus coils 130 and 131, the focus coils 132 and 133, and the tracking coils 134 and 135, respectively, are plane-symmetrical with reference to the surface 10*d*-13*d*. Further, the focus coils 130 and 132 and the focus coils 131 and 133, respectively, are line-symmetrical with reference to an extending line of the line 134*a*-135*a*. Further, the focus coils 130 and 133, the focus coils 131 and 132, and the tracking coils 134 and 135, respectively, are line-symmetrical with reference to the center axis 148.

As described above, six of the coils (the focus coils 130 to 133 and the tracking coils 134 and 135) are distributed in the lens holder 16. That is, the lens holder 16 has the ring-shaped focus coils 130 to 133 and the ring-shaped tracking coils 134 and 135, which are provided separately. The tracking coil 134 is disposed between the focus coils 130 and 132, and the tracking coil 135 is disposed between the focus coils 131 and 133. The axes of the focus coils 130 to 133 and the tracking coils 134 and 135 are set to be substantially parallel to each other. Accordingly, a driving point by the focus coil, a driving point by the tracking coil, and the center of the lens holder 16 can be easily brought in line with each other, and the moving section of the optical pickup device can be accurately driven.

As shown in FIG. 67, mass balancers 146 and 147 are provided on the lens holder 16 by a technique such as bonding. Then, the driving point of the coil and the center of the lens holder 16 can be more easily brought in line with each other.

If an electric current flows in the coils, heat is generated. However, as the coils in the lens holder 16 are disposed in the above-described manner, a large bias hardly occurs in the temperature distribution on the lens holder 16. Although the object lenses 10 and 13 are heated, severe deformation does not occur.

FIG. 68 is a diagram illustrating the vicinities of the lens holder 16 shown in FIG. 67, seen from the rear side of the optical pickup device. In other words, FIG. 69 is a diagram seen from the side of the lower cover 302*b* in the optical direction of the object lenses 10 and 13, that is, a diagram seen from the side of the lower cover 302*b* in the focus direction.

As shown in FIG. 68, the through-hole 16*a* of the lens holder 16 is blocked by the optical part 11, and the through-hole 16*b* is blocked by the achromatic diffraction lens 14. Further, a portion including the center of the achromatic diffraction lens 14 is covered by the quarter wavelength plate 19.

FIG. 69 is a diagram-illustrating the moving section of the optical pickup device described in FIG. 62 to 65.

As shown in FIG. 69, the lens holder 16 has a depression 161 formed in both sides of the grooves 16*j* and 16*k*. The above-described adhesive is injected into the depression 161 so as to fix the tracking coils 134 and 135 to the lens holder 16, the tracking coils 134 and 135 being inserted into the grooves 16*j* ad 16*k*.

As the main construction considered as the moving section of the optical pickup device according to this embodiment, there are included the object lenses 10 and 13, the optical part 11, the achromatic diffraction lens 14, the lens holder 16, the quarter wavelength plate 19, portions (excluding stretching portions) of the suspensions 18*a* to 18*f* shown in FIG. 69, the focus coils 130 to 133, the tracking coils 134 and 135, and the mass balancer 146 and 147. In addition to those, solder for connecting the suspensions 18 and the coils or an adhesive for fixing the respective parts to the lens holder 16 can be included. In the optical pickup device according to this embodiment, the center of the moving section and the driving points of the coils are brought in line with each other. Therefore, it is possible to accurately drive the moving section of the optical pickup device.

Figure 71:
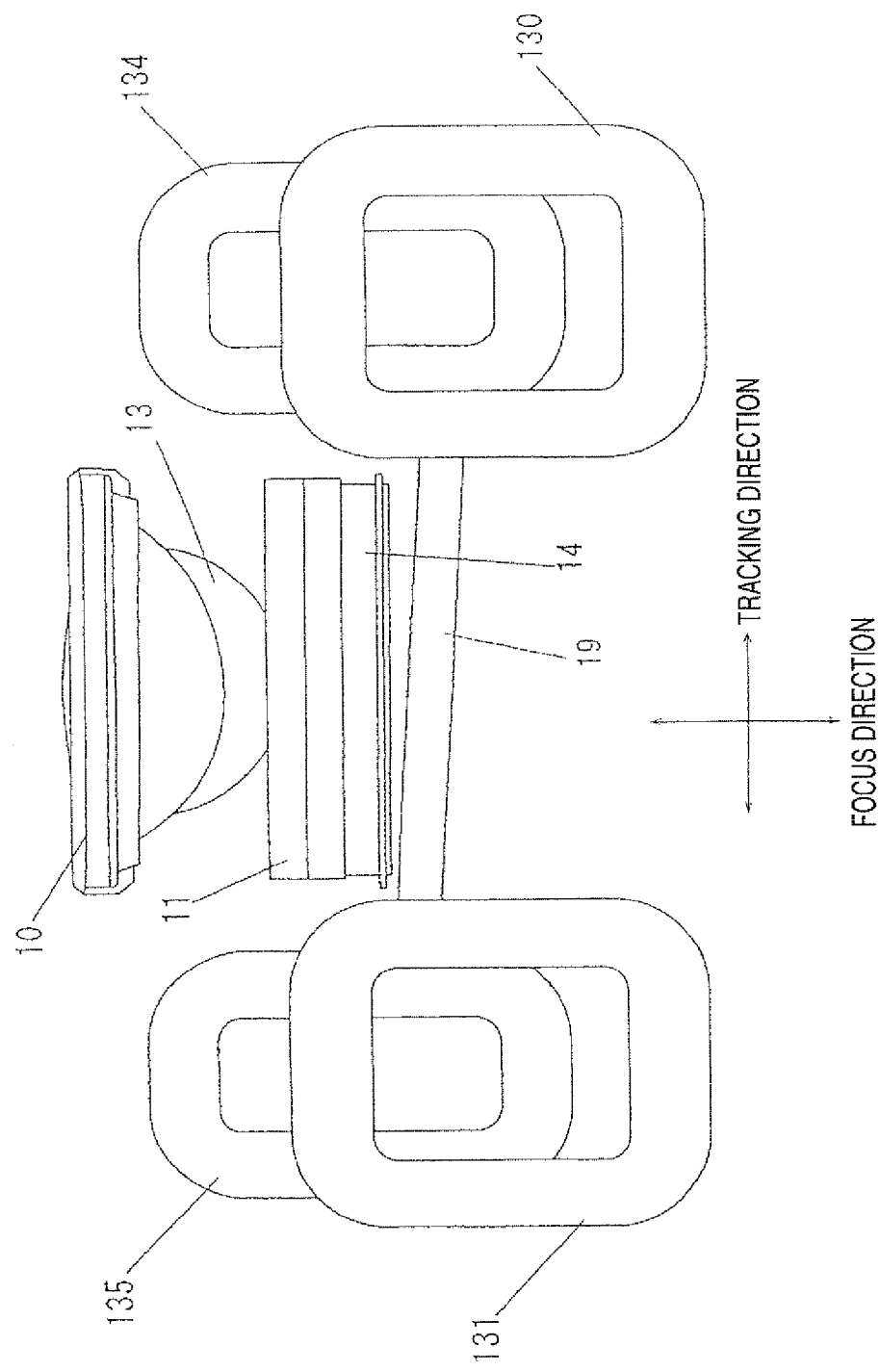
FIG. 71 is a diagram showing a portion of the optical pickup device according to the embodiment of the invention.
Figure 72:
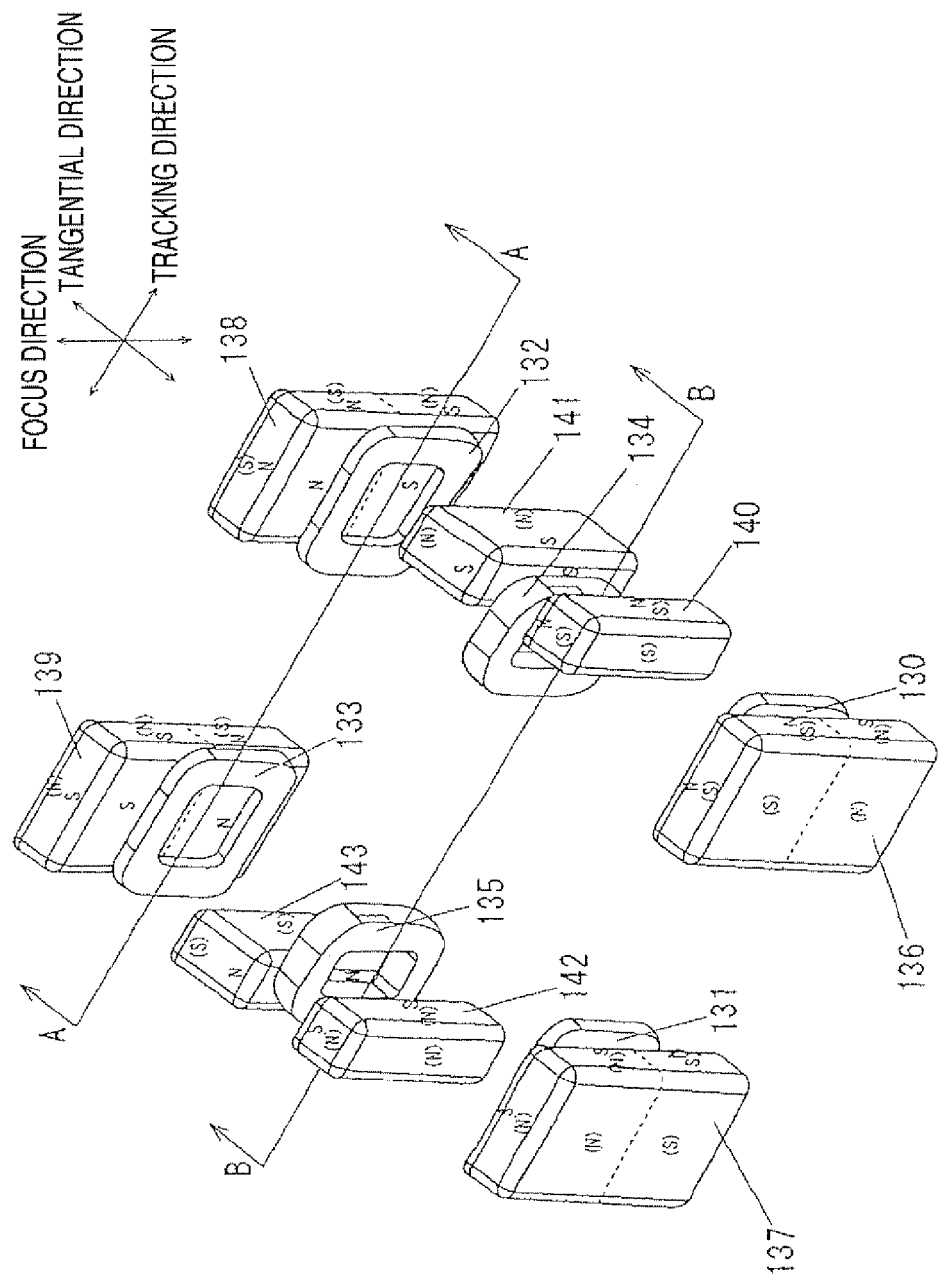
FIG. 72 is a diagram showing a portion of the optical pickup device according to the embodiment of the invention.
Figure 73:
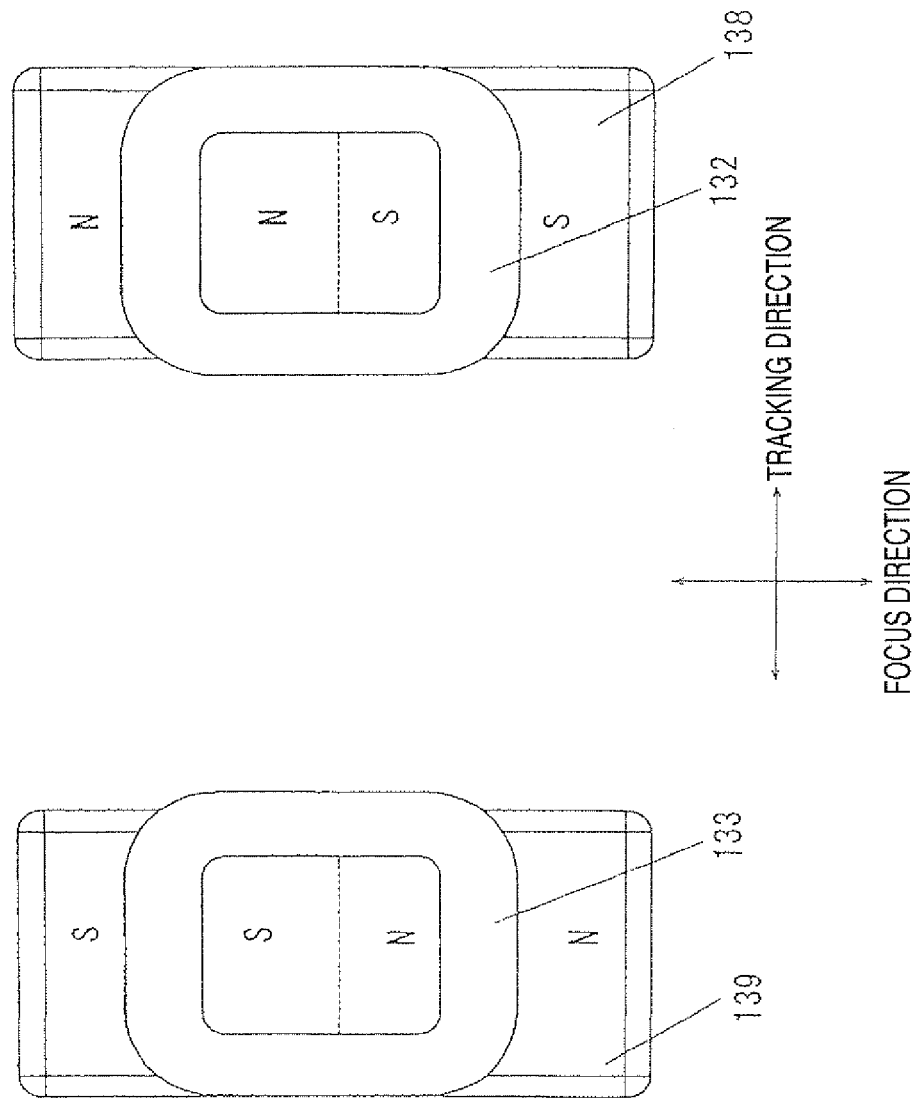
FIG. 73 is a diagram showing a portion of the optical pickup device according to the embodiment of the invention.
Figure 74:
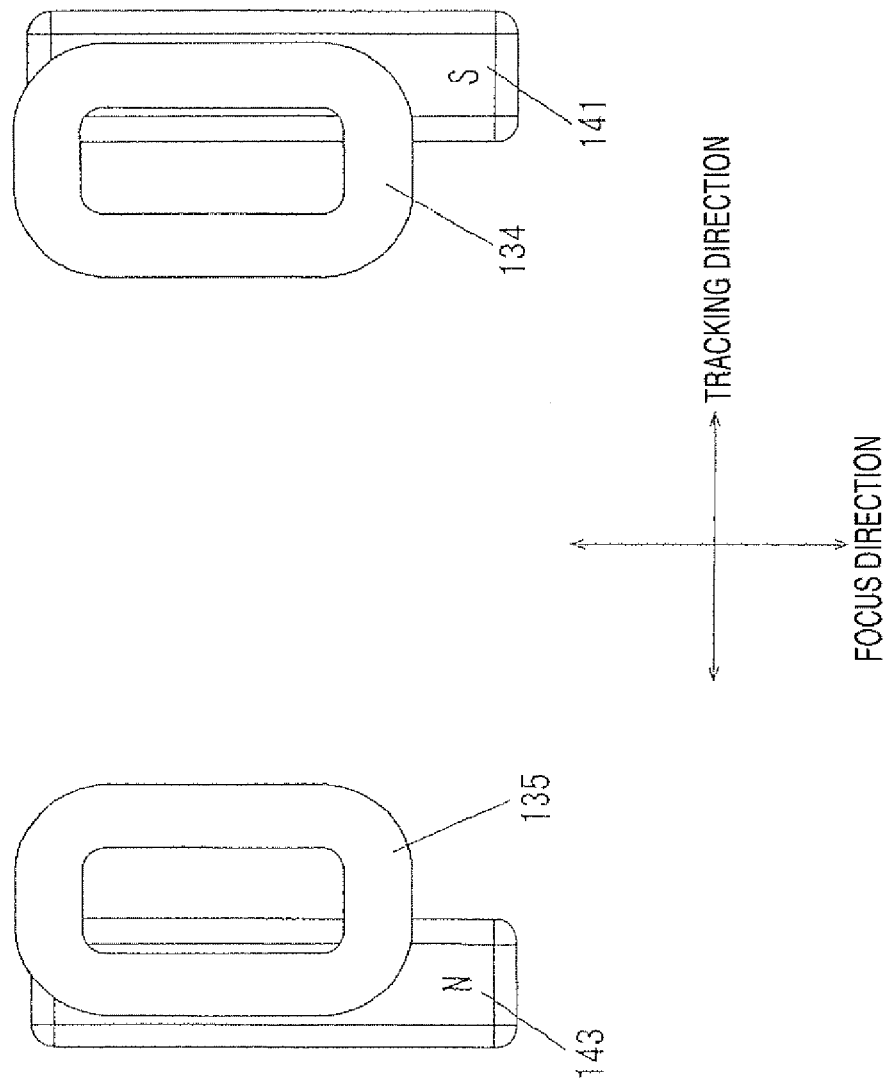
FIG. 74 is a diagram showing a portion of the optical pickup device according to the embodiment of the invention.

FIG. 70 is a diagram showing a state where the lens holder 16, the suspensions 18, and the mass balancer 146 and 147 are omitted from the moving section of the optical pickup device shown in FIG. 69. FIG. 71 is a diagram seen from a direction of A-A line of FIG. 70. FIG. 72 shows only the coils and the magnets in the optical pickup device described in FIGS. 62 to 65, with the other members being omitted. FIG. 73 is a diagram seen from a direction of A-A line of FIG. 72, and FIG. 74 is a diagram seen from a direction of B-B line of FIG. 72.

As shown in FIGS. 70 and 71, the optical pickup device of this embodiment has five of the optical parts (the object lenses 10 and 13, the optical part 11, the achromatic diffraction lens 14, and the quarter wavelength plate 19) mounted thereon.

As shown in FIGS. 72 and 73, the focus magnets 136 to 139, respectively, are multipole-magnetized in the optical pickup device of this embodiment. Therefore, the focus coils 130 to 133 facing the focus magnets 136 to 139, respectively, receive electromagnetic power at upper and lower two sides thereof so as to effectively driven in the focus direction. Accordingly, the number of turns of each coil can be lessened, and the focus coils itself can be reduced in weight such that the moving section of the optical pickup device can be reduced in weight.

In the optical pickup device of this embodiment, the number of turns of the tracking coils 134 and 135 is larger than that of the focus coils, and the weight per one tracking coil is two times larger than the weight per one focus coil. However, the tracking coils 134 and 135 are provided in the central portion of the lens holder 16 and the light focus coils 130 to 133 are provided in the outer edges of the lens holder 16. Therefore, high-order resonance frequency (second-order resonance frequency) of the lens holder 16 increases.

As the respective magnets dedicated to the focus coils 130 to 133 and the tracking coils 134 and 135 are provided, the moving section of the optical pickup device can be driven by a high thrust force.

The optical pickup device and the optical disk drive according to the present invention have an effect of realizing the miniaturization and can be applied to portable electronic apparatuses such as notebook computers or electronic apparatuses such as stationary personal computers.

This application is based upon and claims the benefit of priority of Japanese Patent Application No 2005-306916 filed on Oct. 21, 2005, the contents of which is incorporated herein by references in its entirety.

8e: STEPPING MOTOR
CD/DVD TWO WAVELENGTH INTEGRATED ELEMENT
SPHERICAL ABERRATION CORRECTION

[FIG. 2]
  Z DIRECTION
  R DIRECTION

[FIG. 6]
  WIDTH DIRECTION

[FIG. 7]
  HEIGHT DIRECTION

[FIG. 11A]
  INWARD PATH POLARIZATION DIRECTION
  OEIC LIGHT RECEIVING SURFACE
  LIGHT-EMITTING POINT
  OUTWARD PATH POLARIZATION DIRECTION

[FIG. 12]
  THICKNESS DIRECTION OF BASE 15

[FIG. 17A]
  LIGHT FROM SHORT-WAVELENGTH OPTICAL UNIT 1
  PERSPECTIVE VIEW

[FIG. 17B]
  TOP VIEW

[FIG. 17C]
  SIDE VIEW

[FIG. 18A]
  POLARIZATION HOLOGRAM 1 (RIM CORRECTION FILTER)
  ACTION ONLY ON OUTWARD PATH LIGHT

[FIG. 18B]
  DIAMETER OF INCIDENT LIGHT FLUX
  TRANSMITTING PORTION

[FIG. 18C]
  OUTWARD PATH INCIDENT LIGHT ON POLARIZATION HOLOGRAM 1
  X AXIS

[FIG. 18D]
  Y AXIS

[FIG. 19]
  INSERTION DIRECTION
  LIGHT FROM LONG WAVELENGTH OPTICAL UNIT 3

[FIG. 22]
  MOVABLE RANGE OF SLIDER 8b
  BEAM SPLITTER 7 SIDE
  FIRST POSITION
  REFERENCE POINT O
  SECOND POSITION
  THIRD POSITION
  FURTHER POSITION
  INCLINED-RIGHT MIRROR 9 AND 12 SIDE

[FIG. 51A]
  WIDTH DIRECTION

[FIG. 51B]
  HEIGHT DIRECTION
  OBJECT LENS SIDE

[FIG. 52A]
  WIDTH DIRECTION

[FIG. 52B]
  HEIGHT DIRECTION
  OBJECT LENS SIDE

[FIG. 53]
  HEIGHT DIRECTION
  ROTATION DIRECTION

[FIG. 55A]
  SHORT-WAVELENGTH LIGHT
  RED LIGHT
  INFRARED LIGHT
  SHORT-WAVELENGTH LIGHT
  CONTROL SIGNAL

[FIG. 55B]
  SHORT-WAVELENGTH LIGHT
  RED LIGHT
  INFRARED LIGHT
  CONTROL SIGNAL

[FIG. 56A]
  SHORT-WAVELENGTH LIGHT
  SHORT-WAVELENGTH LIGHT
  CONTROL SIGNAL

[FIG. 56B]
  SHORT-WAVELENGTH LIGHT
  RED LIGHT
  INFRARED LIGHT
  CONTROL SIGNAL

[FIG. 58A]
  SHORT-WAVELENGTH LIGHT
  RED LIGHT
  INFRARED LIGHT
  SHORT-WAVELENGTH LIGHT
  CONTROL SIGNAL

[FIG. 58B]
  SHORT-WAVELENGTH LIGHT
  RED LIGHT
  INFRARED LIGHT
  CONTROL SIGNAL

[FIG. 59A]
  SHORT-WAVELENGTH LIGHT
  SHORT-WAVELENGTH LIGHT
  CONTROL SIGNAL

[FIG. 58B]
  SHORT-WAVELENGTH LIGHT
  RED LIGHT
  INFRARED LIGHT
  CONTROL SIGNAL

[FIG. 61]
  TANGENTIAL DIRECTION
  TRACKING DIRECTION
  FOCUS DIRECTION

[FIG. 62]
TANGENTIAL DIRECTION
TRACKING DIRECTION
FOCUS DIRECTION

[FIG. 63]
TANGENTIAL DIRECTION
TRACKING DIRECTION

[FIG. 64]
FOCUS DIRECTION
TRACKING DIRECTION

[FIG. 65]
FOCUS DIRECTION
TANGENTIAL DIRECTION

[FIG. 66]
FOCUS DIRECTION
TANGENTIAL DIRECTION
TRACKING DIRECTION

[FIG. 67]
TANGENTIAL DIRECTION
TRACKING DIRECTION

[FIG. 68]
TRACKING DIRECTION
TANGENTIAL DIRECTION

[FIG. 69]
TANGENTIAL DIRECTION
TRACKING DIRECTION
FOCUS DIRECTION

[FIG. 70]
TANGENTIAL DIRECTION
TRACKING DIRECTION
FOCUS DIRECTION

[FIG. 71]
TRACKING DIRECTION
FOCUS DIRECTION

[FIG. 72]
FOCUS DIRECTION
TANGENTIAL DIRECTION
TRACKING DIRECTION

[FIG. 73]
TRACKING DIRECTION
FOCUS DIRECTION

[FIG. 74]
TRACKING DIRECTION
FOCUS DIRECTION

What is claimed is:

1. An optical pickup device comprising:
a first condensing member that condenses light from a first light source;
a second condensing member that condenses light from a second light source;
a holder that holds the first and second condensing members;
a plurality of tracking coils that drive the holder in a tracking direction of an optical disk; and
a plurality of focus coils that drive the holder in a focus direction of the optical disk, wherein:
the plurality of focus coils are disposed in the holder such that virtual center axes for winding coils of the plurality of the focus coils are set to be substantially perpendicular to the optical axes of the first and second condensing members,
the plurality of the tracking coils are disposed in the holder such that virtual center axes for winding coils of the plurality of the tracking coils are set to be substantially perpendicular to the optical axes of the first and second condensing members, and
the plurality of focus coils are disposed at four corners of the holder, and the plurality of tracking coils are disposed between the first and second condensing members in such a direction that the first condensing member and the second condensing member are disposed, and the plurality of focus coils and tracking coils are disposed in the order corresponding to a focus coil, a tracking coil, and another focus coil, in such a direction that the first condensing member and the second condensing member are disposed.

2. The optical pickup device according to claim 1, wherein the virtual center axes for the winding coils of the plurality of focus coils are substantially parallel to those of the tracking coil.

3. The optical pickup device according to claim 1, wherein any one of the first and second condensing members condenses light on the optical disk corresponding to blue laser light.

4. The optical pickup device according to claim 3, wherein the blue laser light has a wavelength of 400 to 415 nm.

5. The optical pickup device according to claim 1 further comprising:
a plurality of suspensions that elastically support the holder, wherein:
the virtual center axes for the winding coils of the plurality of focus coils are parallel to a longitudinal direction of the suspensions.

6. The optical pickup device according to claim 1 further comprising:
a plurality of suspensions that elastically support the holder, wherein:
the virtual center axes for the winding coils of the plurality of tracking coils are parallel to a longitudinal direction of the suspensions.

7. The optical pickup device according to claim 1, wherein the virtual center axes for the winding coils of the plurality of focus coils are perpendicular to the tracking direction and the focus direction.

8. The optical pickup device according to claim 1, wherein the virtual center axes for the winding coils of the plurality of tracking coils are perpendicular to the tracking direction and the focus direction.

9. The optical pickup device according to claim 1, wherein at least one pair of focus coils among the plurality of focus coils are disposed plane-symmetrically with respect to a plane including the axes of the first and second condensing members.

10. The optical pickup device according to claim 1, wherein at least one pair of tracking coils among the plurality of tracking coils are disposed plane-symmetrically with respect to a plane including the axes of the first and second condensing members.

11. The optical pickup device according to claim 1 further comprising:
a plurality of magnets that apply magnetic power to the focus coils, wherein
the focus coils are disposed on surfaces facing the magnets among surfaces forming the holder.

12. An optical disk drive comprising:
the optical pickup device according to claim 1;
a base that movably holds the optical pickup device; and a rotation driving member that is provided in the base so as to rotationally drive a medium.

13. The optical pickup device according to claim 1, wherein the virtual center axes for the winding coils of the plurality of focus coils and the virtual center axes for the winding coils of the plurality of tracking coils are substantially parallel to a direction that the second condensing member is disposed.

14. The optical pickup device according to claim 1, wherein the number of windings of the coils of the plurality of tracking coils is larger than the number of windings of the coils of the plurality of focus coils.

15. An optical pickup device comprising:
   a first condensing member that condenses light from a first light source;
   a second condensing member that condenses light from a second light source;
   a plurality of tracking coils that drive the first and second condensing members in a tracking direction of an optical disk; and
   a plurality of focus coils that drive the first and second condensing members in a focus direction of the optical disk, wherein:
   an axis for winding the coils of the plurality of focus coils is set to be substantially perpendicular to optical axes of the first and second condensing members, and an axis for winding the coils of the plurality of tracking coils is set to be substantially perpendicular to the optical axes of the first and second condensing members, and
   the plurality of focus coils are disposed at four corners of a rectangle that surrounds the first and second condensing members, and the plurality of tracking coils are disposed between the first and second condensing members in such a direction that the first condensing member and the second condensing member are disposed, and the plurality of focus coils and tracking coils are disposed in the order corresponding to a focus coil, a tracking coil, and another focus coil, in such a direction that the first condensing member and the second condensing member are disposed.

16. An optical pickup device comprising:
   a first condensing member that condenses light from a first light source;
   a second condensing member that condenses light from a second light source;
   a plurality of tracking coils that drive the first and second condensing members in a tracking direction of an optical disk; and
   a plurality of focus coils that drive the first and second condensing members in a focus direction of the optical disk, wherein:
   the plurality of focus coils are disposed at four corners of a rectangle that surrounds the first and second condensing members, and the plurality of tracking coils are disposed between the first and second condensing members in such a direction that the first condensing member and the second condensing member are disposed, and the plurality of focus coils and tracking coils are disposed in the order corresponding to a focus coil, a tracking coil, and another focus coil, in such a direction that the first condensing member and the second condensing member are disposed.

* * * * *